United States Patent
Mogalapalli et al.

(10) Patent No.: US 10,116,915 B2
(45) Date of Patent: Oct. 30, 2018

(54) CLEANING OF DEPTH DATA BY ELIMINATION OF ARTIFACTS CAUSED BY SHADOWS AND PARALLAX

(71) Applicant: Seiko Epson Corporation, Tokyo (JP)

(72) Inventors: Vivek Mogalapalli, Toronto (CA); Ivo Moravec, Richmond Hill (CA); Michael Joseph Mannion, Newmarket (CA)

(73) Assignee: SEIKO EPSON CORPORATION, Tokyo (JP)

( * ) Notice: Subject to any disclaimer, the term of this patent is extended or adjusted under 35 U.S.C. 154(b) by 114 days.

(21) Appl. No.: 15/407,493

(22) Filed: Jan. 17, 2017

(65) Prior Publication Data

US 2018/0205926 A1    Jul. 19, 2018

(51) Int. Cl.
| | | |
|---|---|---|
| *H04N 13/122* | (2018.01) | |
| *G06T 7/521* | (2017.01) | |
| *G06T 7/13* | (2017.01) | |
| *H04N 13/128* | (2018.01) | |
| *H04N 13/254* | (2018.01) | |
| *H04N 13/271* | (2018.01) | |

(52) U.S. Cl.
CPC .............. *H04N 13/122* (2018.05); *G06T 7/13* (2017.01); *G06T 7/521* (2017.01); *H04N 13/128* (2018.05); *H04N 13/254* (2018.05); *H04N 13/271* (2018.05); *G06T 2207/10028* (2013.01)

(58) Field of Classification Search
CPC ................................................... H04N 13/122
See application file for complete search history.

(56) References Cited

U.S. PATENT DOCUMENTS

| | | | |
|---|---|---|---|
| 7,929,804 B2 | 4/2011 | Avidan et al. | |
| 8,262,229 B2 * | 9/2012 | Nelson | H04N 9/3147 |
| | | | 353/121 |
| 2013/0156262 A1 * | 6/2013 | Taguchi | G06T 7/75 |
| | | | 382/103 |
| 2015/0261184 A1 | 9/2015 | Mannion et al. | |
| 2016/0196657 A1 * | 7/2016 | Kantor | G06T 7/0057 |
| | | | 382/154 |

* cited by examiner

*Primary Examiner* — James Pontius
(74) *Attorney, Agent, or Firm* — Oliff PLC

(57) ABSTRACT

Multiple Holocam Orbs observe a real-life environment and generate an artificial reality representation of the real-life environment. Depth image data is cleansed of error due to LED shadow by identifying the edge of a foreground object in an (near infrared light) intensity image, identifying an edge in a depth image, and taking the difference between the start of both edges. Depth data error due to parallax is identified noting when associated text data in a given pixel row that is progressing in a given row direction (left-to-right or right-to-left) reverses order. Sound sources are identified by comparing results of a blind audio source localization algorithm, with the spatial 3D model provided by the Holocam Orb. Sound sources that corresponding to identifying 3D objects are associated together. Additionally, types of data supported by a standard movie data container, such as an MPEG container, is expanding to incorporate free viewpoint data (FVD) model data. This is done by inserting FVD data of different individual 3D objects at different sample rates into a single video stream. Each 3D object is separately identified by a separately assigned ID.

20 Claims, 29 Drawing Sheets

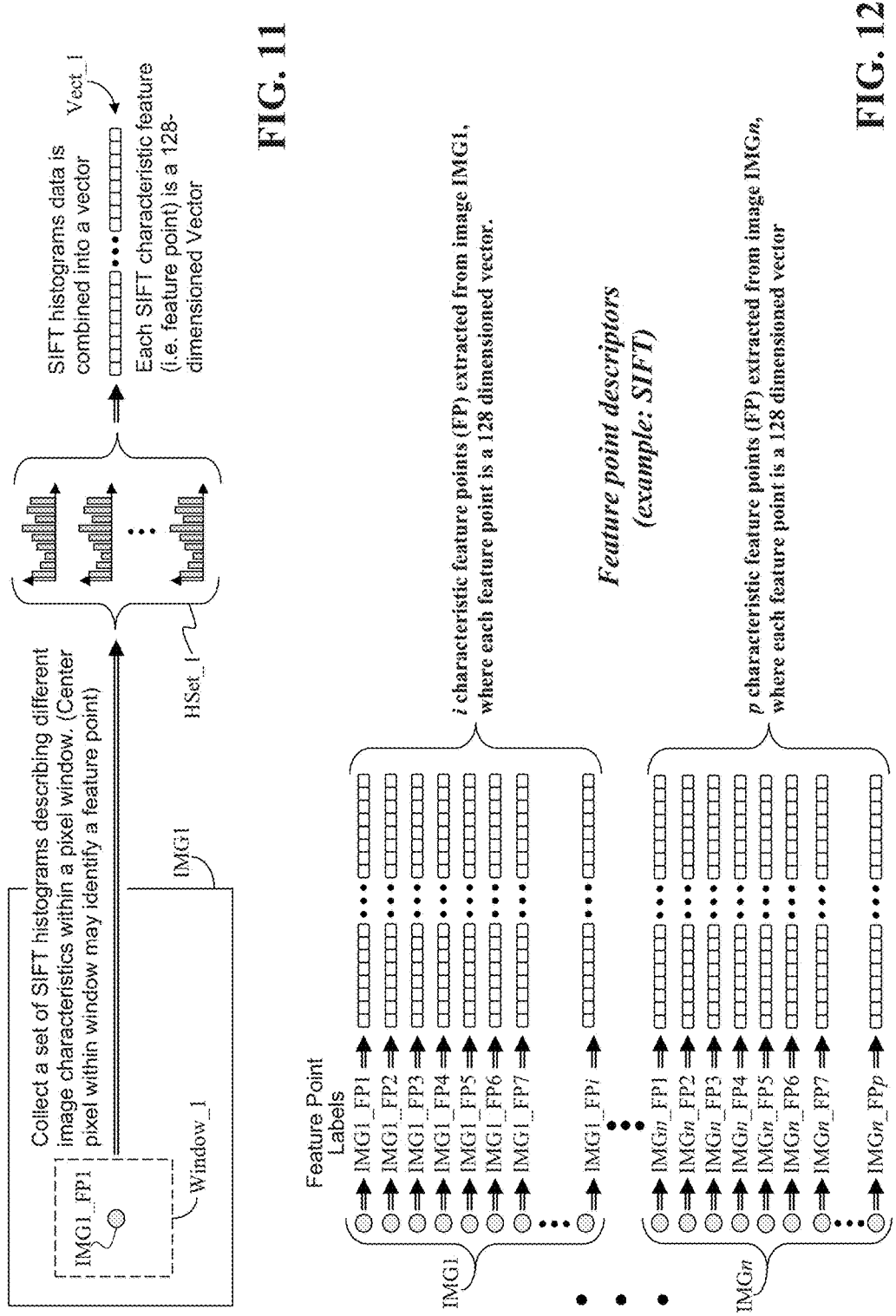

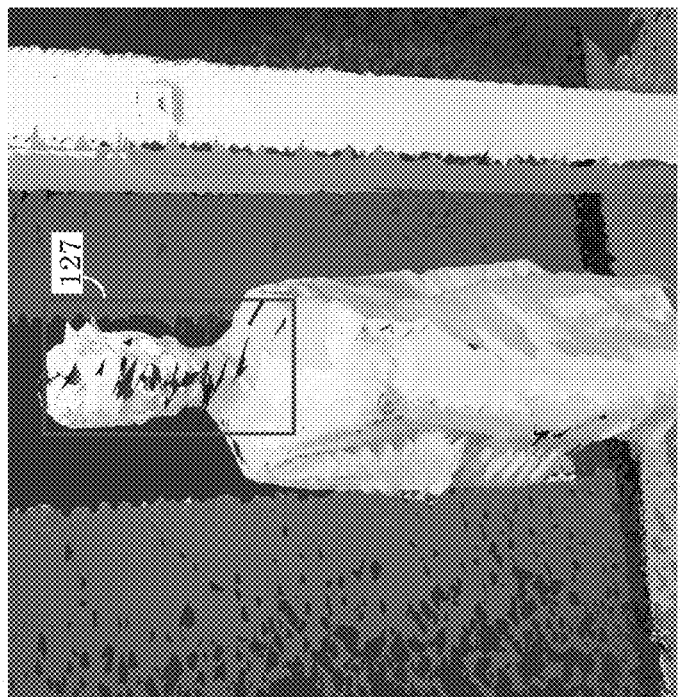
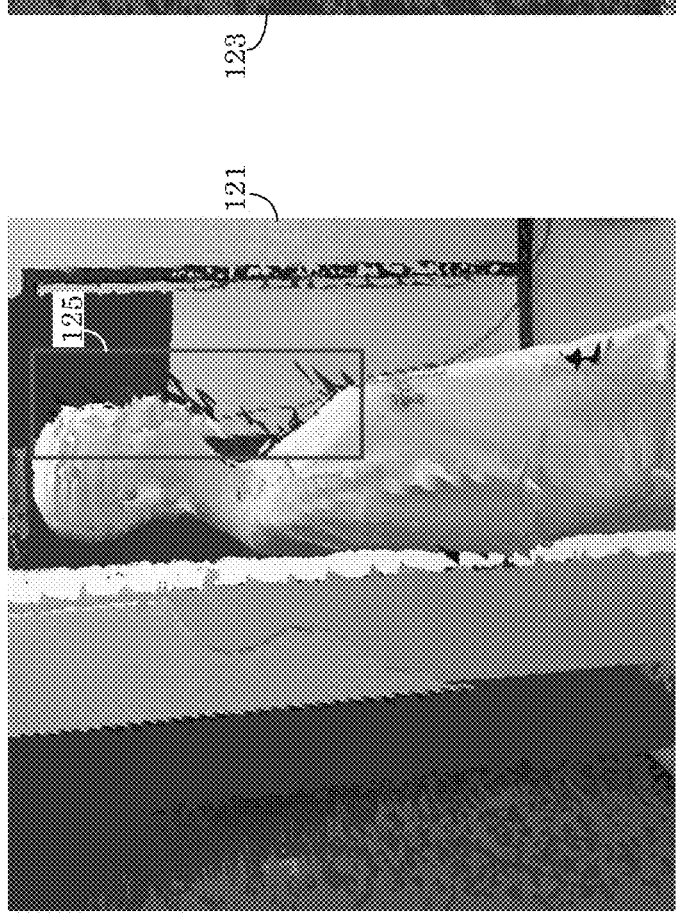
FIG. 23

Pixels Pt9 and Pt10 have the wrong texture assigned due to parallax error.

```
typedef struct hc_header {                    // This structure appears first - ideally this structure never needs to change
    uint32_t version_code;                    // Version number of the subheaders used (i.e. subheader_2)
    uint64_t header_size;                     // Total size of header, subheader and subheader streamids
    uint64_t total_size;                      // header size (above) + The compressed packet data (the triangle data) size.
    hc_current_subheader subheader[0];        // Place holder showing that the subheader structure (above) goes here.
} hc_header;

typedef hc_subheader_2 hc_current_subheader;

typedef struct hc_subheader_2 {
    uint32_t version_code;                    // The version number of this structure
    uint32_t data_size;                       // Size of the compressed packet data without the headers
    uint32_t uncomp_size;                     // Size of the packet data after it is uncompressed
    data_type_t type;                         // Identifies the type of data in the packet (currently can be rendering data or
                                              //    skeleton data)
    comp_method_t compression_method;         // Identifies the compression method (if any)
    uint32_t crc;                             // standard CRC32 checksum of the packet data (to ensure correct transmission)
    uint8_t label[256];                       // User defined string identifying the stream if desired
    uint32_t stream_count;                    // Number of accompanying texture streams (video streams)
    uint32_t stream_ids[0];                   // Array of stream_count (above) elements containing stream identifiers for each
                                              //    texture stream (to be able to tell which video stream contains which texture)
} hc_subheader_2;
```

FIG. 32

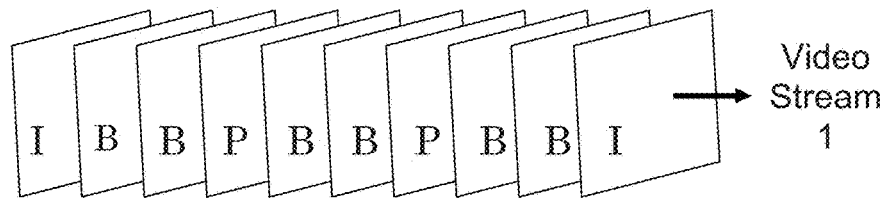
FIG. 33
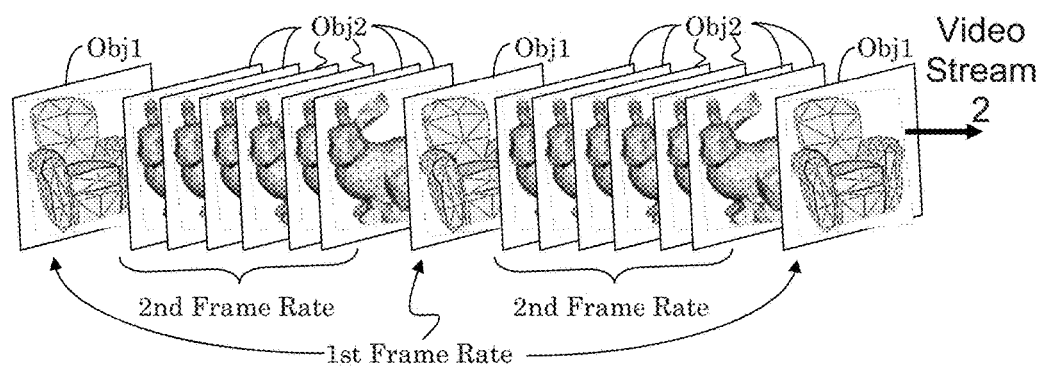
FIG. 34
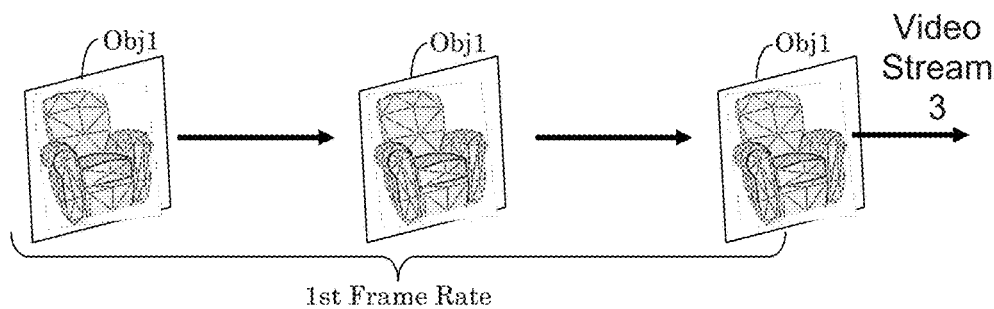
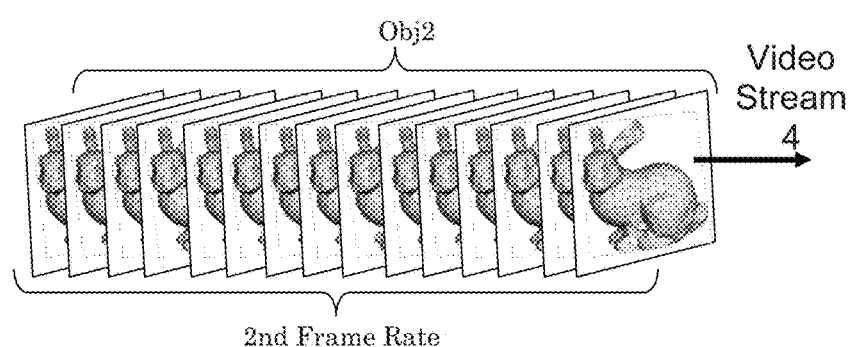
FIG. 35

I

CLEANING OF DEPTH DATA BY ELIMINATION OF ARTIFACTS CAUSED BY SHADOWS AND PARALLAX

BACKGROUND

Field of Invention

The present invention relates to the fields of virtual reality and augmented reality. More specifically it relates method of identifying and removing error from depth images (or depth data) to create a three-dimensional computer simulation/emulation/model of a real, local environment.

Description of Related Art

Virtual reality, or artificial reality, which may include augmented reality, relates to the use of computers and three-dimensional (3D) imaging techniques to create a 3D representation within a computer of a real-life (or seemingly real-life) scene. Various 3D observation tools may be used. Examples of such observation tools may include stereo imaging equipment (e.g. 3D cameras) or time-of-flight capturing units, which may use infrared sensors or laser sensors to obtain 3D depth information.

Typically, one wishes to anchor computer generated 3D items to a video (or still) image portrayal of the generated 3D items within an imaged (3D or two-dimensional, 2D) scene. This may require much preprocessing to determine pose, position and orientation of the computer generated 3D items and to identify their corresponding pixels in the video (or still) image that represents the same 3D item within the imaged (preferably real-life) scene. As a result, it has heretofore been very difficult, and indeed not practical, to produce renditions of computer generated 3D items within real-life scene images in real time.

Nonetheless, head-mounted displays have become increasingly popular for 3D visualization, particularly for replacing real environments with virtual substitutes. In parallel, the field of augmented reality (AR) has likewise been growing. In an AR system, real environments are enriched by superposition of virtual items, which may include virtual objects or text that appears to float by a real object to which it refers. Thus, there are two main aspects of AR technology: the capacity to enhance visual content and the potential to extend and enhance a user's interaction with the real world.

An AR unit may provide a view (or display or image) of visual content as "seen" (or captured) by a virtual camera. As it is known in the art, a virtual camera displays an image of a virtual object from a prescribed angle (or field of view, FOV) as it would be captured, or seen, by a real camera if a real camera were positioned at the prescribed angle and the virtual object were a real object. Being able to freely generate this type of 3D data for any (or from a changing) user viewpoint may be referred to as free viewpoint data generation. The resultant view includes not only the real, physical items in a real scene, but also virtual objects inserted into the real scene. In such an augmented reality (AR) unit, the virtual camera view may be provided by an optical see-through (OST) head-mounted display (HMD) system (i.e., an OST HMD system), or by other imaging technologies.

In a human-eye/optical see-through display, an individual image is designated for, and observable by, a select eye(s) of a human user. If the human-eye OST display is a monoscopic display then only one image for one (or both) of a user's two eyes is provided. If the human eye OST display is a stereoscopic display then two separate images, one for each of the user's two eyes, are typically provided. For example, a human eye OST display may have one display directly over one eye of a human user, and optionally have another, separate display directly over the other eye of the human user. Alternatively, a human eye OST display may project a separate image directly into separate eyes of the human user, or otherwise control separate images to be separately viewed by each of the one or two eyes of the human user.

Typically, this includes establishing a method of consistently translating between real-world coordinates of a real-world scene and virtual coordinates in a computer generated virtual scene corresponding to the real-word scene. In order for an AR system to provide an immersive experience, it is desirable that the virtual objects be rendered and placed within the virtual camera display in three dimensions (3D), i.e. a stereoscopic image, or display. This, in turn, requires capturing 3D information of the real-world scene. Such 3D information may be obtained by such means as "time-of-flight" sensors, visual tracking, inertial sensors, mechanically linked trackers, phase-difference sensors, and/or hybrid systems. It is further desirable that an AR system be portable and wearable by a human user, which places limits on computer architecture, and thus limits on available computing resources. It is further desirable that an AR system provide a virtual camera display in real-time, which is hindered by the limitations on available computing resources.

SUMMARY OF INVENTION

Objects of the present invention are met in an environment sensing apparatus, having: a depth image capture device including: an illumination source, the depth image capture device using reflected illumination from the illumination source to determine a depth map of a scene, the depth map being comprised of lines of depth data points; and an intensity image capture device that captures an intensity image of the scene, the intensity image being comprised of lines of intensity data points; and a data processing unit implementing the following steps: on a line-by-line basis, identifying a first edge of an object in a current line, of intensity data points, of the intensity image, and identifying a corresponding second edge of the same object in a corresponding current line, of depth data points, of the depth map; defining as an observed shadow, depth data points in the current line of the depth map that lie between a first depth data point, whose line position corresponds to a position of the first edge in the corresponding current line of the intensity image, and a second depth data point that corresponds to a position of the second edge in the same current line of the depth map; and selectively removing depth data points within the defined observed shadow from the depth map.

Preferably, the depth image capture device is part of a time-of-flight (TOF) system, and the illumination source is a near infrared (NIR) light source, and the intensity data points are NIR light intensity data points.

Alternatively, the depth image capture device is part of a structured light system, and the illumination source projects a known pattern image.

Further preferably, the lines of depth data points are one of rows or columns of depth data points within the depth map, and the lines of intensity data points are one of rows or columns of intensity data points within the intensity image.

Optionally, the step of selectively removing depth data points within the defined observed shadow from the depth map, includes: calculating a theoretical intensity shadow of the object along the current line of the depth map based on known relative positions of the illumination source and the intensity image capture device; and removing all depth data points that define the observed shadow in response to the observed shadow not being greater than the theoretical shadow.

In this case, the step of selectively removing depth data points within the defined observed shadow from the depth map, further preferably includes: not removing any of the depth data points within the defined observed shadow in response to the observed shadow being greater than the theoretical shadow.

Objects of the present invention are further met in an environment sensing apparatus, having: a depth image capture device, which captures a depth map of a scene, the depth map being comprised of lines of depth data points; and an intensity image capture device that captures an intensity image of the scene, the captured intensity image of the scene being a texture image including a plurality of lines of texture data points; and a data processing unit implementing the following steps: mapping texture data points from a line of the texture image to corresponding depth data points in a corresponding line of the depth map; identifying, as a procession direction, a prominent position progression of mapped depth data points to texture data points in succession along a first direction of the line of the texture image; proceeding one depth data point at a time along the procession direction in the corresponding line of the depth map, in response to a current depth data point being mapped to a texture data point whose position does not follow the prominent position progression, identifying as parallax error depth data all depth data points in the corresponding line of the depth map spanning from the current depth data point to a first depth data point whose mapped texture data does follow the prominent position progression; and removing from the depth map all depth data points identified as parallax error depth data.

Preferably, positions of each texture data point along each line of texture data are assigned an incremental numerical identifier increasing along the first direction; and the first depth data point is the first encountered depth data point along the first direction whose mapped texture data point has a numerical identifier higher than the numerical identifier of the texture data point mapped to the current depth data point.

Further preferably, positions of each texture data point along each line of texture data are assigned an incremental numerical identifier increasing along the first direction; the prominent position progression is opposite to the first direction along the line of the texture image; and the first depth data point is the first encountered depth data point in the direction opposite the first direction whose mapped texture data point has a numerical identifier lower than the numerical identifier of the texture data point mapped to the current depth data point.

Optionally, the depth image capture device is part of a time-of-flight (TOF) system; and the intensity image capture device is a visual spectrum camera.

Alternatively, the depth image capture device is part of a structured light system; and the intensity image capture device is a visual spectrum camera.

Objects of the present invention are further met in a method of removing erroneous depth data points from a depth map of a scene, including: accessing the depth map of the scene, the depth map being generated by a depth image capture system including an intensity image capture device and using illumination from an illumination source to determine the depth map and an intensity image of the scene, the depth map being comprised of lines of depth data points, and the intensity image being comprised of lines of intensity data points; on a line-by-line basis, identifying a first edge of an object in a current line, of intensity data points, of the intensity image, and identifying a corresponding second edge of the same object in a corresponding current line, of depth data points, of the depth map; defining as an observed shadow, depth data points in the current line of the depth map that lie between a first depth data point, whose line position corresponds to a position of the first edge in the corresponding current line of the intensity image, and a second depth data point that corresponds to a position of the second edge in the same current line of the depth map; and selectively removing depth data points within the defined observed shadow from the depth map.

Preferably, the depth image capture system is a time-of-flight (TOF) system; and the illumination source is a near infrared (NIR) light source, and the intensity data points are NIR light intensity data points.

Alternatively, the depth image capture system is a structured light system; and the illumination source projects a known pattern image.

Further preferably, the lines of depth data points are one of rows or columns of depth data points within the depth map; and the lines of intensity data points are one of rows or columns of intensity data points within the intensity image.

Preferably, the step of selectively removing depth data points within the defined observed shadow from the depth map, includes: calculating a theoretical intensity shadow of the object along the current line of the depth map based on known relative positions of the intensity image capture device and the illumination source; and removing all depth data points that define the observed shadow in response to the observed shadow not being greater than the theoretical shadow.

In this case, the step of selectively removing depth data points within the defined observed shadow from the depth map, further preferably includes: not removing any of the depth data points within the defined the observed shadow in response to the observed shadow being greater than the theoretical shadow.

Preferably, the intensity image capture device is a visual spectrum camera and the captured intensity image of the scene is further a texture image including a plurality of lines of texture data points, the method further comprising: mapping texture data points from a line of the texture image to corresponding depth data points in a corresponding line of the depth map; identifying, as a procession direction, a prominent position progression of mapped depth data points to texture data points in succession along a first direction of the line of the texture image; proceeding one depth data point at a time along the procession direction in the corresponding line of the depth map, in response to a current depth data point being mapped to a texture data point whose position does not follow the prominent position progression, identifying as parallax error depth data all depth data points in the corresponding line of the depth map spanning from the current depth data point to a subsequent depth data point whose mapped texture data does follow the prominent position progression; and removing from the depth map all depth data points identified as parallax error depth data.

Further preferably, positions of each texture data point along each line of texture data are assigned an incremental numerical identifier increasing along the first direction; and the subsequent depth data point is the first encountered depth data point in the first direction whose mapped texture data point has a numerical identifier higher than the numerical identifier of the texture data point of the texture data point mapped to the current depth data point.

Additionally, positions of each texture data point along each line of texture data are assigned an incremental numerical identifier increasing along the first direction; the prominent position progression is opposite to the first direction along the line of the texture image; and the subsequent depth data point is the first encountered depth data point in the direction opposite the first direction whose mapped texture point has a numerical identifier lower than the numerical identifier of the texture data point mapped to the third depth data point.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

FIG. 11 provides an overview of the feature point extraction function of SIFT.

FIG. 12 illustrates multiple sets of feature points extracted from n images, where the images are identified as ID1 through IDn.

FIG. 23 provides examples of depth error in a depth image due to NIR shadow.

FIG. 32 illustrates an example of a main header and subsequent versioned header in accord with the present invention, as expressed in C (computer language) header code.

FIG. 33 a typical MPEG video encoding technique.

FIG. 34 illustrates an inserting of free viewpoint data (FVD) model data into an MPEG-standard video stream.

FIG. 35 illustrates an alternate embodiment wherein each 3D object (or FVD model data) is encoded (inserted) into a separate MPEG video stream at different data rates.

DESCRIPTION OF THE PREFERRED EMBODIMENTS

The present, real-time, artificial/augmented reality generating system/method is herein termed a "Holocam Orb System" because of its use of what are herein termed "Holocam Orbs", each of which is an independent data gathering device (i.e. independent sensing apparatus incorporating multiple sensors) that gathers (real-life) scene information (preferably including audio data and 2D/3D imaging data) from its respective field-of-view (FOV). Information from multiple Holocam Orbs is combined within a computing system (e.g. a general purpose computer or a specialized computer or other data processing device) to create a multi-view 3D artificial reality scene that may surround a viewer standing within the scene.

Figure 1:
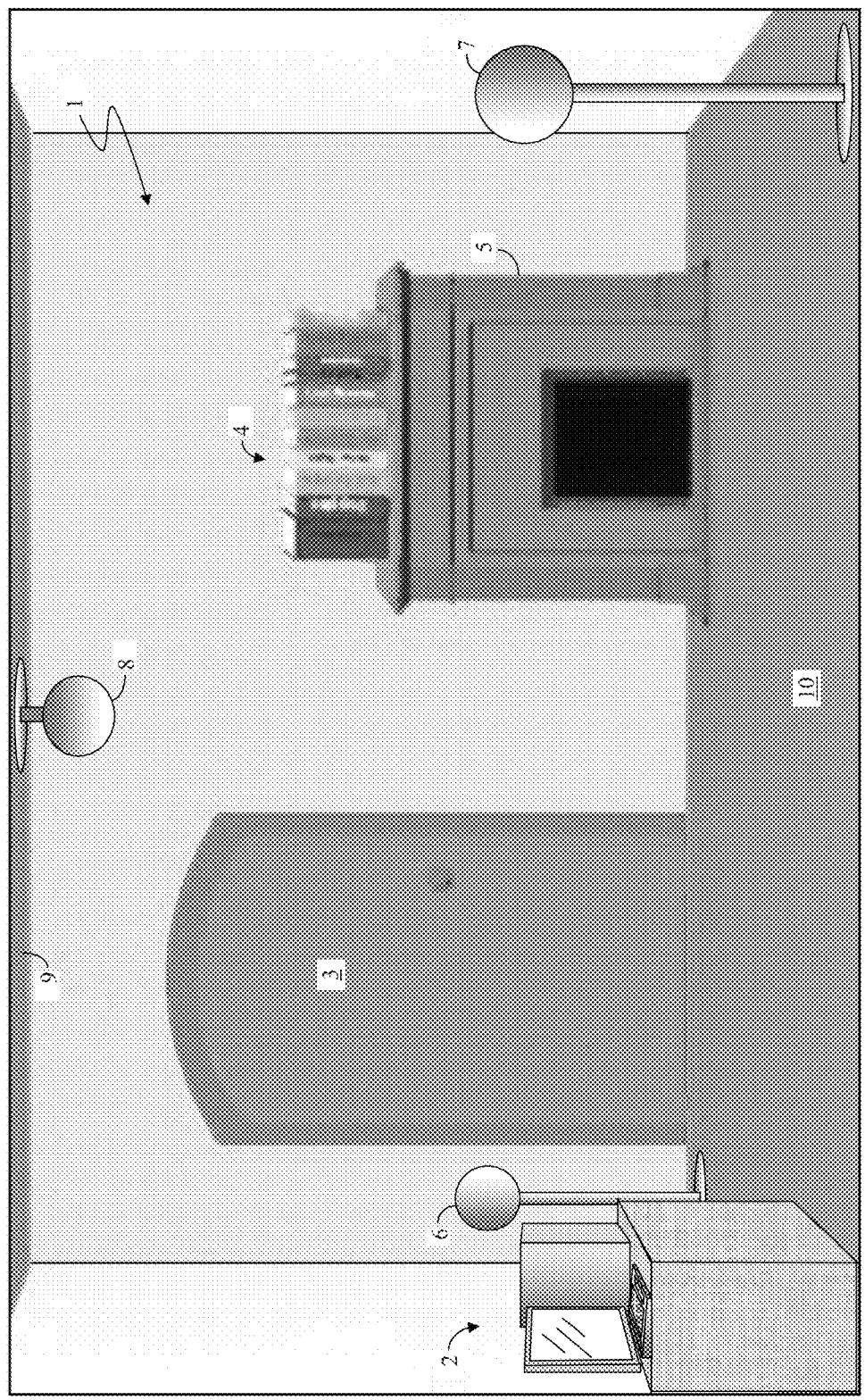
FIG. 1 is an illustration of a real-world scene with three Holocam Orbs (3D capture devices) used to capture 3D information and produce a real-time, 3D virtual environment of the real-world scene.

For example, FIG. 1 illustrates an exemplary, real-world scene consisting of a room 1 with a computer 2, a door 3, and books 4 on a chimney 5. Additionally, three figuratively illustrated Holocam Orbs 6, 7, and 8 are shown distributed within room 1. Holocam Orb 6 preferably gathers scene information from a field-of-view generally extending from a side of door 3 toward the foreground of the room 1. Holocam Orb 7 is positioned at an opposite side of room 1 and may gather information from a field-of-view looking back from the foreground of room 1 toward the wall where the door 3 and chimney 5 are located. Holocam Orb 8 is position on the ceiling 9 and it preferably provides 3D scene information from a field-of-view extending from the ceiling 9 downward toward the floor 10. It is to be understood, however, that each Holocam Orb may have multiple 3D observation tools distributed along its surface so as to alternatively provide a substantially spherical 360 degree field-of-view. As is described more fully below, information from all Holocam Orbs 6, 7 and 8 is combined within a computing system, or base station, such as computer 2, to generate a 3D artificial reality scene of room 1 from multiple perspectives. Preferably, Holocam Orb 6 provides information from the back of room 1 toward the front (i.e. the foreground in FIG. 1), Holocam Orb 7 provides information from the front of room 1 toward the back, and Holocam Orb 8 providing information from above toward the floor. A person, i.e. viewer, positioned within room 1 and viewing the generate 3D artificial reality scene would experience an immersive artificial reality scene surrounding him and adjusting itself to the viewer's physical movements. It is to be understood that additional Holocam Orbs may be added to provide additional information from other FOVs to create an even greater encompassing (immersive) experience. Holocam orbs 6, 7, and 8 may communicate with computer (or computer system) 2 using wired or wireless communication, but are preferably linked by a wired, serial network communication system, as is explained more fully below.

The present discussion describes various aspects of the Holocam Orb System, and is divided into multiple sections. Each section details some aspects of the present system. For ease of discussion, a Holocam Orb may hereafter alternatively be termed an "Orb".

Each Holocam Orb, such as figuratively illustrated Orbs 6, 7 and 8 of FIG. 1, is an electronics and software device that uses multiple sensor data gathering devices to gather sensor data from a three dimensional area (or scene), processes and timestamps the data, and presents it to other devices (e.g. base station(s), computer system(s), or other Orbs) in a Holocam Orb System/Installation for further processing in real time. A Holocam Orb System is thus preferably comprised of multiple Holocam Orbs, each of which includes multiple sensor data gathering devices.

Examples of sensor data gathering devices include intensity image capture devices/units/systems (which may include 2D imaging devices such as RGB sensors and/or infrared image sensors), depth image capture devices/units/systems (i.e. 3D imaging/sensing devices/units/systems), and audio sensing devices/units/systems. Examples of a depth image capture device may include stereo imaging equipment (e.g. a 3D, or stereo, camera), a structured light 3D capture device/unit/system, and a time-of-flight capturing device/unit/system. A structured light 3D capture device/unit/system, such as a structured light 3D scanner or MICROSOFT CORP. KINECT® 1 sensor, projects a known pattern, such as bar lines or grids that are usually imperceptible to a human user, onto a scene, and determines depth and surface information by observing how the projected pattern is deformed on the scene. A time-of-flight capturing device/unit/system, such as a time-of-flight camera (TOF camera), resolves distances (depth and surface information) based on the known speed of light. A time-of-flight capturing device/unit/system, such as a 3D laser scanner, a MICROSOFT CORP. KINECT® 2 sensor, and a range camera, may use infrared sensors or laser sensors to obtain 3D depth information.

A Holocam Orb in accord with the present invention is not limited to the above-listed examples of depth image capture devices/units/systems, and may use any one, or any combination, of different depth image capture devices/units/systems (i.e. 3D imaging/sensing devices/units/systems). For example, a Holocam Orb may include stereo RGB camera system (or other intensity image capture device) and a structured light 3D capture device. Alternatively, a Holocam Orb may include a stereo RGB camera system and a time-of-flight capturing unit. As is explained more fully below, a stereo RGB camera system may be comprised of two, individual RGB cameras (each of which is an example of an intensity image capture device). A preferred example of a time-of-flight capturing unit is the time-of-flight camera (TOF camera), which determines distances to specific points in a scene by measuring the time-of-flight of a light signal between the time-of-flight camera and a subject for various points of an image. To resolve distances, a time-of-flight camera may use radio frequency (RF)-modulated light sources with phase detectors, range gated imagers, or direct time-of-flight imagers using lasers, for example. 3D cameras rely on correlating image data in a stereoscopic pair of 2D images to determine distance information. For the sake of completeness, before discussing a preferred construct of a Holocam Orb System, principles of stereo image capturing are first discussed.

An embodiment of the present invention makes use of a point cloud, which is a collection of points in three-dimensional space that generally define the surface of a 3D object. In a preferred embodiment, it is further desirable that the points of the 3D point cloud be correlated to individual points (e.g. pixels) on a captured image (or shape outline of the object within the captured image), such as a 2D image of an object in a scene.

As is mentioned above, a 3D image may be generated from a stereo pair of 2D images (i.e. a stereoscopic (or stereo) image pair). Each of the two 2D images in a stereoscopic image pair is produced by a respective one of two 2D imaging cameras spaced apart to provide two views (i.e. two fields-of-view, FOV, or angle views) of a common scene. By means of stereo constraints, point (or pixel) information of corresponding pixels in the two views is combined to create a perspective (i.e. 3D) view, which includes point cloud information. Thus, a point cloud generated from a stereoscopic image pair intrinsically includes a correlation between points of the point cloud and points (e.g. pixels or regions) in the two 2D images of the stereoscopic image pair. Consequently, for ease of implementation a preferred embodiment of the present invention makes use of a first point cloud generated from a stereo pair of 2D images, and further correlates points in this first point cloud to points in a second point cloud created with a time-of-flight capturing unit (or module). For the sake of completeness, therefore, a brief discussion of a stereo image pair (i.e. a stereoscopic image pair) is herein provided.

In order to extract 3D information from a stereoscopic image pair, one first needs to be able to identify commonly imaged items in the stereoscopic image pair. A common way to do this is to calibrate the two cameras, and to identify a known point of reference in a specific scene. A less restrictive approach would eliminate the need to calibrate the cameras to a specific scene. However, since both images of the stereoscopic image pair provide different views of the common scene, this can be a difficult task. One needs to recognize different views of common objects in two 2D image scenes, and to correlate specific parts of the common objects.

An integral part of object recognition is pattern matching. An essential component of pattern matching in images (and particularly in 2D images) is feature detection, which refers to identifying parts of an image, or individual feature points of an image (such as individual pixels), that are good candidates for investigation to determine if they might be part of a sought after object in an image.

Various techniques are known for identifying characteristic features in an image that may be used to describe an imaged scene. Characteristic features may include distinguishing shapes or sections-of-an-image or individual points (i.e. pixels) of an image. For ease of discussion, the present example is described as using feature points (which include individual pixels); with the understanding that other characteristic features (and methods of identifying characteristic features) may also be used without deviating from the present invention.

As an example of how characteristic features may be used, if one has a library of identifying features that describe an object (such as obtained from a collection of training images (i.e. image samples) of the target object, or object type), then one may search an input test image for those identifying features in an effort to determine if an example of the target object is present in the input test image. This concept may be extended to matching common features of a common scene in multiple digital images of the common scene taken from different view angles (i.e. different FOVs) to index (e.g. match or correlate) feature points (i.e. pixels) from one image to another. This permits the combined processing of the multiple digital images.

Figure 2:
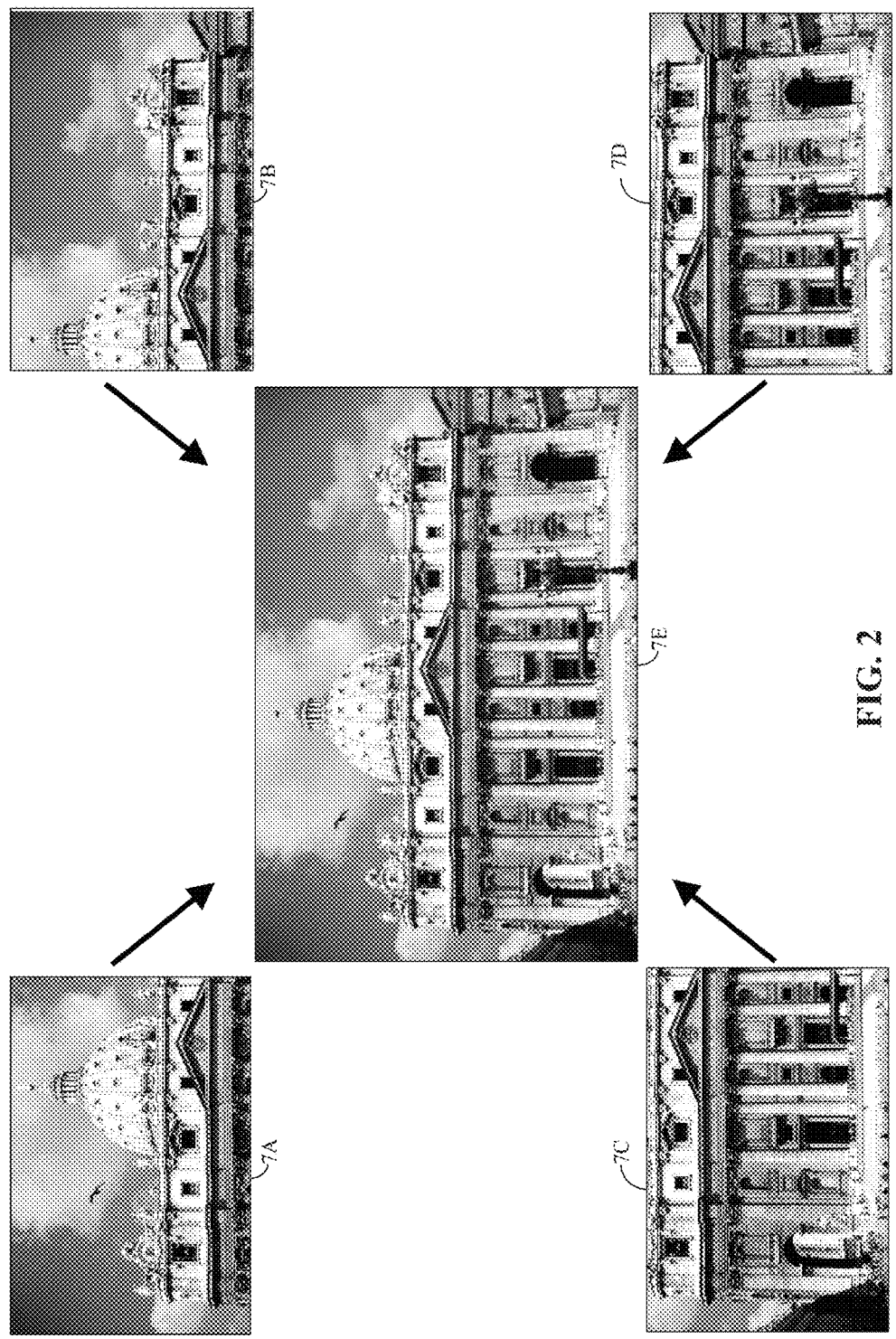
FIG. 2 illustrates the use of corresponding feature points in different images to stitch together the images to create a larger composite image.

For example in FIG. 2, images 7A, 7B, 7C and 7D provide partial, and overlapping, views of a building in a real-world scene, but none provide a full view of the entire building. By applying feature point detection and indexing (i.e. identifying matching pairs of) feature points in the four partial images 7A, 7B, 7C and 7D that correlate to the same real feature point in the real-world scene, it is possible to stitch together the four partial images (such as by applying an image stitching tool) to create one composite image 7E of the entire building. In the example of FIG. 2, the four partial images 7A, 7B, 7C and 7D are taken from a similar FOV (i.e. a frontal view), but this approach may be extended to the field of correspondence matching and applied to images taken from different FOV's.

Correspondence matching refers to the matching of objects or object features (or more typically the matching of feature points, such as individual pixels) common to two or more images. Correspondence matching tries to determine which parts of a first image correspond to (i.e. are matched to) what parts of a second image, assuming that the second image was taken after the camera that took the first image had moved, time had elapsed, and/or the captured subjects/objects had moved. For example, the first image may be of a real-world scene taken from a first view angle, defining a first field-of-view (i.e. FOV), and the second image may be of the same real-world scene taken from a second view angle defining a second FOV. Assuming that the first and second FOVs at least partially overlap, correspondence matching refers to the matching of common features points in the overlapped portions of the first and second images.

Assuming that a number of common image features, or objects or feature points, in two images taken from two view angles have been matched, epipolar geometry may then be used to identify a positional relationship between the matched image features to create a stereo view, or 3D reconstruction.

Epipolar geometry is basically the geometry of stereo vision. For example in FIG. 3, two cameras 11 and 13 create two 2D images 11A and 13A, respectively, of a common, real-world scene 18 consisting of a larger sphere 19 and a smaller sphere 21. 2D images 11A and 13A are taken from two distinct view angles 11C and 13C. Multiple view angles result in parallax (i.e. horizontal parallax and/or vertical parallax), and as is explained below, parallax can be a source of error for a Holocam Orb, but the preferred embodiment corrects for errors resulting from either/both horizontal or/and vertical parallax. However, the multiple view angles also make possible the use of epipolar geometry, which describes the geometric relations between points in 3D scene 18 (for example spheres 19 and 21) and their relative projections in 2D images 11A and 13A. These geometric relationships lead to constraints between the image points, which are the basis for epipolar constraints, or stereo constraints, described more fully below.

Figure 3:
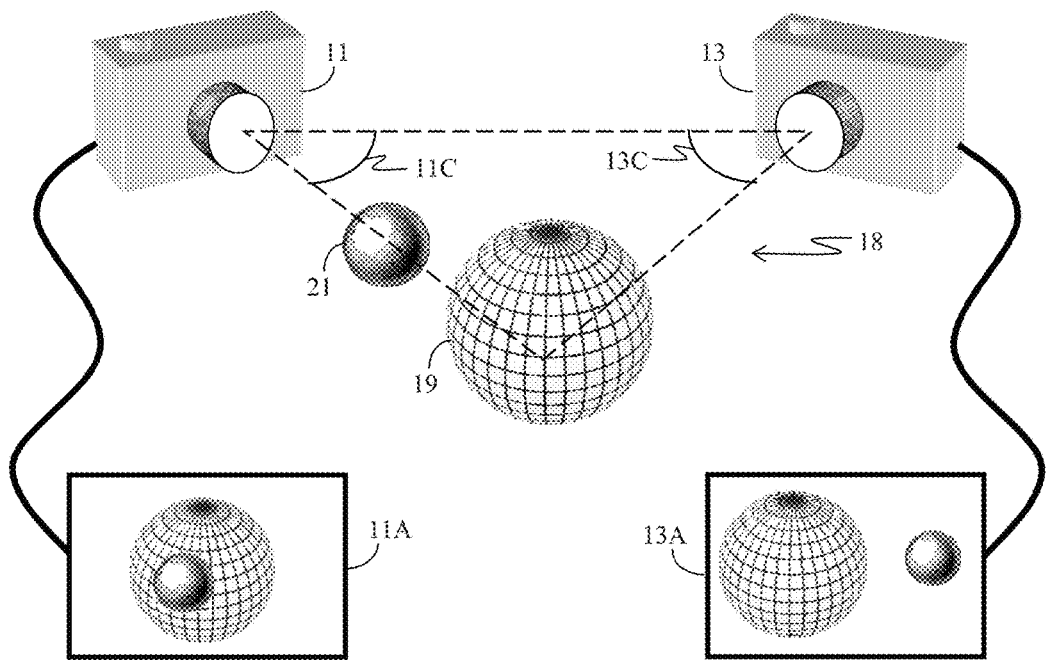
FIG. 3 illustrates principles of Epipolar geometry.

For ease of discussion, only horizontal parallax is addressed with reference to FIG. 3, but it is to be understood that the present discussion is similarly applicable to vertical parallax. Because of horizontal parallax, from the view point of camera 11, smaller sphere 21 appears to be in front of larger sphere 19 (as shown in 2D image 11A), but from the view point of camera 13, smaller sphere 21 appears to be some distance to a side of larger sphere 19 (as shown in 2D image 13A). Nonetheless, since both 2D images 11A and 13A are of the same real-world, 3D scene 18, both are truthful representations of the relative positions of larger sphere 19 and smaller sphere 21. The positional relationships between camera 11, camera 13, smaller sphere 21 and larger sphere 19 thus establish geometric constraints on 2D images 11A and 13A that permit one to reconstruct 3D scene 18 given only 2D images 11A and 13A, as long as the epipolar constraints (i.e. stereo constraints) are known.

Figure 4:
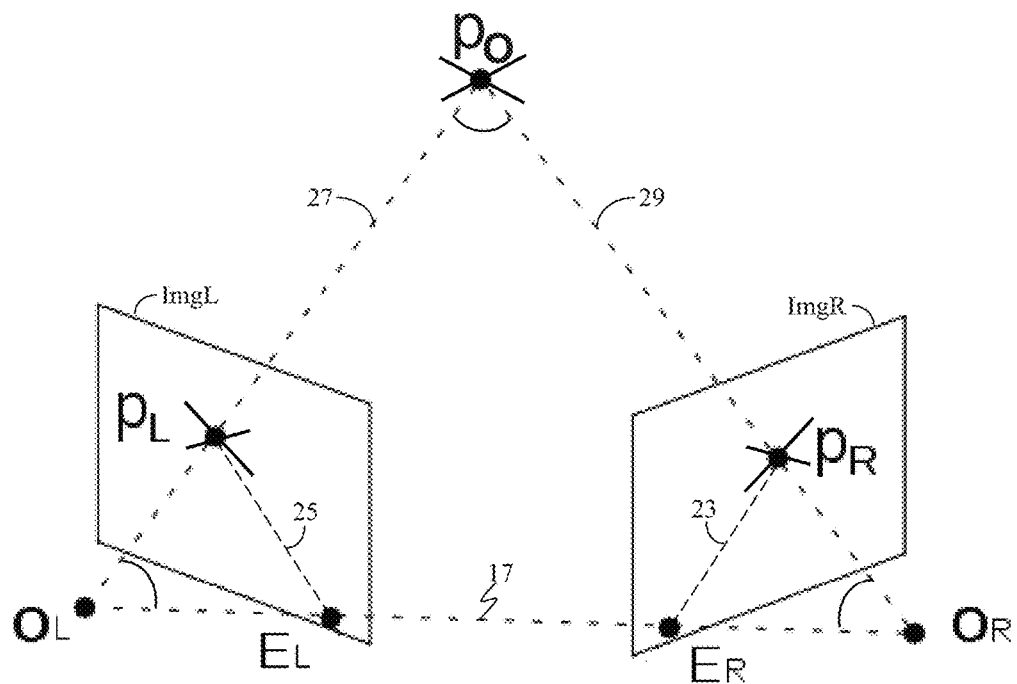
FIG. 4 is an example of defining stereo constraints using Epipolar geometry.

Epipolar geometry is based on the well-known pinhole camera model, a simplified representation of which is shown in FIG. 4. In the pinhole camera model, cameras are represented by a point, such as left point $O_L$ and right point $O_R$, at each respective camera's focal point. Point $P_O$ represents the point of interest (i.e. an object) in the 3D scene being imaged (i.e. captured), which in the present example is represented by two crisscrossed lines.

Typically, the image plane (i.e. the plane on which a 2D representation of the imaged 3D scene is captured) is behind a camera's focal point and is inverted. For ease of explanation, and to avoid the complications of an inverted captured image, two virtual image planes, ImgL and ImgR, are shown in front of their respective focal points, $O_L$ and $O_R$, to illustrate non-inverted representations of captured images. One may think of these virtual image planes as windows through which the 3D scene is being viewed. Point $P_L$ is the 2D projection of point $P_O$ onto left virtual image ImgL, and point $P_R$ is the 2D projection of point $P_O$ onto right virtual image ImgR. This conversion from 3D to 2D may be termed a perspective projection, or image projection, and is described by the pinhole camera model, as it is known in the art. It is common to model this projection operation by rays that emanate from a camera and pass through its focal point. Each modeled emanating ray would correspond to a single point in the captured image. In the present example, these emanating rays are indicated by dotted lines 27 and 29.

Epipolar geometry also defines the constraints relating the positions of each camera relative to each other. This may be done by means of the relative positions of focal points $O_L$ and $O_R$. The focal point of a first camera would project onto a distinct point on the image plane of a second camera, and vise-versa. In the present example, focal point $O_R$ projects onto image point $E_L$ on virtual image plane ImgL, and focal point $O_L$ projects onto image point $E_R$ on virtual image plane ImgR. Image points $E_L$ and $E_R$ are termed epipoles, or epipole points. The epipoles and the focal points they project from lie on a single line, i.e. line 17.

Line 27, from focal point $O_L$ to point $P_O$, is seen as a single point $P_L$ in virtual image plane ImgL, because point $P_O$ is directly in front of focal point $O_L$. This is similar to how in image 11A of FIG. 3, smaller sphere 21 appears to be in front of larger sphere 19. However, from focal point $O_R$, the same line 27 from $O_L$ to point $P_O$ is seen a displacement line 23 from image point $E_R$ to point $P_R$. This is similar to how in image 13A of FIG. 3, smaller sphere 21 appears to be displaced to a side of larger sphere 19. This displacement line 23 may be termed an epipolar line. Conversely from focal point $O_R$, line 29 is seen as a single point $P_R$ in virtual image plane ImgR, but from focal point $O_L$, line 29 is seen as displacement line, or epipolar line, 25 on virtual image plane ImgL.

Epipolar geometry thus forms the basis for triangulation. For example, assuming that the relative translation and rotation of cameras $O_R$ and $O_L$ are known, if projection point $P_L$ on left virtual image plane ImgL is known, then the epipolar line 23 on the right virtual image plane ImgR is known by epipolar geometry. Furthermore, point $P_O$ must projects onto the right virtual image plane ImgR at a point $P_R$ that lies on this specific epipolar line, 23. Essentially, for each point observed in one image plane, the same point must be observed in another image plane on a known epipolar line. This provides an epipolar constraint that corresponding image points on different image planes must satisfy.

Another epipolar constraint may be defined as follows. If projection points $P_L$ and $P_R$ are known, their corresponding projection lines 27 and 29 are also known. Furthermore, if projection points $P_L$ and $P_R$ correspond to the same 3D point $P_O$, then their projection lines 27 and 29 must intersect precisely at 3D point $P_O$. This means that the three dimensional position of 3D point $P_O$ can be calculated from the 2D coordinates of the two projection points $P_L$ and $P_R$. This process is called triangulation.

Figure 5:
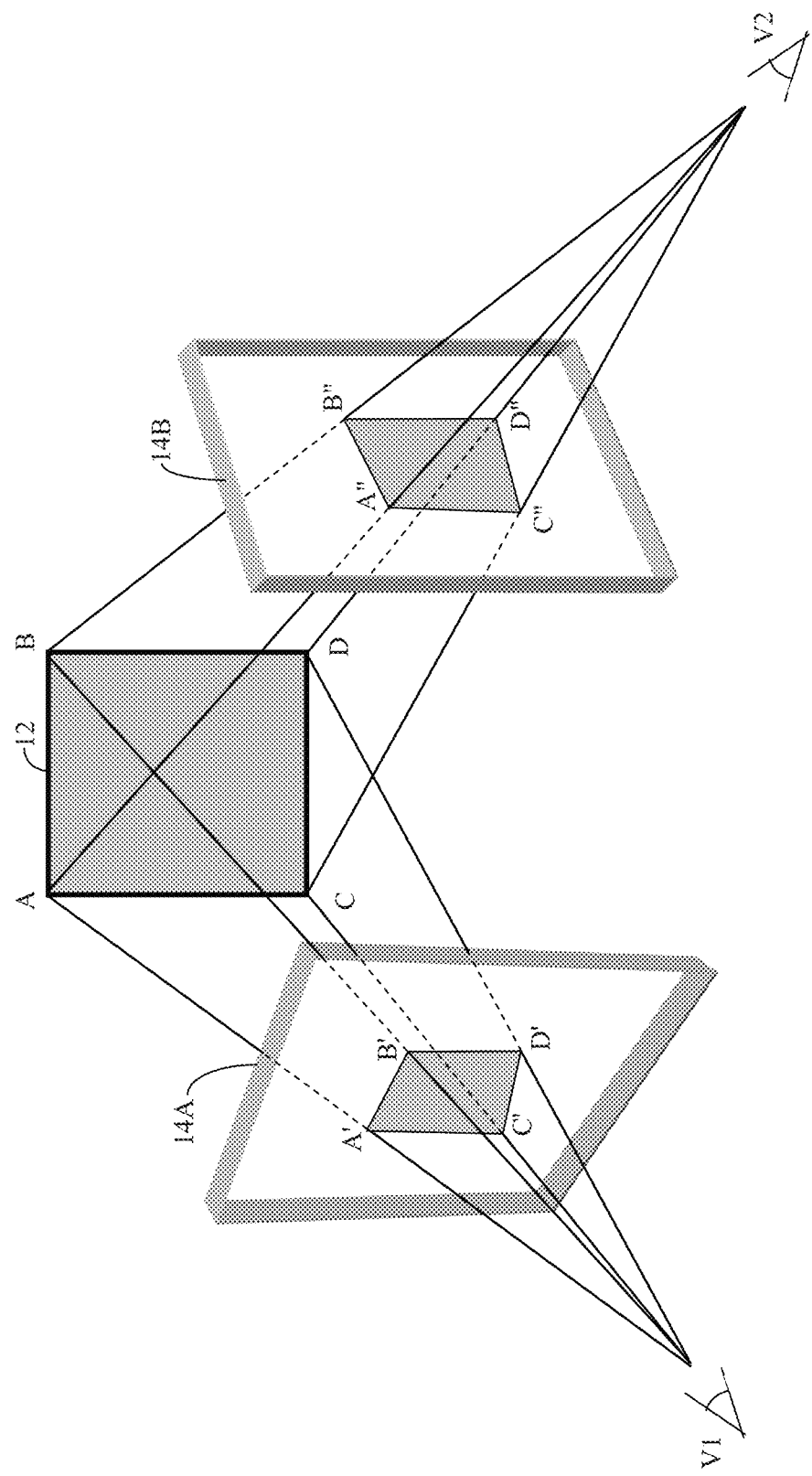
FIG. 5 illustrates the establishment of homography constraints from stereo constraints.

Epipolar geometry also forms the basis for homography, i.e. projective transformation. Homography describes what happens to the perceived positions of observed objects when the point of view of the observer changes. An example of this is illustrated in FIG. 5, where the shape of a square 12 is shown distorted in two image projections 14A and 14B as viewed from two different points of view V1 and V2, respectively. Like before, image planes 14A and 14B may be thought of as windows through which the square 12 is viewed.

Homography identifies points in common between image projections 14A and 14B and square 12 (i.e. point registration). For example, the four corners A, B, C and D of square 12 correspond respectively to points A', B', C' and D' in image projection 14A, and correspond respectively to points A'', B'', C'' and D'' in image projection 14B. Thus, points A', B', C' and D' in image projection 14A correspond respectively to points A'', B'', C'' and D'' in image projection 14B.

Assuming that the pinhole model applies, epipolar geometry permits homography to relate any two images of the same planar surface in space, which permits image rectification, image registration, or computation of camera motion (rotation and translation) between two images. Once camera rotation and translation have been extracted from an estimated homography matrix, this information may be used for navigation, or to insert models of 3D objects into an image or video, so that they are rendered with the correct perspective and appear to have been part of the original scene.

Figure 6:
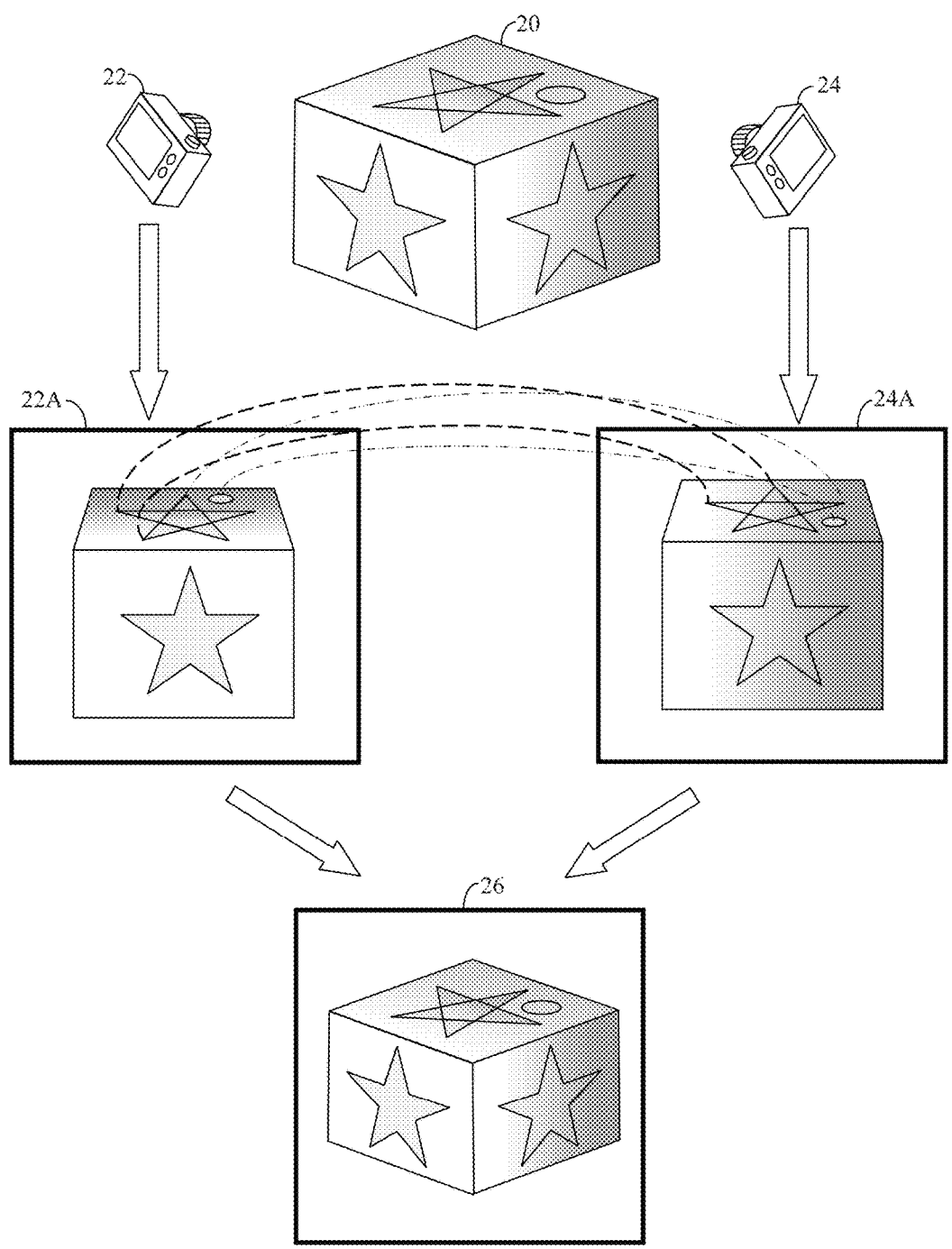
FIG. 6 illustrates homography to re-establish a perspective (i.e. 3D) view from a stereo pair of images, which are images of a common scene but each image has a different field-of-view, i.e. FOV.

For example in FIG. 6, cameras 22 and 24 each take a picture of a real-world scene including a cube 20 from different points of view. From the view point of camera 22, cube 20 looks as shown in 2D image 22A, and from the view point of camera 24, cube 20 looks as shown in 2D image 24A. Homography permits one to identify correlating points, some of which are shown by dotted lines for illustration purposes. This permits both 2D images 22A and 24A to be stitched together to create a 3D image, as shown in image 26. Thus, automatically finding correspondence between pairs of images is the classic problem of stereo vision. Integral to this, however, is the identifying of feature points in the pairs of images, and the matching of corresponding feature points in the pairs of images.

The above discussion of stereo vision, such as epipolar geometry and homography, may be collectively referred to as perspective constraints, particularly as applied to a stereo image pair.

Because of their use in establishing perspective (i.e. 3D) information, feature based correspondence matching algorithms have found wide application in computer vision. Examples of feature based correspondence matching algorithms are the "speeded up robust features" (SURF), "gradient location and orientation histogram" (GLOH), histogram of oriented gradients (HOG), Harris affine region detector, scale-invariant feature transform, SIFT, and the affine SIFT (or ASIFT). For the sake of illustration, the SIFT transformed is herein described briefly. It is noted, however, that feature based correspondence matching algorithms such as SIFT and Affine SIFT, purposely exclude edge points from their analysis and thus are not well suited for edge detection.

As it is known in the art, the SIFT algorithm scans an image and identifies points of interest, or feature points, which may be individual pixels, and describes them sufficiently (typically relative to their neighboring pixels within a surrounding pixel window of predefined size) so that the same feature point (or pixel) may be individually identified in another image. A discussion of the SIFT transform is provided in U.S. Pat. No. 6,711,293 to Lowe, which is herein incorporated in its entirety by reference. Essentially, SIFT uses a library of training images to identify feature points that are characteristic of a specific object. Once a library of the object's characteristic feature points (e.g. pixels) have been identified, the feature points can be used to determine if an instance of the object is found in a newly received test image. Another example of feature point extraction is the Oriented FAST and Rotated BRIEF (ORB) technique, as describe in "ORB: an efficient alternative to SIFT or SURF" by Rublee et al. *International Conference on Computer Vision,* 2011, which is also incorporated herein in its entirety by reference.

Irrespective of the type of feature point extraction technique used, feature points (i.e. points of interest) are extracted to identify pixels in multiple different images that correspond to the same real-world point in a scene. They may also be used to identify a specific object by extracting feature points of the object in a set of training images to generate a "feature description" of the specific object. This feature description can then be used to identify the specific object in a test image containing many object-types. To perform reliable recognition, it is preferred that the features extracted from the training images be detectable under changes in image scale, noise, illumination, and rotation. Feature points usually lie near high-contrast regions of an image. However, since distortion of an object (such as if a feature points is located in an articulated or flexible parts of the object) may alter a feature point's description relative to its neighboring pixels, changes to an object's internal geometry may introduce errors. To compensate for these errors, SIFT typically detects and uses a large number of feature points so that the effects of errors contributed by these local variations may be reduced.

In a typical SIFT application, feature points of objects are first extracted from a set of training images and stored in a database. An object is recognized in a new image (i.e. a test image) by individually comparing each feature point extracted from the new image with the feature points in this database and finding candidate matching features based on Euclidean distance of their feature point vectors. From the full set of matches, subsets of feature points that agree on the object and its location, scale, and orientation in the new image are identified to filter out good matches. Consistent clusters of good matches are then identified. Typically, each cluster of three or more features that agree on an object and its pose is then subject to further detailed model verification and subsequently outliers are discarded. Finally the probability that a particular set of features indicates the presence of a specific object is computed, given the accuracy of fit and number of probable false matches. Object matches that pass all these tests can be identified as correct.

Figure 7:
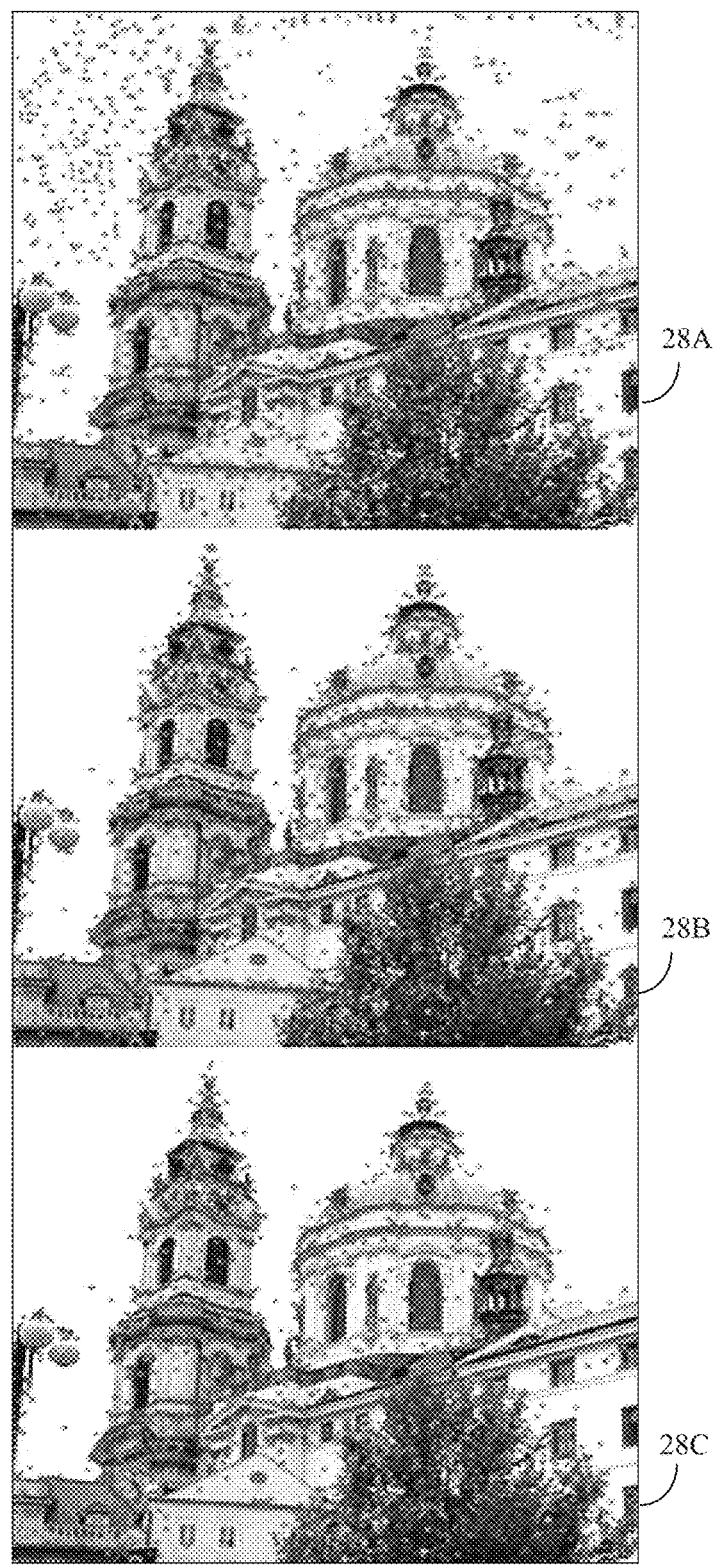
FIG. 7 illustrates feature point extraction from a sample image.

An example of a SIFT determination of feature points in an image is illustrated in FIG. 7. Possible feature points are first identified, as indicated by dark dots in image 28A. Possible feature points that have a low contrast are then discarded, as illustrate in image 28B. Finally, possible features points located on edges are removed, which leaves the final set of feature points shown in image 28C.

Figure 8:
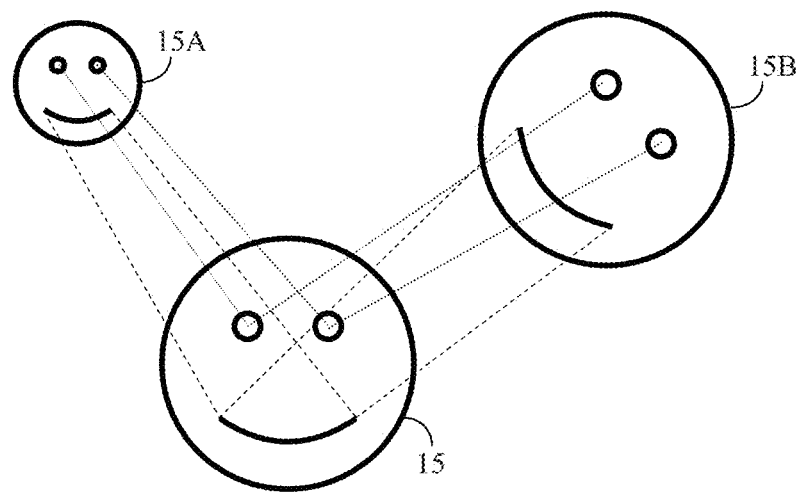
FIG. 8 illustrates the establishment of feature point correspondence using an SIFT transform.

Thus, SIFT permits one to match feature points of an identified object from one image to another. This is illustrated in FIG. 8, where three images of the same object, i.e. a happy face, are shown. For illustration purposes, only four feature points, corresponding to points near the eyes and the corners of the mouth, are shown. As indicated in FIG. 8, SIFT can match feature points from a first face 15 to a scaled down version 15A of the same face. SIFT can also match feature points from first face 15 to a rotated version 15B of the same face. However, SIFT has been found to have limited immunity to affine transforms of images. That is, SIFT is limited to the amount of change in the view-angle an imaged object can undergo and still be identified.

A method of extending a SIFT transform to better handle affine transformations is described in "ASIFT: A New Framework for Fully Affine Invariant Image Comparison" by Morel et al, SIAM Journal on Imaging Sciences, vol. 2, issue 2, 2009, which is herein incorporated in its entirety by reference.

Figure 9:
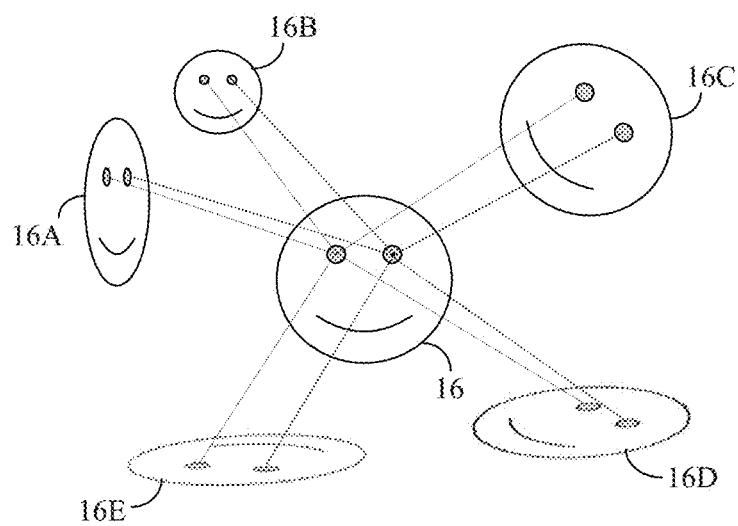
FIG. 9 illustrates the establishment of feature point correspondence using an ASIFT transform.

With reference to FIG. 9, an Affine SIFT would be better able to match feature points from second face 16, to representations of the same object that have undergone affine transformations, as illustrated by happy faces 16A, 16B, 16C, 16D, and 16E.

Figure 10:
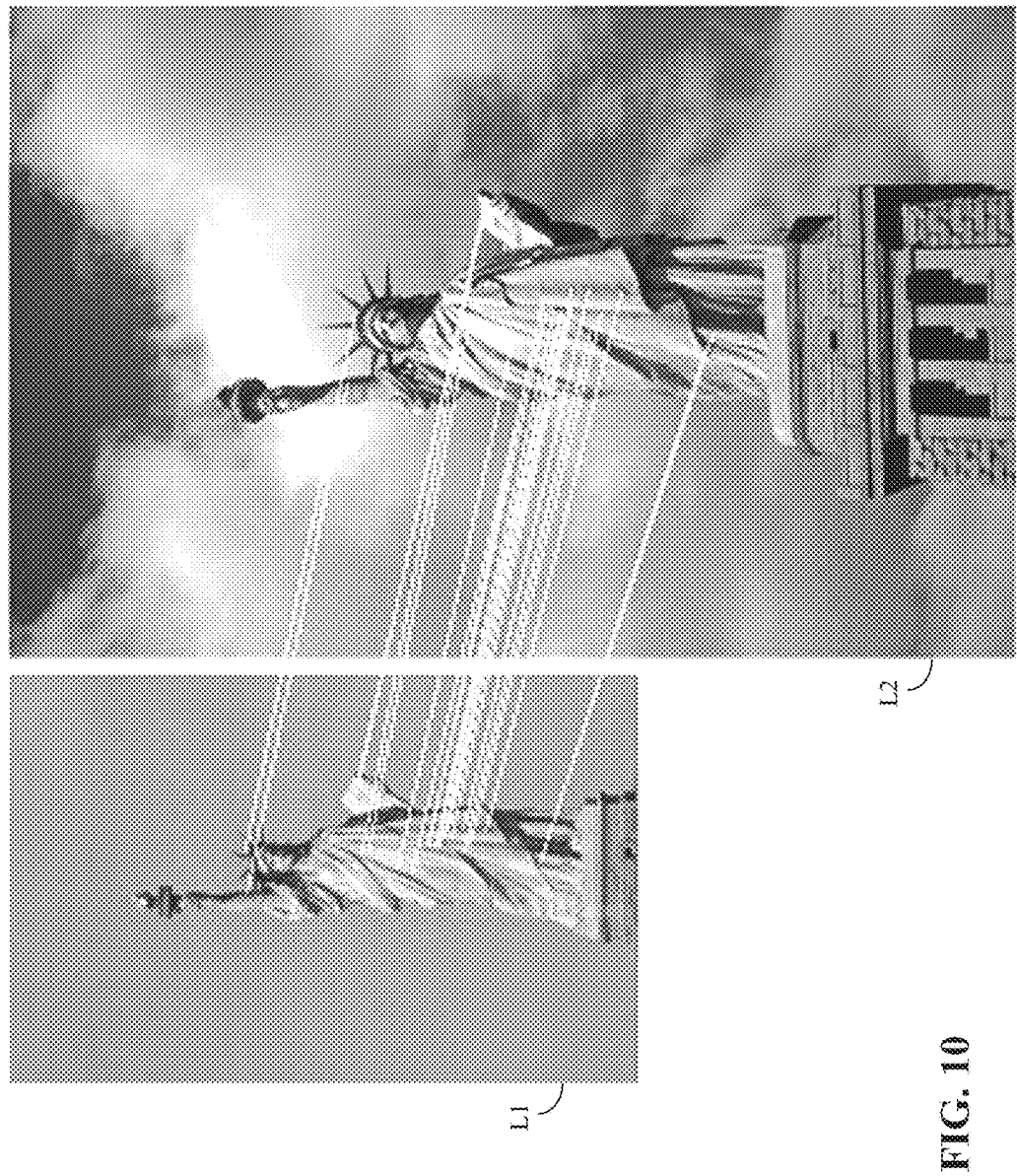
FIG. 10 is an example of feature point correspondence in two images of a common scene, taken from different field-of-views, i.e. FOVs.

An example of an application of an Affine SIFT transform is illustrated in FIG. 10, where multiple feature points are matched from a first sample image L1 of the Stature of Liberty from a first view angle, to a second sample image L2 of the Statue of Liberty from a different view angle and at a different scale.

A quick overview of the feature point extraction function of a SIFT filter/algorithm/module/processor is illustrated in FIGS. 11 and 12. FIG. 11 illustrates the extraction of one image feature point IMG1_FP1 from a sample image IMG1, which is comprised of a plurality of pixels (not shown). Each extracted feature point (such as those illustrated in FIG. 6-10) is described by a series of metrics falling into several categories, i.e. distinguishing characteristics, within a window (an array of pixels, such as represented by Window_1). The center point (or center pixel IMG1_FP1) within a window (Window_1) may be identified as the feature point for that window. If desired, each feature point is assigned an identification code (or label) for quick reference. For example, feature point label IMG1_FP1 may identify the feature point as being feature point number "1" extracted from image "IMG1".

The observed metrics of each feature point are preferably arranged into corresponding histograms, and thus multiple histograms are created for each feature window. Consequently, a typical SIFT processing algorithm creates a series (or set) of SIFT histograms HSet_1 for each feature point. Therefore, each set of histograms (e.g. HSet_1) collectively describes its associated feature point (or SIFT descriptor). Each of the SIFT histograms statistically describes a distinguishing characteristic of the feature point relative to its neighborhood of pixels (or pixel window) surrounding the feature point (or item descriptor or feature pixel) in the image being processed.

The series of SIFT histograms in a set (HSet_1) are then collected (or otherwise combined) into single vector Vect_1, which defines one feature point. That is, each vector Vec_1 provides sufficient data to identifying an individual pixel (or feature point) within an image. Therefore, each vector Vect_1 describes a single item descriptor (i.e. a feature point or characteristic feature or feature pixel), such as IMG1_FP1, and typically consists of 128 pieces of descriptive data. Thus, each feature point is characterized (described or identified) by a 128-dimensioned vector Vect_1. That is, each SIFT feature point may be a 128-bit vector (or binary sequence).

FIG. 12 illustrates multiple sets of feature points extracted from n images, where the images are identified as IMG1 through IMGn. Each image is shown to have a set of feature points (illustrated as circles) individually identified. For example, i feature points are extracted from image IMG1, and they are labeled IMG1_FP1 through IMG1_FPi. Similarly, p feature points are extracted from image IMGn, and they are labeled IMGn_FP1 through IMGn_FPp. Each feature point is a 128-dimension vector (i.e. a vector with 128 data cells). The extracted feature points from one image may then be matched to (i.e. compared to find a match with) extracted feature points from other images.

The Holocam Orb System

Returning now to the Holocam Orb System, the following section describes a preferred Holocam Orb system implementation used for gathering time-aligned, real time sensor data from multiple viewpoints of a live, three dimensional scene.

It is beneficial for some applications that data gathered from a particular viewpoint be tightly correlated in the time domain in real time. To achieve this, a bundling of various electronic sensor types into a discrete unit, herein termed a Holocam Orb, is proposed. Preferably, a single high performance custom logic module (e.g. circuit module, or circuit board) within each Orb processes data from all its sensors and provides an accurate time stamp with the data. The benefit of this configuration is that the various types of sensor data from a particular viewpoint can be tightly correlated in both 3D space and in the time domain.

Details of an Exemplary Holocam Orb

Figure 13:
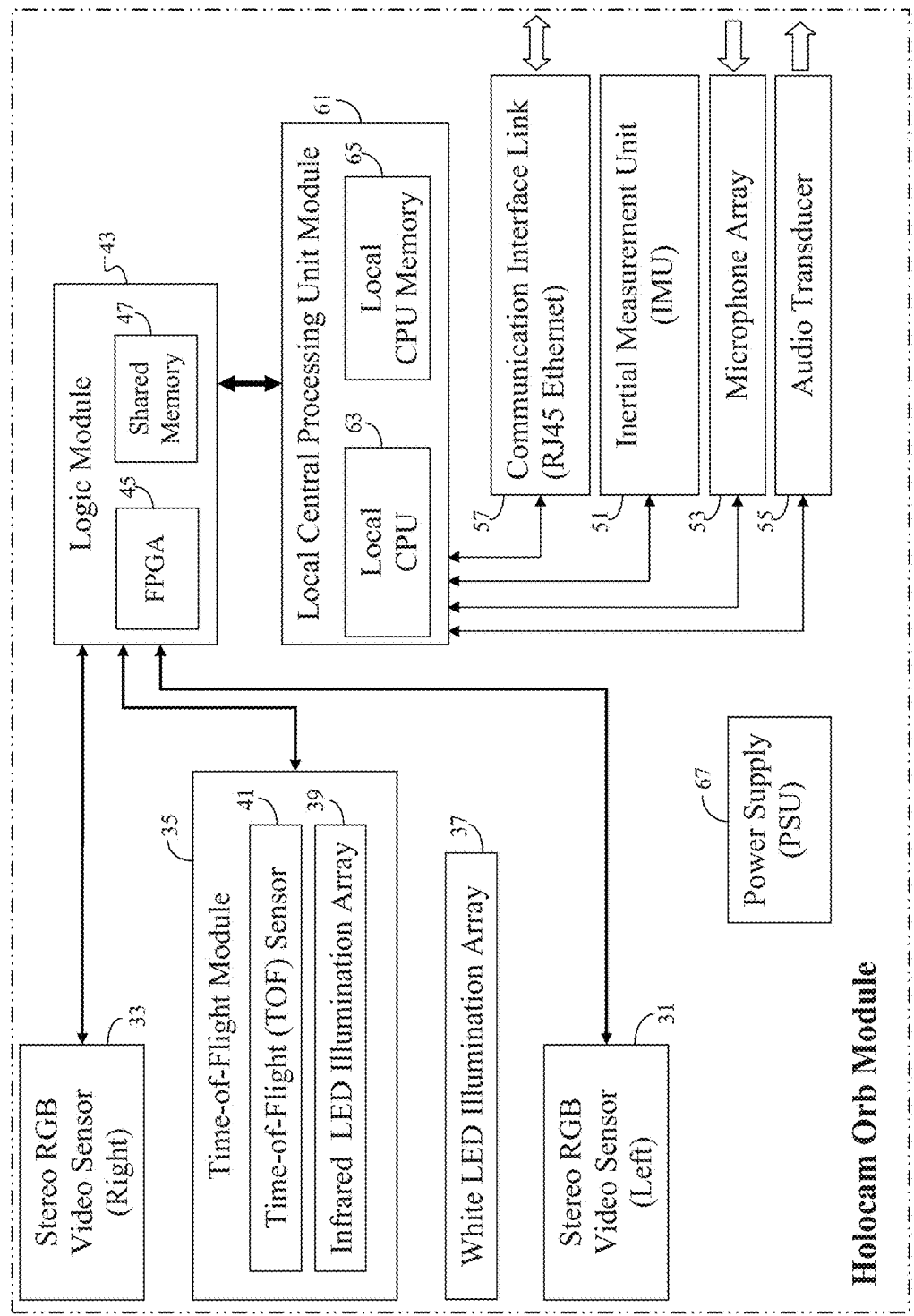
FIG. 13 is a simplified block diagram of internal components of an exemplary Holocam Orb (or Holocam Orb Module) of FIG. 1.

With reference to FIG. 13, a Holocam Orb (or Holocam Orb Module) is a collection of a number of data sensors packaged together in an integral unit. For example, a preferred Holocam Orb includes a stereo image sensor, such as a stereo still-image (capture) sensor or a stereo video (capture) sensor. The presently preferred embodiment uses a stereo video sensor comprised of a pair of video sensors 31 and 33. That is, video sensor 31 is a left video sensor (e.g. a two-dimensional (2D) video camera) and video sensor 33 is a right video sensor (e.g. 2D video camera), and they are preferably spaced apart a distance representative of a typical distance between left and right eyes of an adult person so as to provide images that represent what would be viewed by the person's left and right eyes. This permits the Holocam Orb to reproduced stereo vision. Preferably, a white LED (light emitting diode) illumination array 37 is integrated within the Holocam Orb to provide illumination for the left and right video sensors 31 and 33. As shown, each video sensor 33 and 35 is preferably an RGB (i.e. color) video sensor.

Preferably positioned between left and right video sensors 31 and 33, is a time-of-flight module 35, which includes at least one (and preferably 4) time-of-flight (TOF) sensor(s) 41 and an infrared LED illumination array 39. As it is known in the art, a TOF sensor 41 is a range sensing, or imaging, device (e.g. camera system or laser system) that resolves distances from the TOF sensor 41 to points (i.e. subjects) in a scene by using the known speed of light and the measured time-of-flight of IR signals from infrared LED illumination array 39 to points in the scene and back to TOF sensor 41. Preferably, the Holocam Orb identifies and associates the time-of-flight points provided by TOF sensor 41 with corresponding image pixels provided by left and right video sensors 31 and 33. All sensors are in communication with a Logic Module 43.

Logic Module 43 may provide custom logic to process the data from all sensors, e.g. time-of-flight module 35 and left and right video sensors 31 and 33, and may further provide a time stamp for the gathered data. Preferably, Logic Module 43 is comprised of a field programmable gate array (FPGA) 45 and FPGA Shared Memory 47. It is to be understood that FPGA Shared Memory 47 may be internal to FPGA 45, or may be a discrete memory module. Further preferably, data gathered by left video sensor 31, right video sensor 33, and TOF sensor 41 are stored within FPGA Shared Memory 47. It is also to be understood that other custom logic circuitry, such as an application specific integrated circuit (ASIC), may be used in place of FPGA 45. Further alternatively, the functions of FPGA 45 may be implemented in a central processing unit (CPU) or other data processing device.

The Holocam Orb further includes an inertial measurement unit (IMU) 51. Generally, an inertial measurement unit (IMU) is an electronic device that measures velocity, orientation, and gravitational forces using a combination of accelerometers and gyroscopes, and sometimes also magnetometers.

A microphone array 53 is provided to record sound from the scene being observed. Preferably, the microphones of microphone array 53 are positioned to pickup surround sound from the scene. Also preferably provided is an output audio (sound) transducer 55 to provide an audio (e.g. audible or sound) output for the Holocam Orb.

Communication interface (or communication interface link) 57 provides a communication link between the Holocam Orb and a central computing system (such as computer system 2 of FIG. 1) and/or other Holocam Orbs. Communication interface 57 may support a standard RJ45 Ethernet connection, and preferably supports standard (Ethernet) network interface controller (NIC) functions. Although wireless communication may be used, the presently preferred embodiment uses wired communication, and preferably uses standard Ethernet network (e.g. computer network) communications, such as Gigabit Ethernet.

All of the above components are linked (directly or indirectly) to a local central processing unit module 61, which includes a local central processing unit (Local CPU) 63 and Local CPU memory 65.

The Holocam Orb further includes a power supply unit (PSU) 67, whose power is preferably distributed to all components of the Holocam Orb. It is to be understood that various power conversions may be provided in the distribution of power from PSU 67 to the components of the Holocam Orb. For example, PSU 67 is preferably a switching power supply and sequence controller, and it may be used to produce a linear power supply within each of left video sensor 31 (linear power supply 48A in FIG. 14), right video sensor 33 (linear power supply 48B in FIG. 14), and time-of-flight module 35 (linear power supply 48C in FIG. 14).

Figure 14:
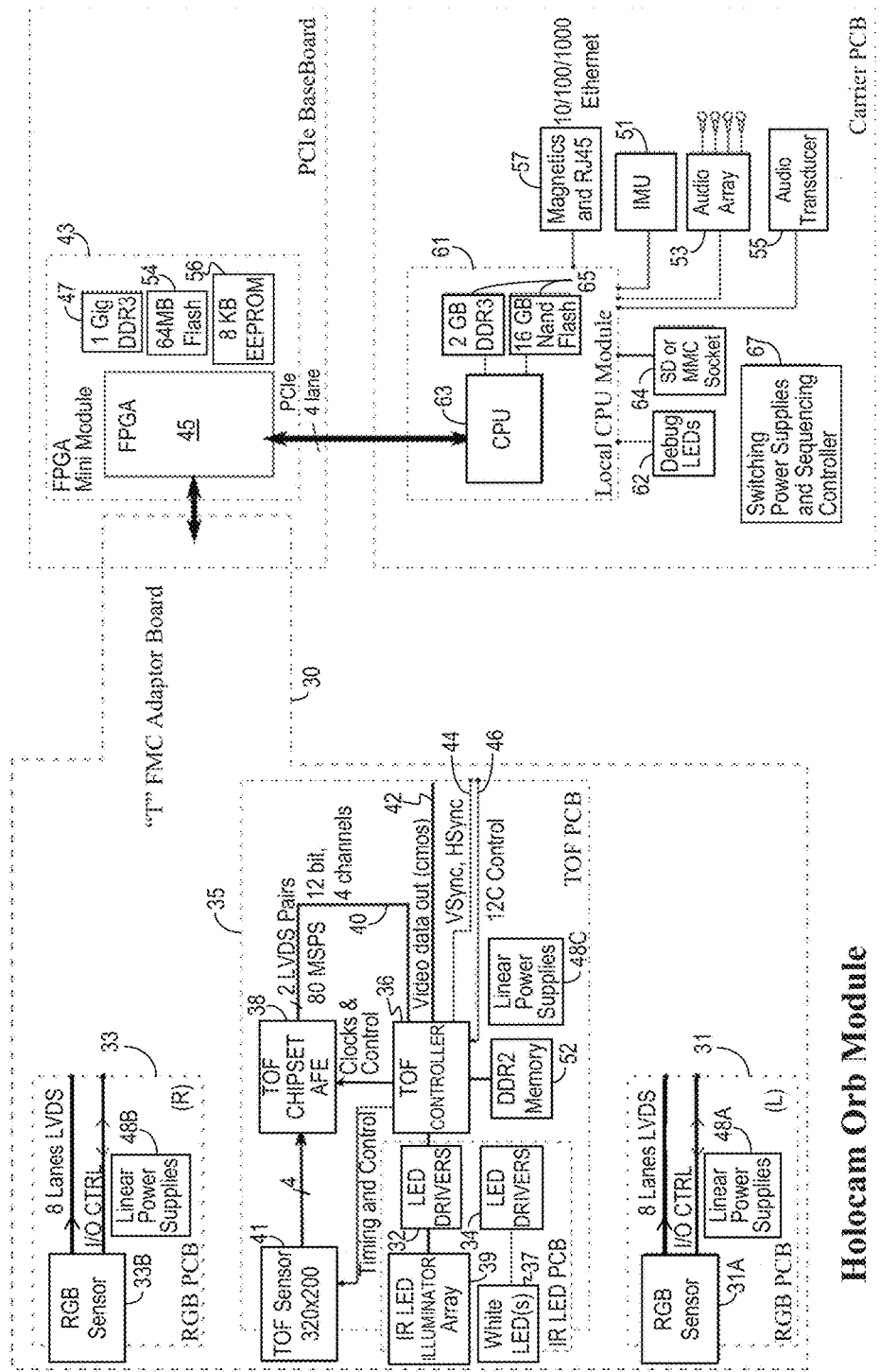
FIG. 14 is a more detailed circuit board-level description of the internal construct of the exemplary Holocam Orb Module of FIG. 13.

FIG. 14 provides a more detailed, circuit board-level view of the block diagram of FIG. 13. All elements in FIG. 14 similar to those in FIG. 13 are identified by similar reference characters, and are described above.

As is explained above, a Holocam Orb (or Holocam Orb Module) may include some, or all, of (and is not limited to) the following types of data sensors: left and right stereo video sensors 31 and 33, time-of-flight (TOF) module 35 (including TOF sensor 41 and IR LED array 39), inertial measurement unit (IMU) 51, microphone (or audio) array 53, and audio transducer 55.

Logic module 43 is preferably implemented as a Xilinx® Zynq FPGA Mini Module Plus board on a PCIe BaseBoard, such as the Xilinx® MMB PCIe BaseBoard. In an exemplary embodiment, FGPA 45 may be implanted as a Zynq Xilinx® FPGA. In the present example, FPGA Shared Memory 47 is preferably fast volatile memory, and preferably implemented as double data rate, type three, (DDR3) synchronous dynamic random-access memory (SDRAM). FPGA module 43 may have additional (preferably nonvolatile) memory, such as flash memory 54 and/or Electrically Erasable Programmable Read-Only Memory (EEPROM) memory 56.

Local central processing unit module 61 may be implemented using a T30 Tegra® 3 Module provided by NVIDIA® Corp. In this case, Local CPU 63 may be an A9 ARM Tegra® 3 SOC (system-on-Chip). Local CPU 63 may communicate with FPGA 45 using a 4-lane PCIe bus.

In the present example, Local CPU 63 and Local CPU memory 65) reside on a carrier PCB (printed circuit board), such as the EPSON® P2.5 Carrier PCB. Also on the carrier PCB are communication interface link 57 (which may include magnetics and RJ45), PSU 67, IMU 51, audio array 53, and audio transducer 55.

The system is designed such that other sensor types (or components) can be added to the Holocam Orb. It is be understood that the present invention is not limited to the simplified architecture of FIG. 13, and other components or sensors may be added without deviating from the present invention.

For example in FIG. 14, local central processing unit module 61 may additionally have one or more debug light emitting diodes (LEDs) 62 to visually convey information, such as error codes, to a human user. Memory capacity may also be augmented by the use of an optional memory socket 64 to receive additional memory modules/cards/chips, such as a secure digital (SD) memory card or a Multi-Media Card (MMC), or other (preferably nonvolatile) memory.

In the present example, the remaining sensors reside on an FPGA Mezzanine Card (i.e. FMC Adapter Board 30). As it is known in the art, an FMC Adapter Board is an ANSI standard that provides a standard mezzanine card form factor, connectors, and modular interface to an FPGA located on a base board. The presently preferred embodiment uses a BASE T FMC Adapter, such as the EPSON® "T" FMC Adapter Board. As it is known in the art, the "BASE" designation denotes that baseband transmission is used, and the "T" designates twisted pair cable, where the pair of wires for each signal is twisted together to reduce radio frequency interference and crosstalk between pairs.

It is further to be understood that additional support circuitry may be added without deviating from the present invention. For Example within TOF module 35, LED drivers 32 and 34 may be added to help drive infrared LED illumination array 39 and white LED illumination array 37, respectfully. Similarly, a TOF controller 36, such as the TI OPT9220 from Texas Instruments®, may be used to control components within TOF module 35, including an Analog Front-End (AFE) TOF Chipset 38 used to read sensor results from TOF sensor(s) 41. AFE module 38 (i.e. TOF Chipset AFE 38) may be implemented, for example, as Texas Instruments® commercial AFE product VSP5324. Preferably, AFE module 38 has four inputs to read four time-of-flight outputs from TOF sensor 41 (i.e. TOF sensor 41 may be comprised of multiple (preferably 4) individual TOF sensors each providing a separate input to AFE module 38). For each TOF sensor input, AFE module 38 may provide a sample-and-hold circuit that rejects common-mode noise among the inputs, a high speed 12-bit analog-to-digital converter (ADC) digitizes each input, and delivers the acquired time-of-flight data serially over low voltage differential signaling (LVDS) channels 40 to TOF controller 36. Controller 36 may then output video data 42, VSync and HSync signals 44, and other control signals 46 to Logic Module (i.e. FPGA module) 43. Optionally, TOF controller 36 may be provided with additional RAM memory 52, preferably implemented as DDR2 memory.

Left RGB sensor (e.g. color video sensor) 31A is shown within left video sensor block/module/circuit 31 and a right RGB sensor (e.g. color video sensor) 33B is shown within right video sensor block 33. For the sake of simplicity, the terms "RGB sensor" and "video sensor" may be used interchangeably hereinafter. RGB sensors 31A and 33A may each be implemented using commercial product OV16820 from OmniVision®.

Data from the sensors on FMC Adapter Board 30 flow into Logic Module 43, where it is processed by FPGA 45 and stored in the FPGA Shared Memory 47. Preferably, the FPGA 45 is a Xilinx® Zynq FPGA Mini Module Plus unit. The FPGA 45 timestamps the gathered data, and then informs the Local CPU 63 that a bundle of sensor data is ready for collection. The Local CPU 63 fetches the data from FPGA Shared Memory 47, further processes and packages it, and forwards the sensor data to other Holocam Orbs and/or to an external base station, such as computer system 2 of FIG. 1.

The Logic Module 43 offers a programmable logic core that can be adapted to various sensor types, and it connects to each sensor interface(s). FPGA 45 further implements a command and control path interface from the Local CPU 63 to each sensor. Additionally, FPGA 45 implements a data capture path to gather sensor data and temporarily store it in FPGA Shared Memory 47, and further implements a real time clock and timestamps each sensor data stream. FPGA 45 also implements a data path from the FPGA Shared Memory 47 to the Local CPU memory 65.

The Local CPU 63 receives command and control data from other Holocam Orbs and/or a base station (such as computer system 2 of FIG. 1). Local CPU 63 also issues command and control commands to the local sensors via Logic Module interface 43. Local CPU 63 also fetches sensor data from the FPGA Shared Memory 47, processes and packages the sensor data in its Local CPU Memory 65, and forwards the packaged sensor data to the central base station 2.

Each of RGB Video Sensors (RGB) 31/33 gathers visible light images multiple times per second.

Time-of-flight Sensor (TOF) 33 gathers a two dimensional array of distance data from objects in its field-of-view to the Holocam Orb.

Inertial Measurement Unit (IMU) 51 provides multiple dimensions of accelerometers, several times per second.

Microphone Array 53 provides multiple parallel streams of digital audio samples from acoustic sensors mounted in the Holocam Orb.

FPGA Shared Memory 47 provides multiple buffers of storage for each attached sensor (i.e. 31, 33 and 41). FPGA Shared Memory 47 is used to store and forward operations of the sensor data for the Local CPU 63 to access.

Local CPU Memory 65 provides multiple buffers of storage for the local sensor data which has been gathered from the FPGA Shared Memory 47, and offers access to remote devices who request it.

Power Supply Unit (PSU) 67 provides required power sources for the multiple electronics components present in the Holocam Orb.

Inter-Orb Synchronization

The present section discusses a method for synchronizing multiple Holocam Orbs to a master clock. Thus, this section describes methods used to synchronize multiple real time data gathering modules, i.e. Holocam Orbs, to a master clock, so that all the gathered data (such as from the internal sensors of each individual Holocam Orb) can be correlated in the time domain.

Certain applications require that all data gathered from all Holocam Orbs in a scene be synchronized to a master clock, so that data can be time stamped and time aligned in real time by processing nodes in the system, including an optional base station, such as computer system 2 of FIG. 1, for example. As well, it is preferred that all sensor data streams be capable of starting at the exact same time. This section describes a preferred methodology to synchronize the timestamp clocks and sensor streams of each Holocam Orb with an improved low latency and low jitter result.

The presently preferred system uses a linked system of timing logic that allows all sensors (of multiple Holocam Orbs) in a Holocam Orb system installation to be synchronized together to a high level of precision, as an extension to techniques found in the IEEE 1588 Precision Time Protocol Ethernet standard, herein incorporated in its entirety by reference. The present method allows sensor data gathering from all Orbs in a Holocam Orb system installation to all start up at the exact same clock time, to the level of precision offered by the subcomponents contained in the Holocam Orb synchronization electronics.

The following is a detailed discussion of the preferred timing logic system used in the present Holocam Orb system. Sub-components described in this discussion are implemented in each Holocam Orb to achieve the desired low latency and low jitter results.

A distributed clocking system is implemented using the following (timing logic) subcomponents in each Holocam Orb. Each Orb preferably includes a high quality crystal oscillator used as a (local) clock reference (i.e. local Reference Oscillator) for its local Logic Module 43. Also included is a local custom Timestamp Clock implemented in the Logic Module 43, and derived from the clock reference, or local Reference Oscillator, mentioned above. A local synchronization pulse (e.g. local VSync) is derived from the same clock reference, and is controlled by a frame rate value register.

The Local CPU Module 61 in a respective Orb implements an IEEE 1588 PTP Local Reference Time Counter at the local Ethernet communications interface. 1588 Precision Time Protocol (PTP) messages are used to tightly align all the Orb timestamp clocks together to a designated 1588 Master Clock, which may be the computer system 2 of FIG. 1, any of the Orbs in the Holocam Orb system installation, or other dedicated timing source in the installation. Custom software then updates the timing of the Logic Module 43 to match the Local CPU clock time, every time a new clock update arrives from the 1588 Master Clock.

The Local Timestamp Counter in the Logic Module 43 is then used as a reliable time clock source to timestamp the local sensor data streams received by the Logic Module 43. The Local Timestamp Counter can optionally be used to align all the VSync pulses in the network to the same clock time, and thus be closely aligned with each other.

The end result of this timing logic system is that the custom time clock of each Orb is now very closely aligned to the reference 1588 Master Clock, allowing for a very close alignment of the sensor data timestamps between Orbs, and allowing a present method to align together the VSync signals of each video sensor in each Orb using its local clock time, rather than a traditional external sync source.

The present section discusses a method of synchronizing the local VSync signal of each Orb. The local VSync signal is preferably used to synchronize the one or more of the local sensors within each Orb. A frame rate value register is set by an Orb's Local CPU 63 to the desired frame rate for the Holocam Orb. Any local frame based streaming sensors are also set to the same frame rate and configured to accept the local VSync signal as a timing reference. All configured sensors will then align to the local VSync signal.

The local VSync signal can also be set to align to a desired local timestamp clock value on demand for specific requirements. To achieve this, a set of hardware registers is implemented in the Logic Module 43 that stores a time counter value that can be written to (i.e. given a programmed time value) by the Local CPU 63. When this stored value matches the value found in the local Timestamp Clock, a reset pulse is generated which aligns the local Master VSync pulse with the programmed time value. Any local sensors that have been set to synchronize to the local VSync pulse will then also realign with the programmed time value.

Multiple Holocam Orbs can be made to participate in system wide synchronization. For all Holocam Orbs participating in system wide synchronization, the VSync Synchronizing Event will reset all the local VSync Pulses of all the Orbs to start at the same clock IEEE 1588 clock time. All the VSync pulses will then be time aligned, asserting simultaneously after the event.

A synchronizing technique for synchronizing the local stream start time of each Orb is also provided. In some applications, it is preferred that the sensor data streams in all the Orbs all start at the same clock time, simplifying the task of aligning these data streams in the application (or system). The following methods are preferably used to implement this feature. A local Start Stream Time register is implemented in the local Logic Module 43 for each participating sensor data stream of an Orb. The Orb's Local CPU 63 sets desired start time(s) for each participating sensor. The Local CPU 63 then enables the feature for each participating sensor. When the local Timestamp Counter reaches the matching value (i.e. set start time(s)), the participating stream(s) are enabled, causing the sensor data to begin flowing. Because the local Timestamp Counter in each participating Holocam Orb is updated to tightly match the IEEE1588 Timing Master clock time, all participating sensor data streams will start at precisely the same time.

The presently preferred system also provides a method of aligning the frame start time of frame-based streaming sensors. Some frame-based streaming sensors cannot be started up instantly on demand, but instead need to be enabled and allowed to stabilize for a finite amount of time, depending on the sensor model, before they can provide valid streaming data. The two methods in the Holocam Orb system described above can be combined to effectively add the ability to gather a frame of sensor data from an arbitrary point in time from a streaming only sensor, using the following method.

First, a desired start time for the operation is selected. This desired start time should be far enough in the future from the configuration process such that the streaming sensors will have had time to stabilize. The desired start time value (T) is then programmed into the start time registers of the participating sensors. The desired frame rate period (p) is then set into the local VSync Frame Rate register. The frame rate of all participating sensors is then set to the same frame rate set in the local VSync Frame. A local VSync reset time is now calculated as an integer multiple of frame times (n) back from the stream start time. This should exceed the number of frames (s) that the sensor requires to become stable. This value is then programmed into the local VSync reset register, and the enable flags for the participating logic are then set.

As the local Timestamp clock counts forward the following events happen. First, at time T minus (n times p) the local VSync reset time will match the clock time and cause the local VSync Pulse to realign to the current time. Second, the frame based sensors will start adapting to the new VSync time alignment and settle after (s) frames. Third, at time T the stream enables will start, and since the local VSync pulse is also aligned to an integer multiple of time T, local VSync will trigger at the same time as the stream enables turn on, and thus so will the streaming sensors start a new frame at this same time (T).

Intra-Orb Synchronization

The following section discusses a method for synchronizing real time sensor data streams within an individual Orb. The purpose of this section is to describe the synchronization methods used in the Holocam Orb electronics module, such as illustrated in FIGS. 13 and 14.

Multiple Orbs in a Holocam Orb system gather real time sensor data from the same scene, as is illustrate in FIG. 1, for example. Each sensor requires a synchronization method, and may require a time stamp to maintain data correlation throughout the all Orbs in the Holocam Orb system scene.

The sensors in an Orb may be classified into two types: Synchronous sensors and Non-Synchronous (or Asynchronous) sensors. Synchronous sensor types accept external sync signals and align their data transfers to the external sync signals. Asynchronous sensor types do not offer an external sync feature and send out a continuous stream of sensor data.

To simplify the processing of these two disparate sensor types (i.e. different data types), all asynchronous streaming sensor data is packaged into a digital frame bundles analogous to video frames, using the local master sync (e.g. VSync) pulse as a reference point to divide the continuous data stream(s) from the asynchronous sensor(s) into discrete frame bundles. Each frame bundle is then tagged with a timestamp value that updates once per frame (e.g. per video frame).

The following is a discussion of methods used in a preferred Holocam System for intra-Orb synchronization. A distributed clocking system is preferably implemented using the following methods. First, each individual Orb implements a Local Timestamp Counter in its own Logic Module 43, as discussed above. In one operation mode, a local master Frame Sync pulse is generated and used to both synchronize the frame based sensors and to divide the continuously streaming sensor data into frame bundles. In a second mode of operation, one sensor is nominated as a Master Sync source (or Master Sync sensor) and it provides a Master Sync Pulse, or signal. The other sensor(s) are configured to synchronize themselves to the Master Sync Pulse from the assigned Master Sync sensor.

To achieve this, local memory is divided up into one or more assigned memory buffers per active sensor. The Logic Module 43 accepts data from each local sensor's data port, and stores it into the assigned memory buffer(s). The selected Master Sync Pulse (either the local VSync pulse or one selected from a given sensor) is used to latch one or more stable copies of the current Timestamp Count value, one copy for each buffer for each active sensor. Each frame bundle may be time stamped with the local slave time clock, or optionally the Local CPU 63 can copy the Timestamp value directly, typically as part of the same operation of copying the matching sensor data. Frame bundles and timestamp values from all the local sensor streams are then ready, and made available to the Holocam Orb installation for processing and/or recording, via the outbound data port 57. Optionally, a higher level bundling of individual sensor bundles may be created by local processing, and made available to the Orb Installation as a unit, with a common timestamp.

Examples of synchronous sensor types include streaming video devices, such as RGB video sensors 31 and 33 and TOF sensor 41, described above. Synchronous sensors have an internal clocking system that can be slaved to an external clock source (e.g. VSync). These sensors generate discrete bundles of data that represent a single "frame" of image data. Each synchronous sensor outputs video data in 2 dimensional image frames, several times per second, and each sensor is synchronized to the local master clock. Preferably, the frame start times of all streaming video sensors used in the scene are aligned to the same instant in time.

Examples of asynchronous sensors types include Inertial Measurement Unit (IMU) 51, Microphone Array 53, as well as temperature sensors, magnetic field strength sensors, and magnetic field alignment sensors, all of which may be optionally incorporated into an Orb in accord with the present invention. Asynchronous sensors generate a continuous stream of live data from the environment, and do not accept external signals to align their data flow to an external clock source. In order to align this type of continuous data stream from asynchronous sensors, the local VSync timing (as configured, or Master Sync Pulse) is used to divide asynchronous sensor data into bundles by the FPGA logic. All sensor data types (both synchronous and asynchronous) for a given frame number can then be time stamped and later processed in a discrete batch, all matching the synchronous sensor data frames.

The following is a discussion of the preferred sensor data time stamping method. All sensor data either arrives in frame bundles, or is packaged into frame bundles as described above. The arrival of each frame bundle is aligned with the local Master VSync pulse as described above. Each frame is stored in local temporary memory storage buffers (e.g. FPGA Shared Memory 47) in the Logic Module 43. Each frame buffer has a corresponding timestamp latch register that is updated when the frame buffer in question is selected for new video data from a sensor or when the selected Master VSync pulse is asserted. Once a given frame has been fully captured in the local buffer (e.g. FPGA Shared Memory 47), the Local CPU 63 copies the video data (or other frame bundle) and the accompanying timestamp value and forwards it to other nodes in the system for further processing.

The following are some examples of how asynchronous sensor types may be handled. The IMU 51 preferably contains several inertial measurement sensors, and provides a repeating packet of all IMU real time measurement data multiple times per second. In order to normalize the data handling of the different sensor types, a frame structure is applied to the IMU data stream. To achieve this, the IMU packets are bundled up into frame bundles (or blocks of data) analogous to video data frames named "IMU frame bundles" and stored with a timestamp value in local temporary memory (e.g. FPGA Shared Memory 47). A number of frame buffers are allocated to the IMU 51. Preferably, the timestamp value is sampled from the local master time clock once every local VSync pulse, and latched into one or more storage registers. The timestamp (e.g. triggered by the VSync pulse) indicates the capturing of a current frame buffer of IMU readings (i.e. a frame bundle of IMU packets corresponding to one video frame, for example) within one of the frame buffers allotted to the IMU 51. As an IMU frame bundle is captured, a new frame buffer is selected, and new IMU data packets are captured there. At the same time, the previously selected frame buffer that contains a complete IMU Frame Bundle, including the timestamp, is packaged by the local processor 63 and sent to the base station.

Another example of an asynchronous sensor is the microphone array 53, which provides a continuous stream of digital audio data with no frame structure. The Logic Module 43 packages this continuous stream of digital audio data into audio frame bundles multiple times per second, preferably at the same rate as the established video frame rate. Similar to the other sensors, each frame bundle is stored into a local memory buffer within FPGA Shared Memory 47 along with a timestamp once per local frame time. The local processor 63 then packages and transfers the completed audio frame bundle to the base station along with the other sensor bundles.

Holocam Full Scene IR Illumination

The following section discusses how the present Holocam Orb system achieves Holocam full scene IR illumination. The presently preferred method for infrared (IR) illumination of a scene for a Time-of-Flight (TOF) range imaging camera, such TOF 41, requires precise synchronization among the different Orbs that are monitoring the same scene in order to avoid interference among the TOF sensors in the different Orbs. Thus, the present section describes the features of the infrared illumination sub-module (e.g. IR illumination array 39 and/or white LED illumination array 37) found on the Time-of-flight (TOF) module 35 of the present Holocam project.

As discussed above, a Holocam Orb is an electronics and software device that gathers sensor data from a three dimensional area (scene), processes and timestamps the data, and forwards sends it to a base station for further processing in real time.

The Holocam Time-of-flight (TOF) module 35 measures the distance between objects in a three dimensional area (scene) and the TOF sensor 41. It sends out a synchronized pattern of infrared light to objects in the field-of-view (FOV) of the Holocam Orb Module, and uses a phase (or phase difference) of the reflected light to calculate the distance from an object to the sensor 41.

The presently preferred Time-of-flight method requires that the field-of-view be illuminated evenly by an infrared light source that is switching OFF and ON very quickly, preferably switching at 20 million cycles per second (i.e. at 20 MHz). Although high power IR LEDs are available, they may not be cost effective, and they currently cannot operate fast enough, for the Time-of-flight applications envisioned in the present invention. On the other hand, a single low cost IR LED will typically not produce enough infrared light energy to fully illuminate a large scene, such as is envisioned in the present invention.

Nonetheless, the preferred embodiment uses a distributed array of low cost IR LEDs individually aligned for full coverage of a scene in an Orb's field-of-view. The number of low cost IR LEDs in this array is also dependent upon the size of the desired scene to be illuminated. A method is also provided to ensure that the infrared pulses from one Holocam ORB do not interfere with the operation of other Holocam Orbs deployed in the same scene.

Time Division Multiplexing

Within an individual Orb, infrared emitting light sources (e.g. individual IR LEDs that together comprise infrared LED illumination Array 39 of FIG. 13) are used to illuminate a scene (such as room 1 in FIG. 1) with structured infrared light pulses. These infrared pulses are reflected back to the TOF sensor 41. The TOF sensor then calculates the distance to objects in the scene based on the characteristics of the reflected IR pulses.

If two or more Holocam Orbs attempt to operate their respective TOF sensor system/module 35 at the same time, the infrared light pulses from the multiple Orbs will conflict with each other and distort their results.

Figure 15:
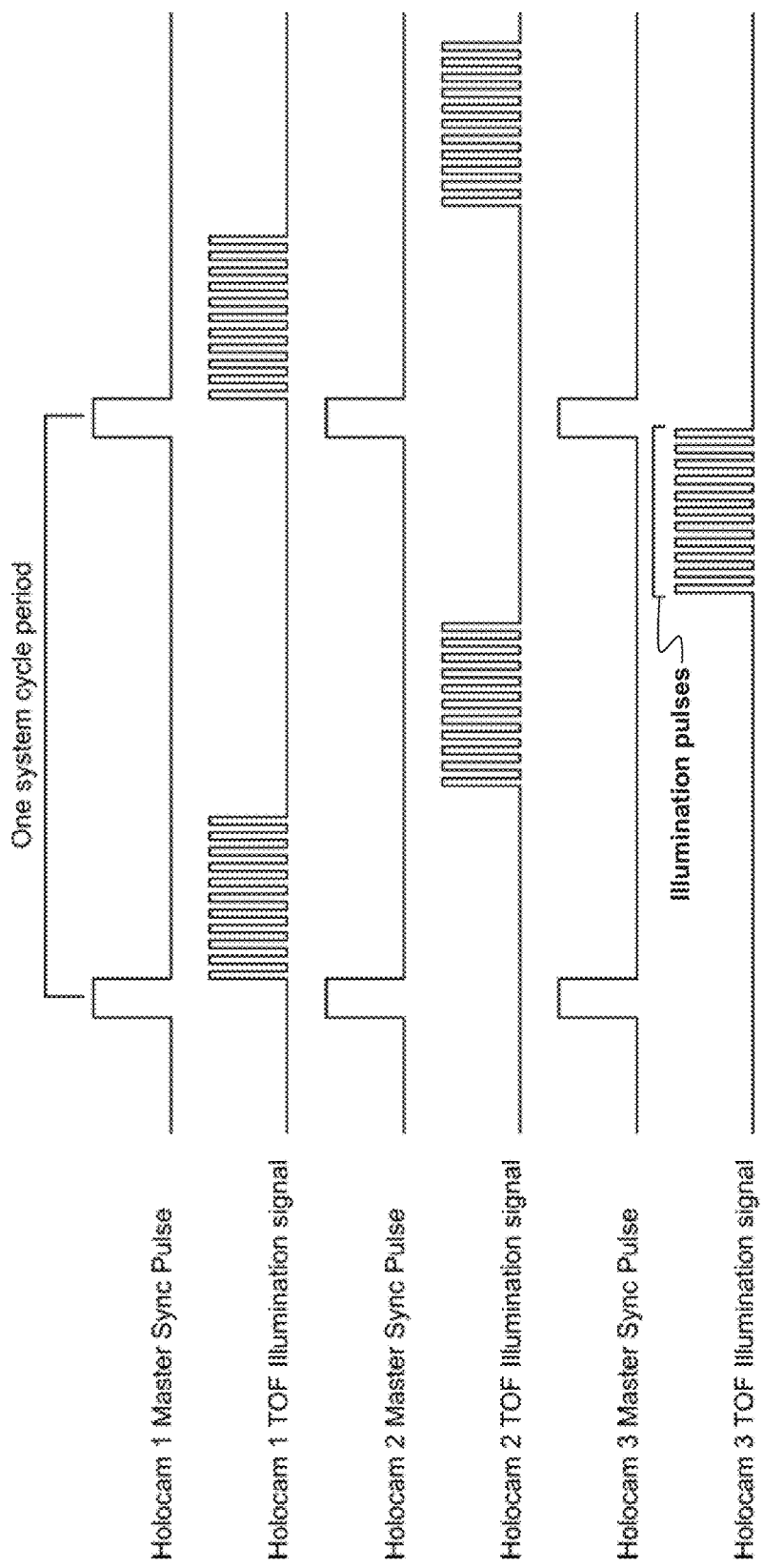
FIG. 15 shows time division multiplexing of illumination sources to assure that no two Holocam Orbs activate their IR illumination array at the same time.

To resolve this, the IR LED sources 39 are synchronized to their local Orb master clock and can be directed to turn ON and OFF as a unit, i.e. in unison. For example, FIG. 15 illustrates the synchronizing of a Master Sync Pulse and illumination signals for three Orbs (i.e. Holocam 1, Holocam 2 and Holocam 3) to avoid any two Orbs having their respective illumination signals active simultaneously. To achieve this, all Holocam Orbs in a Holocam Orb system are electronically synchronized to a master clock provided from a base station, as is explained above. Each Holocam Orb is assigned a unique Node ID number (for example, 1, 2, 3 etc.). Each Holocam Orb then aligns its own Master Sync Pulse to its local copy of the master clock, as is also explained above. Each Holocam Orb is then configured to only send out Time-of-flight illumination pulses in its own allocated time slice, as determined by its Node ID.

Since all Holocam Orbs in a scene are time synchronized, each Orb can be configured to only illuminate the scene with IR pulses for a portion of a cycle time. Only one Orb will illuminate the scene at a time, and thus no interference will occur between Orbs.

As is explained above, the information gathered from all the Holocam Orbs may be sent to a central data processing station, such computer 2 shown in FIG. 1. The gathered information is processed to generate free viewpoint data (i.e. a 3D image data and/or 3D sound data from a user's viewpoint) and provided to the user. This information may be streamed to a user's head mounted display (HMD) for viewing. In the present discussion, an HMD (or other media playing device) may be termed a Holocam Viewer. Instead of using a central data processing station, the Holocam Viewer may alternatively receive data streams from the different Holocam Orbs and itself generate the free viewpoint data without the aid of an external central data processing station (i.e. without need for computer 2).

Figure 16:
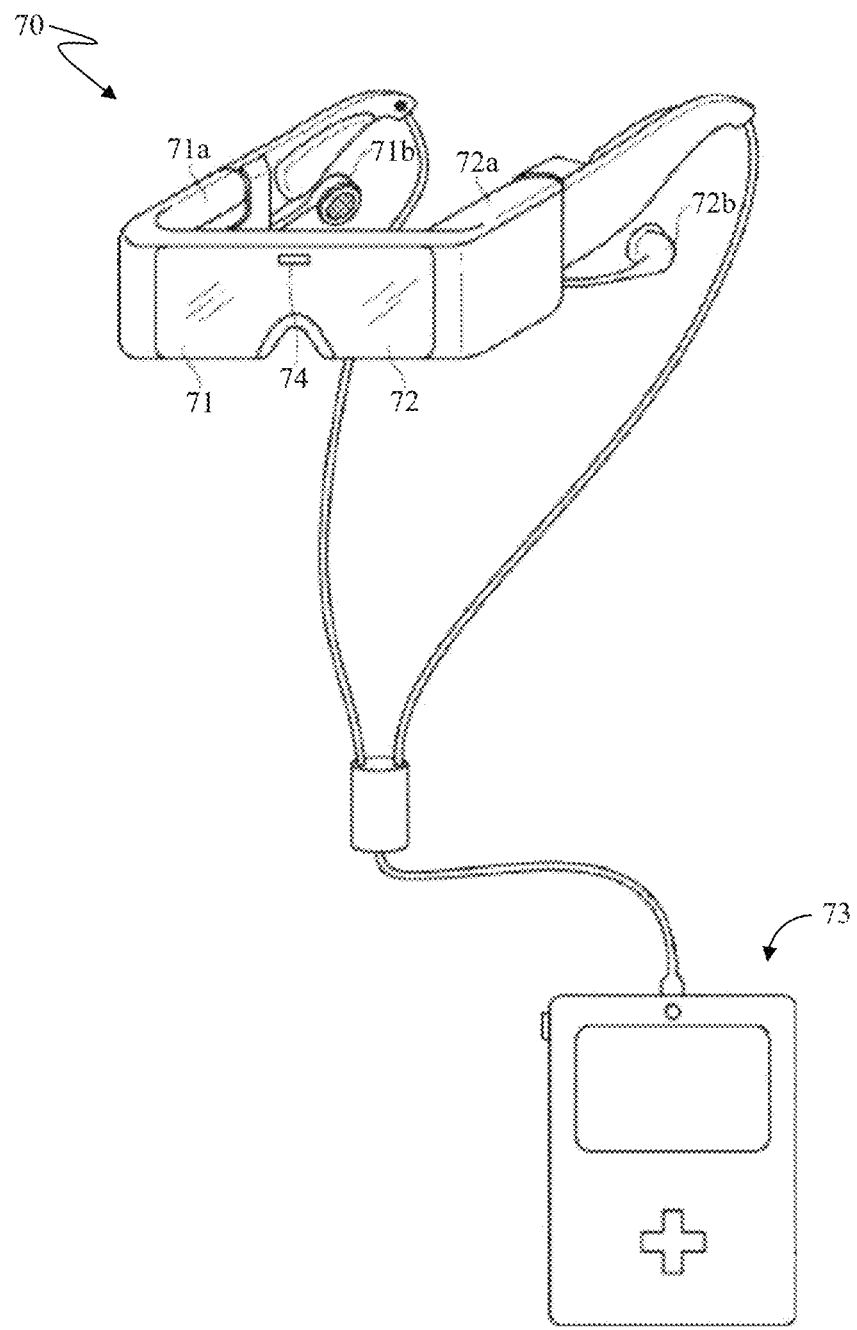
FIG. 16 illustrates an example of a Holocam Viewer.

An example of a Holocam Viewer 70 is shown in FIG. 16. In the present example, Holocam Viewer 70 is shown having a shape similar to eye glasses and may be worn in a manner similar to eye glasses. All computing resources may be incorporated into Holocam Viewer 70, or alternatively may be divided between Holocam Viewer 70 and an auxiliary control unit 73, or some other remote computing resource, e.g. computer 2 or server, etc. If desired, auxiliary control unit 73 may provide a user interface to control Holocam Viewer 70. Alternatively, all user interface controls may be incorporated into Holocam Viewer 70.

Preferably, Holocam Viewer 70 includes a right optical see-through display unit 71 and a left optical see-through display unit 72 that work together to provide left and right images of a stereo image pair that displays a virtual 3D object/scene. In the present example, a user would preferably see both the displayed left and right images of the 3D virtual object and also see an outside scene through the left and right display units, 71 and 72. That is, left and right display units 71 and 72 can be made transparent in areas where the virtual object is not being actively displayed. If desired, a displayed virtual object can also be given a desired level of transparency so that a user may optionally see through a displayed virtual object. Left and right optical see-through display units 71 and 72 may provide an image by means of image projection, transparent OLED or LCD displays, or any other type of transparent displaying means known in the art.

In the present example, Holocam Viewer 70 includes right earphone 71b and left earphone 72b to provide audio information to a user. Alternatively, Holocam Viewer 70 may be shaped to resemble a helmet and have multiple speakers distributed within its interior. Preferably, Holocam Viewer 70 configures sound emanating from earphones 71b and 72b to mimic sound originating from a predefined physical location. Further preferably, right optical see-through display unit 71 is controlled by an integrated right display driving unit 71a, and left optical see-through display unit 72 is controlled by an integrated left display driving unit 72a.

In the present example, Holocam Viewer 70 has one integrated camera 74 with known position and pose relative to the left and right optical see-through display units 71 and 72, and relative to predefined world coordinates. It is to be understood, however, that Holocam Viewer 70 may optionally include two cameras to capture stereo imaging pairs, and thereby obtain 3D information of its surrounding real scene. Alternatively, Holocam Viewer 70 may incorporate any other known 3D imaging system (i.e. 3D information capturing device) for capturing 3D information of the surrounding scene, such as a 3D laser scanner, a MICROSOFT CORP. KINECT® sensor, a range camera, or any of many different types of time-of-flight devices. Further alternatively, one or more 3D information capturing devices may be distributed throughout the surrounding scene and their captured 3D information transmitted, or otherwise conveyed, to Holocam Viewer 70 and/or auxiliary control unit 73. As stated above, Holocam Viewer 70 is an example of a head mounted display (HMD), and a fuller description of an exemplary HMD is provided in U.S. Pub. No. 2013/0234914, which is assigned to the same assignee as the present application, and is herein incorporated in its entirety by reference.

Sound Source Association to 3D Location of Object in Scene

As stated above, an object of the present invention is to provide free viewpoint data. As part of this objective, a preferred embodiment further combines sound information from multiple microphone arrays gathered from the different Holocam Orbs to identify a location for a specific source (or sources) of sound, and then encode the sound(s) at the identified location(s) for the benefit of the user/viewer. Thus, the user may hear a sound as coming from behind, in front, a side, or from any other direction. Additionally, each of the localized sounds may further be anchored (or associated with) to a specific objects (or person) in a scene such that the sounds moves with their specifically associated object or person. That is, a preferred embodiment provides stereophonic audio, and associates a sound source to a 3D location of an object in a scene.

A problem associated with presenting stereophonic audio reconstructions of a scene in the Holocam Viewer 70 involves correctly localizing separated sound sources from each Holocam Orb's microphone array 53, see FIG. 13. As is explained above, the Holocam Orb system effectively includes a model building module (made up of Local Central Processing Unit Module 61 and/or Logic Module 43 and/or computer 2) that produces 3D scene structure information. In a preferred embodiment, the 3D scene structure information available from the Holocam Orb system's model building module is used to disambiguate multiple audio source location hypothesis obtained from blind audio source localization. Blind audio source localization refers the use of audio information, such as from audio array(s), to identify a location of a sound source in 3D space. The result can then be used to reconstruct the audio scene (along with the visual scene) correctly in the Holocam Viewer 70.

A simplified representation of a Holocam system is shown in FIG. 16. All elements similar to those of FIGS. 13 and 14 have similar reference characters and are described above.

In the Holocam Orb system of the present embodiment(s), a microphone array consisting of microphones on each sensor module (Orb) captures audio from sound sources in the scene for playback in the Holocam Viewer 70, such as through earphones 71b and 72b or other speaker system. Sound is presented stereophonically, reconstructed such that the sound is perceived by the user as appearing to originate from the sound source in the rendered 3D model. Methods of identifying individual sound sources using a microphone array are called blind audio source separation (BASS) and methods of localizing the source of a sound (i.e. estimating the 3D position of the sound) is called blind sound source localization (BSSL). A problem is that, when the number of microphones in the array is modest, conventional SSL techniques produce multiple pose hypothesis, which typically must be disambiguated using heuristics. The term "blind" here refers to the fact that no other information (besides sound information) about the scene is available to help disambiguate the poses (i.e. positions of the sound sources). A problem is that heuristics often fail to produce correct pose information.

Some BSSL methods (such as the described in "The ManyEars open framework: Microphone Array Open Software and Open Hardware System for Robotics Applications", *Autonomous Robotics*, Vol. 34, pp 217-232, by Grondin et al. and "Enhanced robot audition based on microphone array source separation with post-filter", *Proc. IEEE International Conference on Intelligent Robots and Systems*, Vol. 3, pp. 2123-2128 by Valin et al.), rely on the probability that speech is present in the separated audio to decide which scene location is most likely source. However, in the presence of multiple speakers in the scene or other phenomena such as reverb, this can produce incorrect localizations.

The presently preferred embodiment exploits knowledge of the scene structure available in the 3D model reconstructed from depth cameras in the sensor modules. Thus, the present invention distinguishes itself from previous methods by using 3D scene structure information rather than only relying on assumptions about audio content (i.e. assumption about probably audio sources, which would likely require a priori knowledge about a scene).

Figure 17:
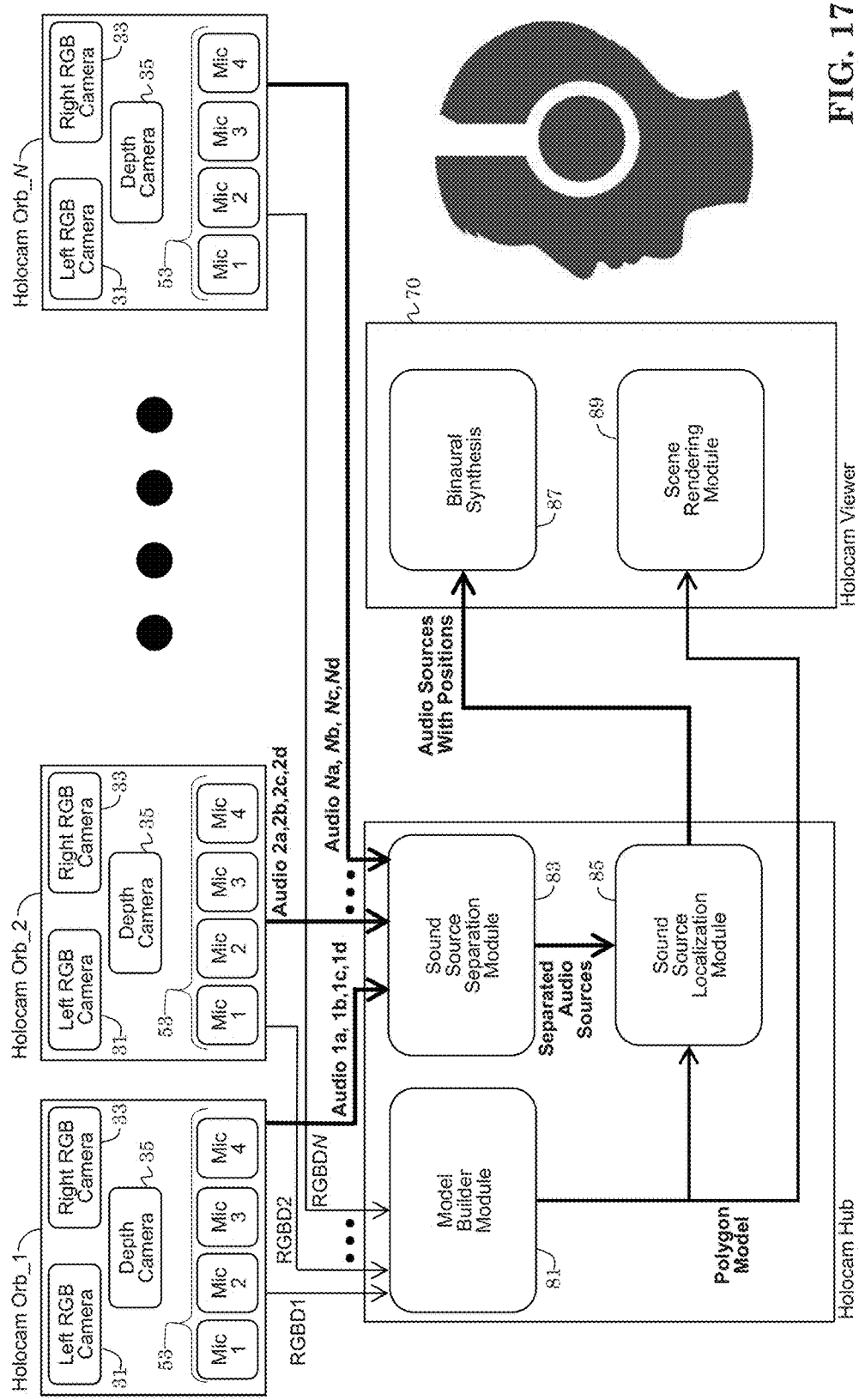
FIG. 17 provides a simplified re-presentation of the Holocam Orb system including multiple Holocam Orbs.

With reference to FIG. 17, a simplified re-presentation of the Holocam Orb system (such as illustrated in FIG. 1) and individual Holocam Orbs (such as illustrated in FIGS. 13 and 14) is provided for ease of discussion. All elements similar to those provided in the above figures is given similar reference characters and is described above. FIG. 17 shows multiple individual Holocam Orbs (such as Orbs 6, 7 and 8 in FIG. 1), but FIG. 17 provides an indefinite number N of individual Orbs, identified as Holocam Orb_1, Holocam Orb_2, through Holocam Orb_N. As is explained above, each Holocam Orb preferably includes a left RGB (video) camera 31, a right RGB (video) camera 33, a depth camera 35, and a microphone array 53. In the present example, each microphone array 53 is comprised of four individual microphones Mic 1, Mic 2, Mic 3, and Mic 4. Video and depth data (which includes 3D model data) is sent from each Holocam Orb to the Holocam Hub, which may be a computer (such as computer 2 illustrated in FIG. 1) or specialized digital data processing unit (such as auxiliary control unit 73 in FIG. 16, which preferably uses a wireless communication interface).

In the present exemplary embodiment, the Holocam Hub includes a Model Builder Module 81, a Sound Source Separation Module 83 and a Sound Source Localization Module 85. The Model Builder Module 81 receives visual and depth data from the individual Holocam Orbs. For example, visual and depth data RGBD1 is received from Holocam Orb_1, visual and depth data RGBD2 is received from Holocam Orb_2, and so on to Holocam Orb_N, which provides visual and depth data RGBDN. Similarly, Sound Source Separation Module 83 receives audio data from each Orb's microphone array. Audio data 1a, 1b, 1c, and 1d is respectively received from microphones Mic 1, Mic 2, Mic 3 and Mic 4 of Holocam Orb_1. Similarly, audio data 2a, 2b, 2c and 2d is respectively received from microphones Mic 1, Mic 2, Mic 3 and Mic 4 of Holocam Orb_2, and so on through Holocam Orb_N, which provides audio data Na, Nb, Nc, and Nd respectively from its four microphones.

Model Builder Module 81 uses the received visual and depth data from the Holocam Orbs to generate a 3D structural model of the scene (e.g. a polygon model, such as a (triangular) mesh construct/model). The Sound Source Separation module 83 analyzes the sound data from the multiple (preferably all) microphone arrays 55 and isolates individual source(s) of sound. These separated sound sources and the polygon model are sent to Sound Source Location Module 85, which preferably uses the separated sound sources information to produces at least one hypothesis (preferably a plurality of hypotheses) regarding the location of each isolated sound source (if such hypothesis information is not already provided by Sound Source Separation Module 83), and combines the sound location hypothesis for each isolated sound source with the polygon model (3D model) of the scene to select one hypotheses per isolated sound source, or to reject (discard) a sound source as background noise. Discarded sound sources are not assigned a location, and may be ignored from further processing. The Holocam Hub further sends the polygon model from the module builder module 81 and the audio sources with position information from the Sound Source Localization Module 85 to the Holocam Viewer 70. A Scene Rendering Module 89 uses the polygon model to recreate a visual rendition of the 3D scene for the user. A Binaural Synthesis Module 87 of Holocam Viewer 70 recreates a localized sound in 3D space (i.e. the rendered 3D scene) of each (non-discarded) isolated sound source for the user.

In summary, FIG. 17 shows a simplified block diagram of a Holocam System with sound source association. The Holocam Orbs (sensor modules) contain arrays of microphones, two RGB cameras and a depth camera. The sensors supply visual (RGBD) data from the cameras and audio streams from the microphones to the hub. Visual data is processed by the Model Builder Module to produce a 3D model, and the audio data is processed by the Sound Source Separation Module to produce separated audio streams (i.e. separated audio sources) with possibly multiple 3D position hypotheses. For each separated audio stream, each of which may have multiple position hypotheses, the Sound Source Localization Module chooses the hypothesis that coincides in space with a filled fragment of the 3D model (i.e. substantially overlaps a constructed 3D cloud, or polyhedral model). As shown, the preferred Holocam System consists of a set of N Holocam Orbs (i.e. sensor modules) Orb_1 through Orb_N, each of which has two RGB cameras 31/33, a depth camera 35, and an array of four microphones 53. Each sensor module (Holocam Orb_1 through Holocam Orb_N) sends data to (preferably) a single Holocam Hub, which builds 3D models and audio models. The RGBD data (produced by the RGB cameras and depth cameras) is used for the 3D model, which is a polyhedral model composed of triangles using methods known in the art. The audio model is comprised of separated audio sources, and may be constructed using well-known methods for solving the Blind Audio Source Separation (BASS) problem, such as Independent Component Analysis (such as described in "Blind Separation of Sources, part II: problem statement", in *Signal Processing* Vol. 24, 1991, pp 11-21 by Comon et al. and "Independent component analysis: algorithms and applications," *Neural Networks* 13.4 (2000): 411-430 by Hyvarinen et al., both of which are herein incorporated in their entirety by reference) and the Infomax algorithm (such as described in "An Information-Maximization Approach to Blind Separation and Blind Deconvolution," in *Neural Computation*, Vol. 7(6), 1995, pp 1129-1159 by Bell et al., which is herein incorporated in its entirety by reference). Preferably, the separated audio sources include lists of sound source position hypotheses. The Sound Source Localization Module 85 takes the polyhedral model from the Model Builder Module 81 and uses it to select one of the hypotheses for each sound source, as provided by the Sound Source Separation Module 83. The results are sent to the Holocam Viewer 70, which is capable of rendering the results for visual and audial reception by a human user. Two modules are responsible for this: the Binaural Synthesis Module 87 constructs stereophonic sound from the audio sources with positions given a viewing pose determined by the user (or from user input), and the Scene Rendering Module 89 renders a stereo vision representation of the scene given the same viewing pose.

Figure 18:
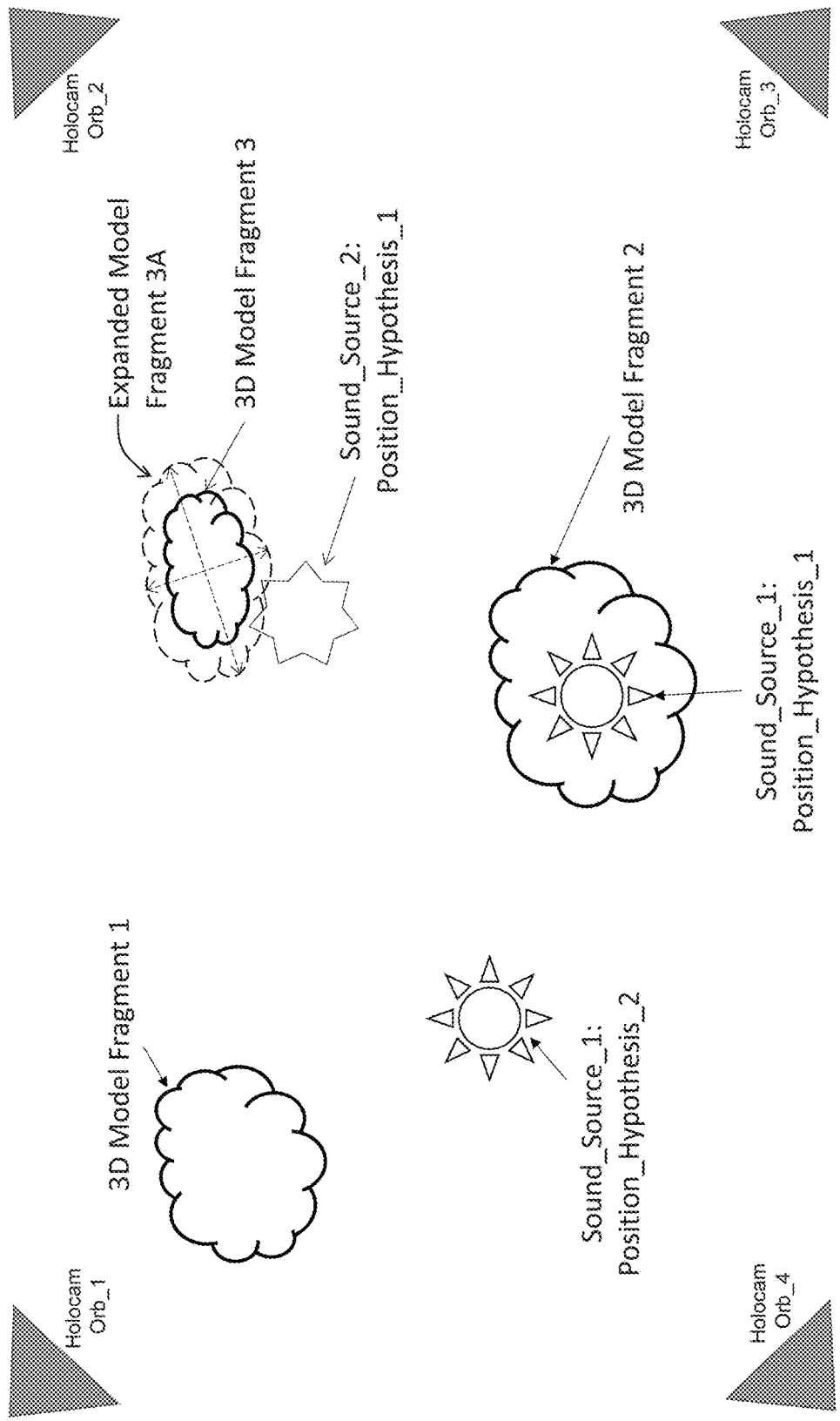
FIG. 18 illustrates a reconstruction of a 3D scene using a polygon model (point clouds).

FIG. 18 provides a pictorial representation of the function of Sound Source Localization Module 85. In the present case, four Holocam Orbs are shown (Holocam Orb_1 through Holocam Orb_4), each represented by a cone indicating their respective field of vision. FIG. 18 illustrates the reconstruction of a 3D scene using the polygon model, such as provided by Model Builder Module 81. In the present example, the polygon model identifies three 3D point clouds, i.e. 3D Model Fragment 1, 3D Model Fragment 2 and 3D Model Fragment 3. Also shown are two separated audio streams (separated audio sources) and their respective location hypotheses, such as provided by Sound Source Separation Module 83. In the present example, a first isolated sound source has two associated (i.e. possible) location hypotheses identified. These two location hypotheses are identified as "Sound_Source_1: Position_Hypotheses_1" and "Sound_Source_1: Position_Hypotheses_2". The second isolated sound source has only one associated (i.e. identified) location hypothesis, and it is identified as "Sound_Source_2: Poisition_Hypothesis_1."

In operation, the location of each position hypothesis of each separated sound source is compared with the location of each 3D model fragment. If a particular separated sound source is found to be substantially agree with the position of a particular 3D model fragment, then the particular separated sound source is associated with that particular 3D model fragment and any other position hypothesis associated with that particular separated sound source are discarded and eliminated from further use. For example in FIG. 18, separated sound source Sound_Source_1 has two associated location hypothesis. The first of these two location hypotheses, Sound_Source_1: Position_Hypothesis_1 is wholly contained within 3D Model Fragment 2, but the second location hypothesis (Sound_Source_1: Position_Hypothesis_2) is positioned in free space with no overlap with any 3D model fragment. Thus, first location hypothesis, Sound_Source_1: Position_Hypothesis_1, is identified as (i.e. deemed) correct and Sound_Source_1 is associated with the 3D model Fragment 2 and its position. In a preferred embodiment, Sound_Source_1 may be made to move along with movement of 3D model fragment 2 so as to always coincide with position of 3D model fragment 2.

In FIG. 18, Sound_Source_2 does not overlap any of the available 3D model fragments. In this case, Sound_Source_2 may be designated as background noise and either ignored (i.e. removed the scene construct of Holocam Viewer 70) or not ignored by simply not associated with any specific location. That is, the position hypothesis associated with Sound_Source_2 may be removed. Alternatively, if Sound_Source_2 was not wholly within a 3D model fragment, but did partially overlap a 3D model fragment by a predefined amount (e.g. greater than 10%), then Sound_Sournce_2 may be moved to coincide with, and be associated with, the overlapped 3D model fragment. Preferably, Sound_Source_2 would be moved to coincide with the centroid of the overlapped 3D model fragment.

In another alternate embodiment, if a sound source is found not to coincide with (or overlap any) 3D model fragments, the sound source may still be associated with a 3D model fragment that is no more than a predefined distance away from the sound source. This may be implanted by expanded all the 3D model fragments by a predefined percentage (preferably 10%) from their respective centroid to their outer boundary, and then determining if the sound source overlaps the any of the expanded 3D model fragments. For example in FIG. 18, Sound_Source_2 does not coincide with any 3D model fragment, but after expanding 3D Model Fragment 3 to construct Expanded Model Fragment 3A, it is found that Sound_Source_2: Position_Hypothesis_1 overlaps Expanded Model Fragment 3A. As a result, Sound_Source_2 may be associated with 3D Model Fragment 3. In this case, the position hypothesis of Sound_Sournce_2 is discard and Sound_Source_2 is given a new position that coincides with 3D Model Fragment 3 (and preferably coincides with the centroid of 3D Model Fragment 3.

In summary, FIG. 18 illustrates an example of how the Sound Source Localization Module 85 functions. As shown, the 3D model is shown cloud shapes. They are labeled 3D Model Fragments 1, 2, and 3. As well, there are two sun shapes that represent two sound source position hypotheses for a single sound source, Sound_Source_1. There is also a star shape that represents one sound source position hypotheses for another, single sound source, Sound_Source_2. Four sensor modules (cones) are shown at the corners to demonstrate the organization of the scene relative to Holocam Orb sensor locations. In this example, the Sound Source Localization Module 70 would choose Position_Hypothesis_1 for Sound_Source_1 because it is contained inside the 3D Model Fragment 2, but Position_Hypothesis_2 is not contained inside any 3D model fragment.

Figure 19:
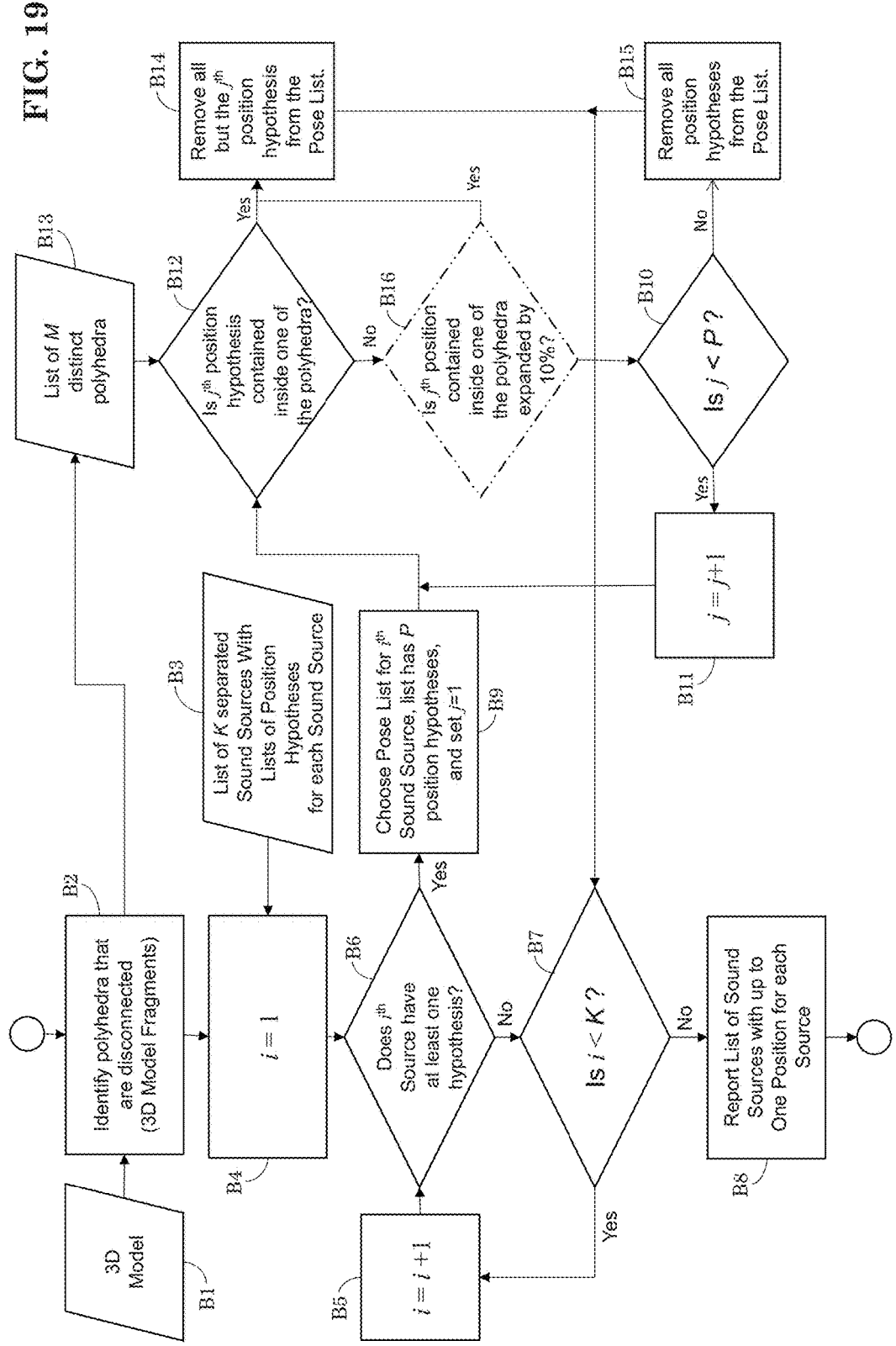
FIG. 19 illustrates a flowchart of a preferred Sound Source Association algorithm.

In FIG. 19 illustrates a flowchart of a preferred Sound Source Association algorithm. This is what is implemented inside the Sound Source Localization Module 85. Computation begins with step (or block) B1 that accepts the 3D model produced by the Model Building Module 81, and step (block) B2 decomposes it into M (M is an integer) 3D model fragments of disconnected polyhedral (as illustrated in FIG. 18), using standard (well-known in the art) methods in Computational Geometry. In block B3, a list of separated sources and their associated position hypotheses are gathered (such as received from Sound Source Separation Module 83). Then, the algorithm traverses the list of K sound sources (such as by using a counter i that increments with each newly inspected sound source from 1 up to K, see blocks B4 and B5), looking for sound sources having at least one position hypothesis, block B6. Sound sources that have no position hypothesis (B6=No) are designated background sound, and block B7 determines if all separated sources have been inspected. If not all separated sound sources have yet been inspected, B7=Yes, then counter i is incremented (B5) and the process inspects the next separated sound source (B6). If block B6 identifies a separated sound source that has at least one associated position hypothesis, the algorithm looks for the first associated position hypothesis that is contained inside one of the M disconnected polyhedra (i.e., M 3D model fragments) and discards the rest. In one embodiment, sound sources whose all position hypotheses are outside all disconnected polyhedra (all 3D model fragments) are selected as (designated or identified as) monaural ambient background noise. The algorithm terminates when all K separated sound sources have been inspected (block B7=No), and finishes by returning the modified list of separated sound sources and their assigned, single position hypothesis in block B3. In this way each returned, modified separated sound source is guaranteed to have not more than one position associated with it, and is further guaranteed to be associated with a specific 3D model fragment.

In more detail, the process of looking for the first associated position hypothesis that is contained inside one of the M disconnected polyhedra (i.e., M 3D model fragments) starts by designating another counter j to count from 1 (see block B9) up to P (see blocks B10 and B11), where P is the number of position hypotheses associated with a current separated sound source under inspection (i.e. associate with the $i^{th}$ separated sound source). That is, block B12 receives the list of M distinct polyhedra (block B13), and cycles through each associated position hypothesis to determine if a current position hypothesis is contained inside one of the polyhedra (block B12). If a current position hypothesis is contained one of the polyhedral (B12=Yes), then the current position hypothesis is associated with the polyhedron in which it is contained and all other position hypotheses are removed from the current sound source's list of position hypotheses (block B14), and the process returns to block B7 to inspect the next separated sound source. If a current position hypothesis of a current sound source under inspection is not contained inside any of the polyhedral (B12=No) and additional position hypotheses have not yet been inspected (B10=Yes), then j is incremented (B11) and the next position hypothesis is compared with all the polyhedra (B12). If all position hypotheses of a current separated sound source currently being inspected have been check and none coincide with a polyhedron (B10=No), then the list of associated position hypothesis is removed from the current separated sound (block B15).

Alternatively, one may optionally expand the criteria for matching a position hypothesis to a 3D model fragment (i.e. a polyhedron). This optional step is illustrated by dotted diamond B16. The process of block B16 is illustrated Expanded Model Fragment 3A in FIG. 18. Basically, the process determines if the current position hypotheses (i.e. the $j^{th}$ position hypothesis) is contained (or overlaps by a first predefined amount, preferably at least 10% from its centroid to its outer limit) one of the polyhedra expanded by a second predefined amount (preferably not more than 10% from its centroid radially out to its defined outer surface).

The present algorithm produces more correct localizations of separate sound sources than is possible with the heuristic approach of the prior art. As a result, audio reconstructions in the Holocam Viewer 70 correctly model a scene, including sound sources. That is, the present invention augments a blind audio source localization with visual and depth data to more accurately identify sound sources.

Cleaning of Depth Data by Elimination of Artifacts Caused by Shadows and Parallax As is discussed above, the present invention combines visual and depth data to construct 3D models including texture information. To do this, digital information (e.g. depth data or other non-visual information) is correlated to corresponding visual information (e.g. pixel or light intensity) in the form of textures. As it is known in the art, textures may be a two-dimensional array of color values (or light intensity values). An individual color value may be called texture element, or texel. Each texel is given an address similar to Cartesian coordinates and typically labeled u and v (in a manner analogous to X-Y coordinates). The vertices in a 3D model (such as triangles or other polyhedra) may be assigned texture values and the interior of the triangle may be filled by extrapolating the texture values from the vertices to the interior of the triangle, or other polyhedron.

Problems arise when faulty depth data (non-visual data) is associated with visual data, or vice versa. That is, when erroneous depth data is assigned visual texture, the previously invisible depth data errors become visual errors (or image artifacts) that detract from the final 3D (model) immersion construct. The present invention identifies regions of bad depth data that result from (LED) shadow, as well as incorrectly assigned textured data caused by parallax between depth and RGB cameras. As is explained above, such as illustrated in FIG. 3, parallax (both horizontal and vertical parallax) refers to two cameras seeing the position of an object shifted due to the two cameras having different view angles, e.g. due to the two cameras not being at exactly the same position. In the present case, parallax results from the intensity image capture device(s) (e.g. infrared image sensor(s)/camera(s) and/or RGB/VGA sensor(s)/camera(s)) and the depth image capture device(s) (for example, a TOF system(s) and/or structured light system(s)) being at different positions. The present embodiment removes these bad regions to avoid their incorporation into the final 3D immersion construct.

That is, two distinct problems are identified and solved in the present embodiment. The first problem addressed is the identification of regions of incorrect depth data that are a result of light scattering in regions poorly illuminated by an illumination source (e.g. Infrared LED Illumination Array 39 in FIG. 13, or areas that are not properly covered by a projected pattern of a structured light system) of a depth image capture device/camera (e.g. Time-of-Flight (TOF) Sensor 41 in FIG. 13, or a depth image capture sensor of a structure light system). The second problem addressed is the identification and removal of areas of a depth map that are incorrectly textured due to parallax between the depth image capture device (e.g. structure light system and/or TOF camera 41 or module 35) and an intensity image capture device (e.g. RGB camera(s) (or module) such as 31 and/or 33). Both of these approaches identify areas of depth maps that are of poor quality. When rendering 2.5D dimensional data (data that provides a perceived 3D view from a specific view angle(s) (FOY), but does not provide a fully encompassing 360° 3D view from all possible directions), areas of poor depth data or that are poorly textured create very noticeable visual artifacts, particularly on the borders (edges) of objects. For example, bits of background information may appear on the edges of a foreground object. Part of the problem originates from the fact the cameras capturing the depth and RGB information are not at the same position (ergo parallax is introduced).

Because these problems may be encountered in either a TOF system and/or a structured light system, and their solution may be similarly applied to both types of systems, for the sake of simplicity, the following discussion focusses on a TOF system (i.e. TOF camera) with the understanding that similar solutions may be applied to a structure light system.

Figure 20:
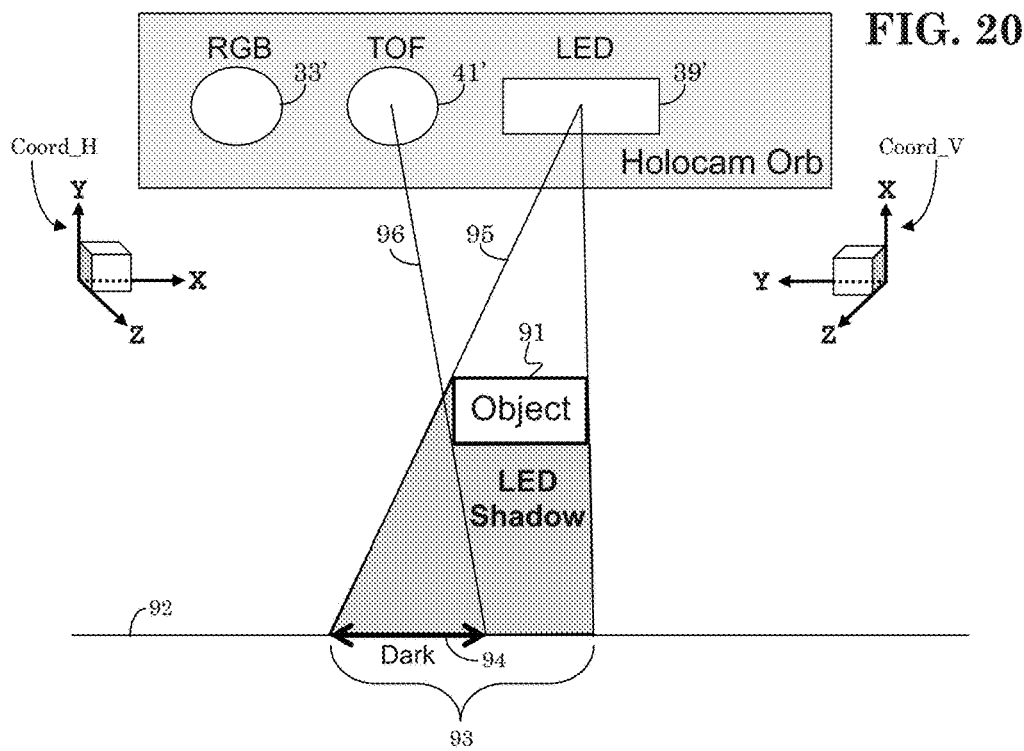
FIG. 20 illustrates an LED shadow as viewed by a depth camera.
Figure 21:
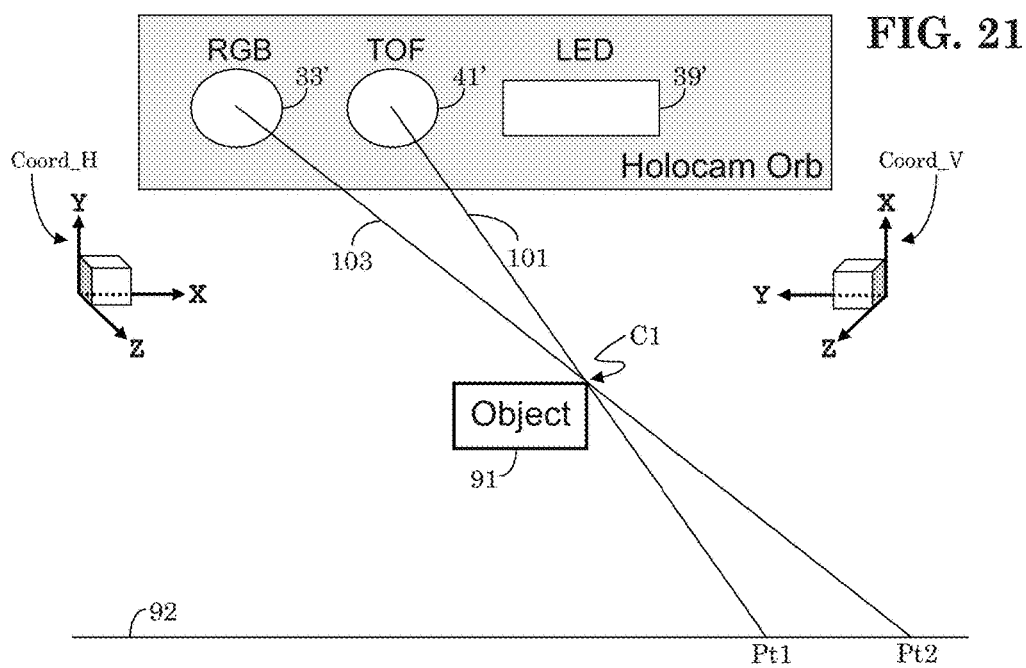
FIG. 21 illustrates an example of parallax.

Examples of these two sources of error are illustrated in FIGS. 20 and 21, which for ease of discussion show only part of a Holocam Orb. When the depth image capture device is implemented as a TOF system, a source of error may be light scattering in low confidence regions, such as due to the illumination source (LED Array 39) of a TOF system being offset in a particular direction from and the TOF sensor 41 (e.g. not being at the same location). Analogously in the case of a structure light system, this type of error may arise from a projector (i.e. light source) that projects the known pattern (for example, a bar or grid pattern) and a pattern/image capture sensor (e.g. depth image capture sensor) that are offset from each other in a particular direction. To focus on the above two listed sources of error as applied to a TOF system, FIGS. 20 and 21 only show an LED (or LED array) 39' as a TOF light source, a TOF (depth image capture) sensor 41', and an RGB camera 33'. It is to be understood, however, that the following discussion is not limited to a Holocam Orb, and is equally applicable to other devices a having similar combination of components, such a MICROSOFT CORP. KINECT® 2 sensor, or to any other depth image capture device, such as a structure light system (e.g. MICROSOFT CORP. KINECT® 1 sensor). In the case of a structured light system, a pattern projector could be interpreted as taking the place of LED 39' and a pattern image capture sensor may be interpreted to take the place of TOF sensor 41.

In FIG. 20, the LED 39' illuminates an object 91 in front of a back wall (i.e. background) 92. Object 91 casts a shadow 93 against back wall 92 that is not illuminated by the LED 39'. Because the TOF camera 41' is offset from the LED 39', the field-of-view (FOV) of the TOF camera 41' encompasses part of (LED) shadow region 93. That is, a dark region 94 within shadow 93 is image-captured by of the TOF camera 41' (e.g. depth sensor). Dark region 94 is defined by LED ray 95 from the LED source 39' and TOF ray 96 from the TOF camera 41', and the region between the LED ray 95 and the TOF ray 96 is not "seen" (i.e. not fully illuminated) by the LED 39'. Since region 94 is "dark" to the TOF camera 41' due to the lack of LED illumination, the depth data gathered from dark region 94 is prone to error.

It is to be understood that shadow may be experience along a horizontal direction and a vertical direction. For illustration purposes, FIG. 20 shows two exemplary coordinates. Coordinates Coord_H illustrate a situation where LED 39' and TOF camera 41' are arranged horizontally with respect to each other so that they are adjacent each other along a horizontal direction and dark area 94 is an example of horizontal shadow. Similarly, coordinates Coord_V illustrate a situation where LED 39' and TOF camera 41' are arranged vertically with respect with each other so that they are adjacent each other along a vertical direction and dark area 94 is an example of vertical shadow.

FIG. 21 illustrates an example of parallax. Again, FIG. 21 shows the two exemplary coordinates, Coord_H and Coord_V, to emphasize that the present problems, and solutions, may be equally applied along a vertical or horizontal direction, or any diagonal between the vertical and horizontal directions. A TOF ray 101 is shown passing along corner C1 of foreground object 91 and having an endpoint at surface point Pt1 on (background) back wall 92. Similarly, an RGB ray 103 passes along corner C1 and has an endpoint at a second surface point Pt2 on back wall 92. Thus, from the viewpoint of the TOF camera 41', corner C1 is adjacent surface point Pt1, but from the view point of the RGB camera 33', the same corner C1 is adjacent surface point Pt2. Consequently, when texture from the RGB camera is assigned to depth point values from the TOF camera, parallax may cause incorrect texture values to be assigned to depth point values (e.g. vertices of a polyhedron, or other 3D model). Such errors are more noticeable (i.e. pronounced) at the boundaries between foreground objects and the background of a scene, as is illustrated by corner C1. In this case, the depth data for a depth point adjacent corner C1 may erroneously be assigned an RGB texture corresponding to surface point Pt1, while an image generated from the RGB camera would expect a texture corresponding from surface point Pt2. Another example of parallax is provided below.

Figure 22:
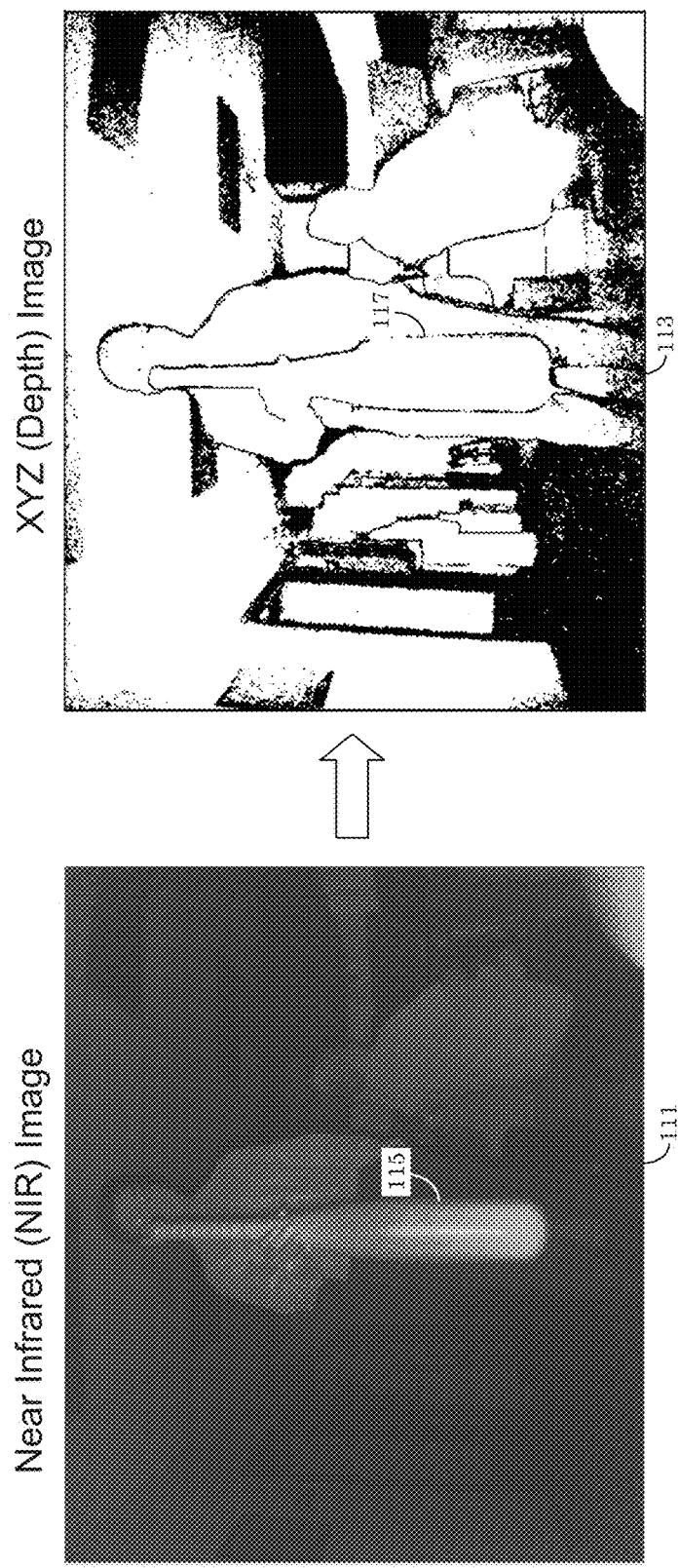
FIG. 22 illustrates depth data error due to LED shadow.

The above parallax problem at the edges of foreground objects may be further exacerbated by the shadow problem. With reference to FIG. 22, a near infrared (NIR) image 111, such as taken by a depth camera 41', is shown to have extended darken areas around a foreground object due to illumination from an LED source (such as from LED source 39') being obscured by shadow. This results in a widening of the foreground object as defined by the depth data, as is illustrated by the white portion of depth (data) image 113. For example, baseball bat 115 in NIR image 111 is shown in depth image 113 as a second baseball bat 117 having a width greater than that of baseball bat 115 in NIR image 111. That is, due to effects of light scattering and lack of illumination, the Holocam Orb of FIG. 20 miscalculates the edges of objects (such as baseball bat 117) in the XYZ (i.e. depth) image 113. Consequently, foreground objects appear longer (e.g. wider) along a row (or taller along a column, depending upon the position of the LED source) since they include the dark regions caused by LED shadow. Thus, the pixels in the shadow regions at the edge of objects have incorrectly determined depth values (i.e. indeterminate depth values) resulting in bad data. It is to be understood that a row may alternatively be called row line or line along a row or horizontal line, and a column may alternatively be called a column line or line along a column or vertical line. Any directional path (horizontal, vertical, diagonal, or curved) along which the present invention is applied may herein be termed a scan line.

FIG. 23 illustrates two (2.5D or 3D) images 121 and 123 with errors resulting from the (LED) shadow problem. In both images 121 and 123, background pixels in the (LED) shadow regions are erroneously assigned depth values similar to adjacent foreground objects. Consequently, these background pixels are displayed at a depth similar to that of a foreground object. Hence, part of the background is displayed as part of the foreground object. These types of error are highlighted within box 125 in image 121 and box 127 in image 123. Thus, an object of the present embodiment is to detect (LED) shadow regions (such as found at the edge of foreground objects), and invalidate pixels (e.g. depth data point) in the shadow region to remove bad data.

Figure 24:
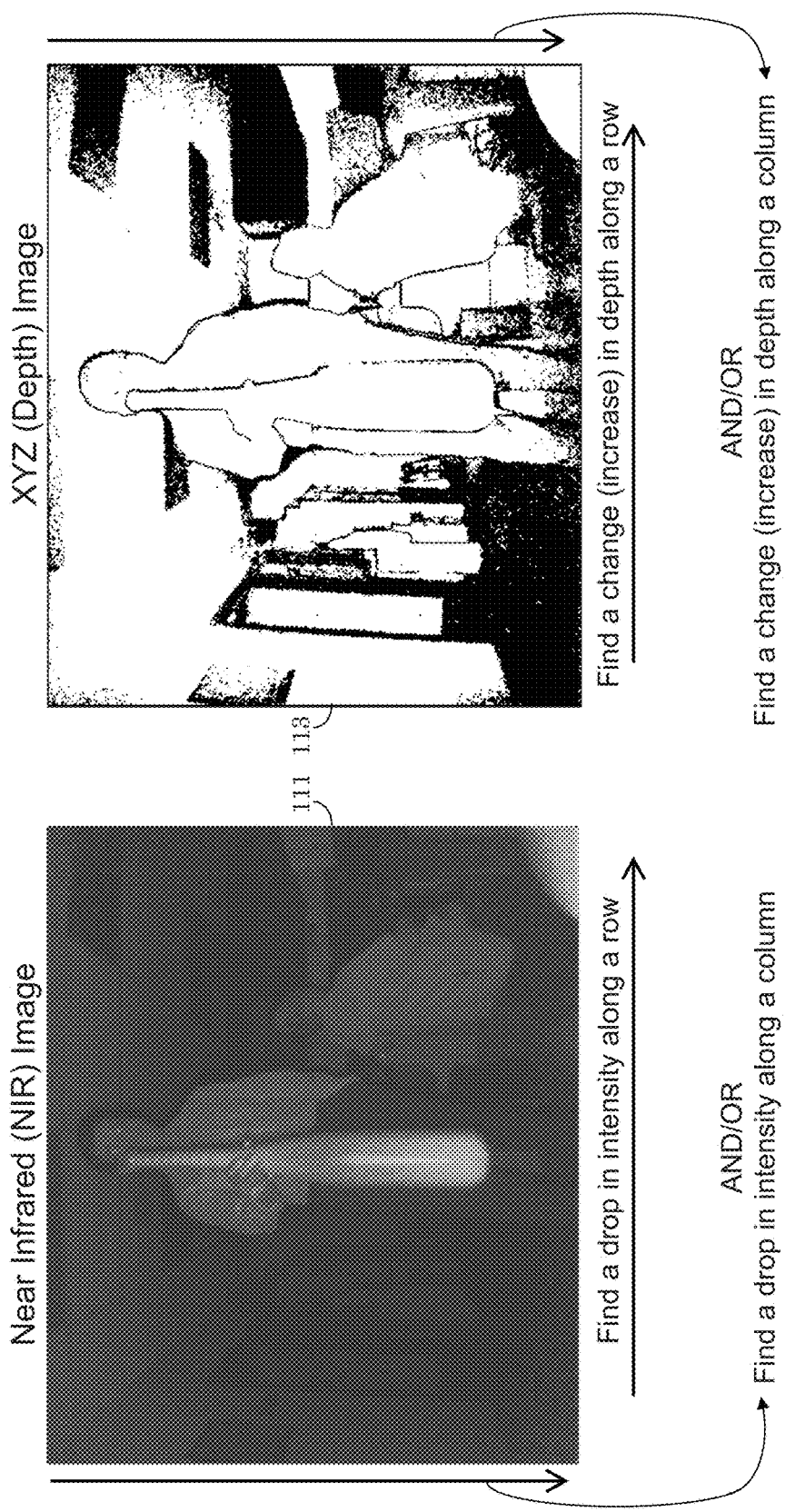
FIG. 24 illustrates a method for identifying LED shadow.
Figure 25:
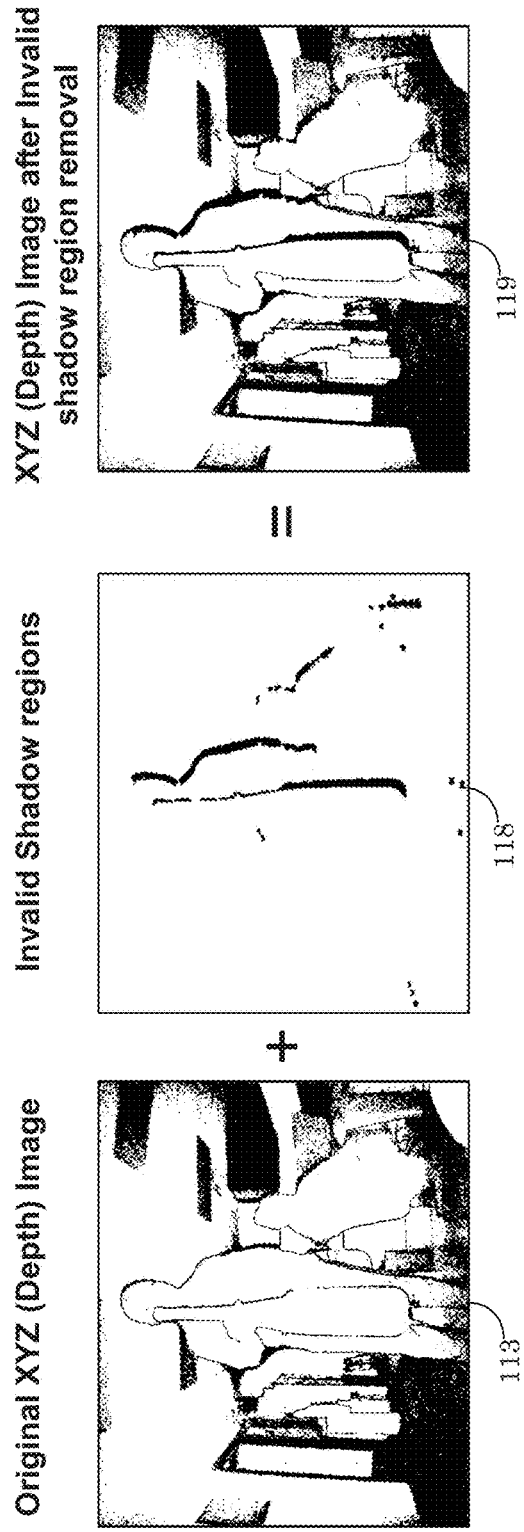
FIG. 25 illustrates a method for removing invalid LED shadow from a depth image.
Figure 26:
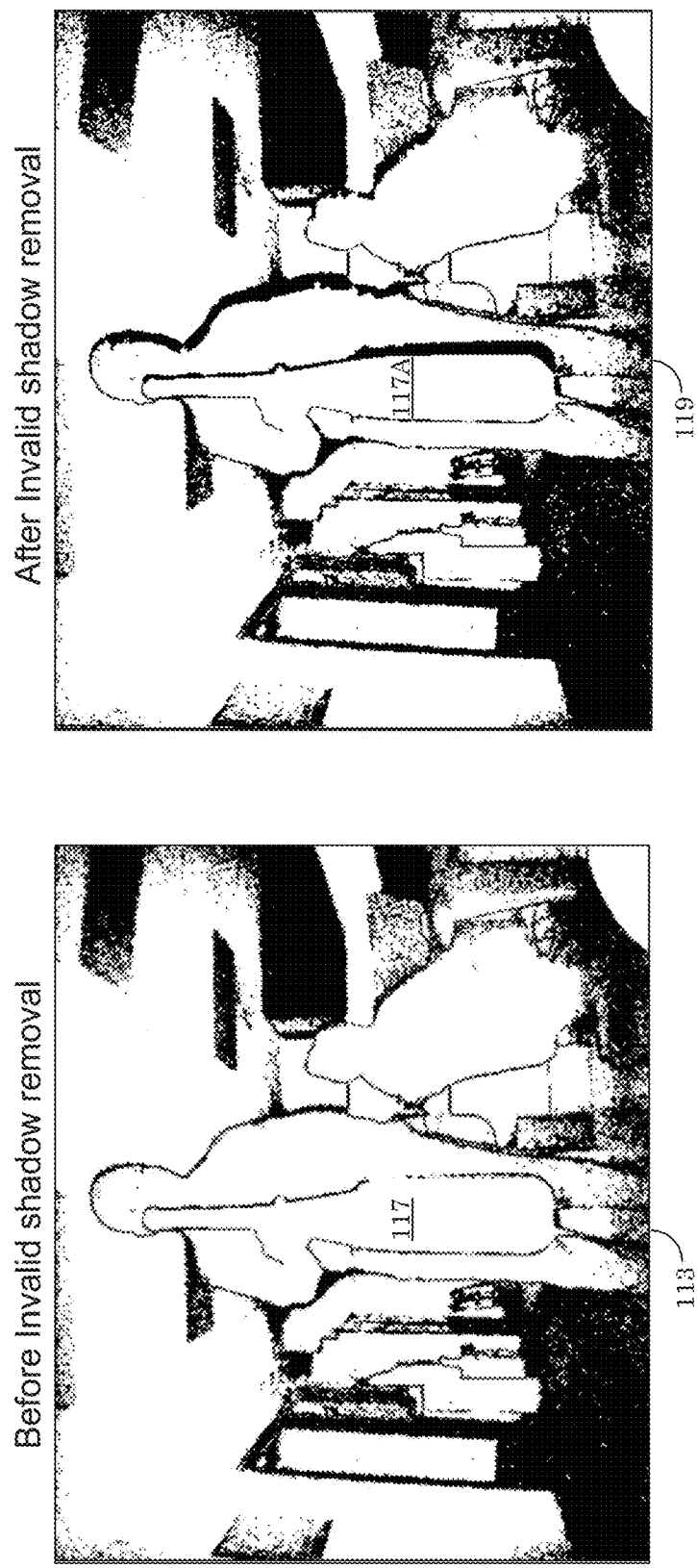
FIG. 26 compares a depth image prior to invalid shadow removal with the same image after invalid shadow removal.

FIGS. 24, 25 and 26 illustrate removal of error due to shadow (e.g. LED, or infrared, shadow). For discussion purposes, the present shadow removal method is applied to NIR image 111 and depth image 113 of FIG. 22. The present embodiment takes a two-step approach to remove shadow error in either horizontal direction and/or a vertical direction. It is noted that this type of error results in the depth image extending the edge of a foreground object beyond its true boundaries, as is illustrated by the increased width of baseball bat 117 in depth image 113 of FIG. 22. That is, depth values of the foreground object at its true edge are assigned to background objects that reside near the edge of the foreground object as seen from the line-of-sight of the depth camera. Thus, an increase (i.e. change) in depth data does not occurs at the true edge of a foreground object, as one would expect, but at some point beyond the edge of the foreground object. It is also noted that the error is caused by the LED light source being blocked (i.e. by an infrared (LED) shadow), which provides erroneous results to the depth camera. Thus, the error begins at the start of a (LED) shadow region and extends until the depth data changes from the depth of the foreground object to the true depth of the background. A first step is therefore to identify the starting point of the (LED) shadow and the starting point of when the depth data passes the start of the (LED) shadow and changes from the depth of the foreground object to the true background depth.

FIG. 24 illustrates these two steps. The start of the (LED) shadow coincides with the edge of an object (such a foreground object). Therefore, a first step is to identify the edge of an object in the near infrared image 111. At the edge of an object, there will be a drop in intensity (infrared light intensity in the present case), and there should also be a corresponding change in depth. In a preferred embodiment, this change in intensity (i.e. drop in intensity) or change in depth (i.e. increase in depth) is preferably a change of 10%, but other values such as 20% or 50% may be used without deviating from the present invention. In FIG. 24, the change in intensity may be identified by inspecting NIR image 111 row-by-row (in the case of horizontal shadow) or column-by-column (in the case of vertical shadow) looking for this change (drop) in intensity. If desired, this search may be focused on (or limited to) image regions where an LED shadow is expected. A theoretical location and size of a (LED) shadow may be determined due to the positions of the illumination source (e.g. LED source or pattern projector), depth camera/sensor, and RGB camera being known.

Preferably, an error region (i.e. observed dark region, or size of (LED) shadow) is determined by comparing NIR image 111 and depth image 113. More specifically, the observed (LED) shadow is set to (i.e. defined to be) the location of a depth increase in the depth image 113 along a row and/or column (in the depth image 113) less the location of an (infrared) intensity drop (optionally immediately preceding the location of the depth increase) along a corresponding row and/or column in the NIR image 111.

To make the present approach more robust, and accommodate (i.e. ignore short-lived anomalies in capture data) additional optional steps include computing a theoretical (LED) shadow size using trigonometry and the known relative positions of the illumination (LED) source and depth camera. The theoretical (LED) shadow size is then compared with the observed (LED) shadow region. The observed LED shadow region is ignored (i.e. not removed from consideration and further processing) if the observed shadow region is greater than the theoretical shadow size. However, if the observed LED shadow region is not greater than the theoretical LED shadow size, then all depth data points in the observed LED shadow region are invalidated (i.e. designated as an invalid shadow region [as illustrated by invalid shadow regions image 118 in FIG. 25] and removed from consideration.

The last step, as illustrated in FIG. 25, is to combine (or mask) the original depth image 113 (and optionally the NIR image) with the identified invalid shadow regions image 118 to remove bad depth data (as identified by invalid shadow regions image 118) to create a new depth image 119 with bad shadow information removed.

A side-by-side comparison of the original depth image 113 and corrected depth image 119 is shown in FIG. 26. As is evident from the side-by-side comparison, the width of baseball bat 117 in original depth image 113 is corrected to a more narrow baseball bat 117A in corrected depth image 119. The width of corrected baseball bat 117A more closely matches the width of baseball bat 115 in NIR image 111.

Figure 27:
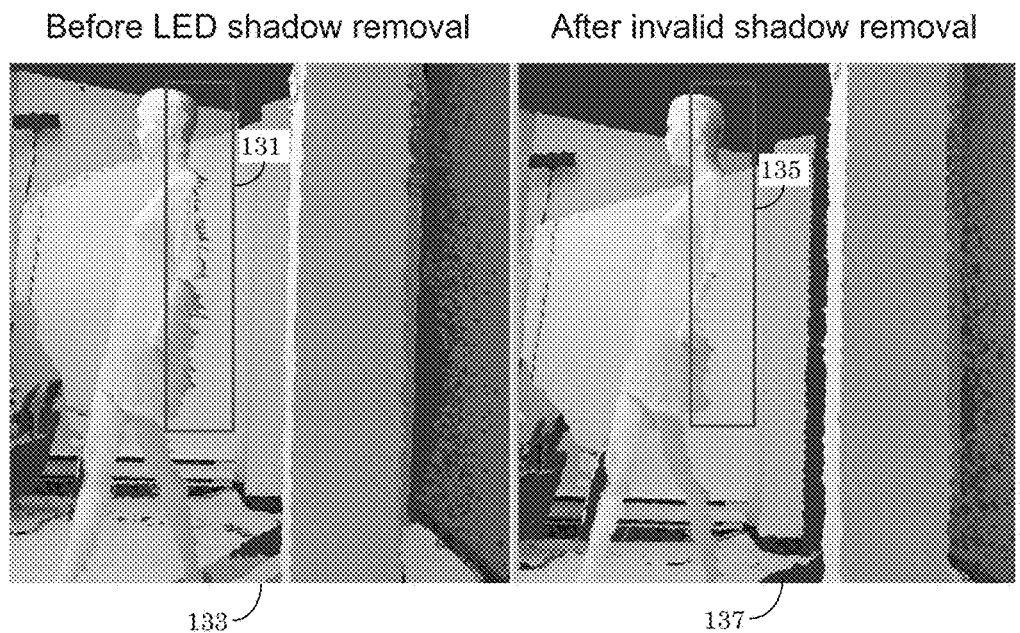
FIG. 27 is compares a 3D image before and after removal of depth data having errors due to LED shadow.

FIG. 27 provides another example of LED shadow removal. Image 133 shows a 3D image having LED shadow and incorporating depth information and texture (such as from an RGB camera). Box 131 highlights areas of error due to LED shadow. Image 137 shows the same scene (or image), but with invalid shadow removed. As is illustrated by box 135, much of the error due to shadow is eliminated as compared with box 131 of image 133.

Figure 28:
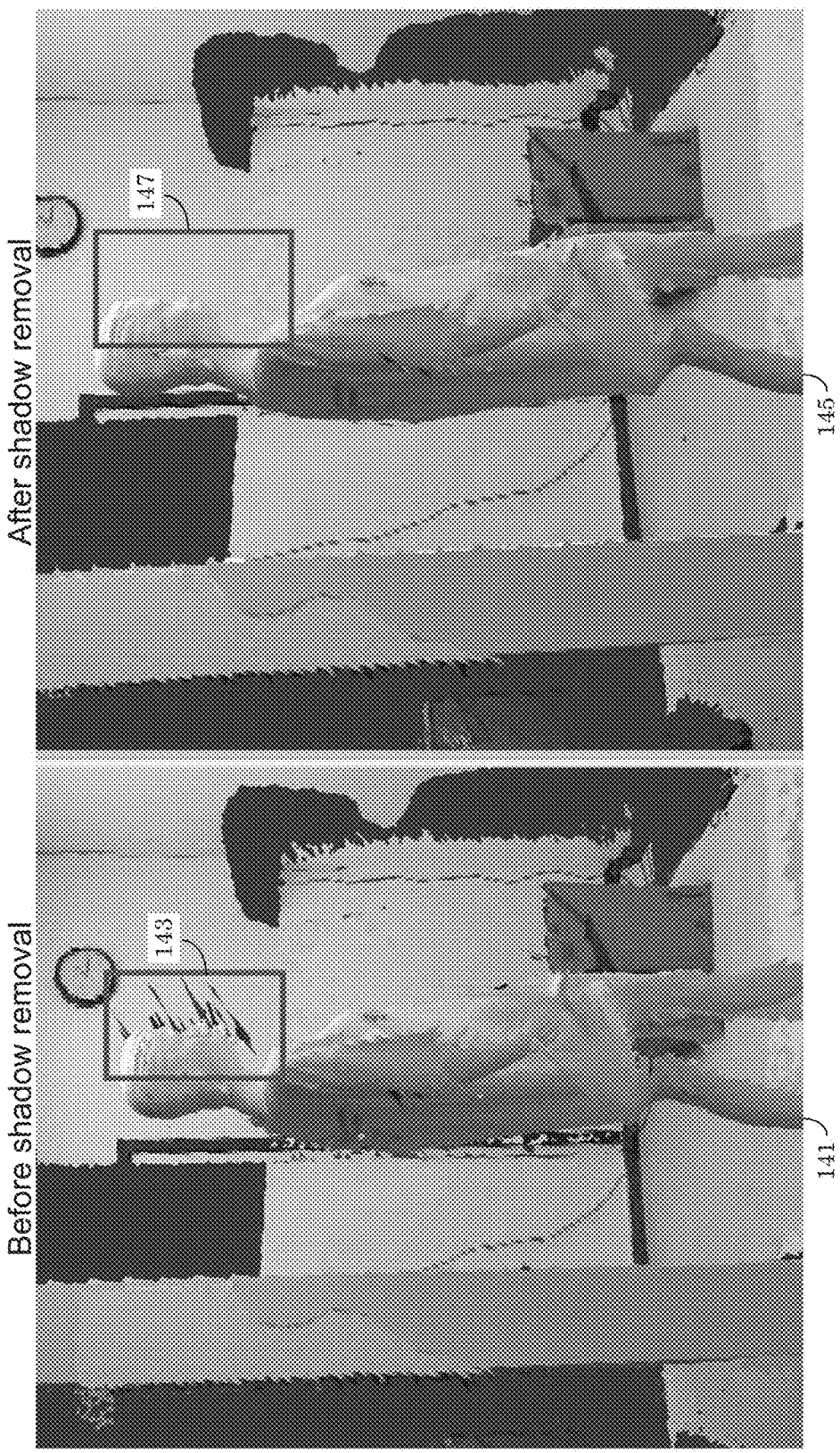
FIG. 28 provides a second example comparing a 3D image before and after removal of depth data having errors due to LED shadow.

FIG. 28 provides still another example of LED shadow removal. In image 141, box 143 highlights areas where error (due to LED shadow) results in regions (or image artifacts) extending from a manikin's face. After shadow removal, as is illustrated by image 145 and highlighted by box 147, much of the error due to shadow is removed and the true outline of the manikin's face is more accurately represented.

From the above, it is evident that removing the shadows from the images has improved the quality of the Holocam (3D) model around the edges of foreground objects. The amount of background visible on foreground objects is thus reduced.

Figure 29:
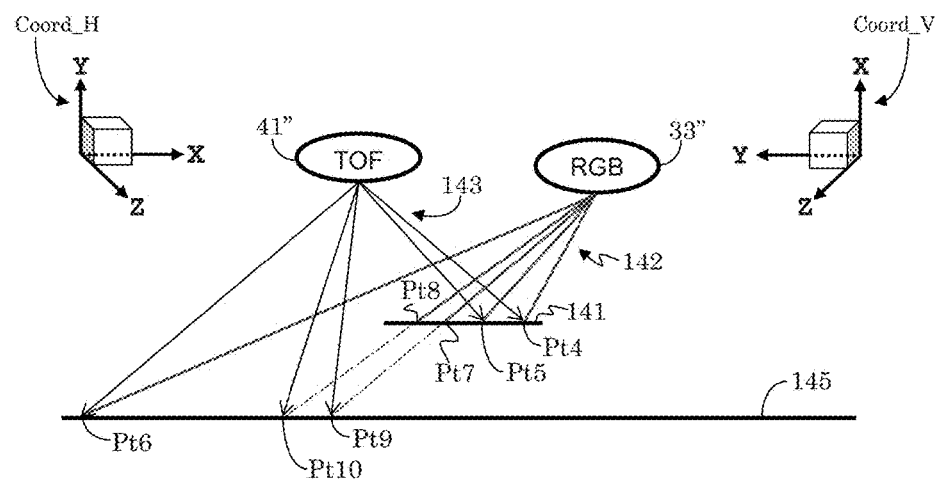
FIG. 29 illustrates error due to parallax between a time-of-flight (TOF) camera and a RGB (Red-Green-Blue, visual spectrum, image capture) camera.

Returning to the problem of parallax, as is explained above, parallax introduces error whereby incorrect texture is assigned to depth information points (depth data points or pixels). FIG. 29 illustrates a situation wherein parallax may result in very noticeable texture error. Again, horizontal coordinates Coord_H and vertical coordinates Coord_V are provided to illustrate that the present discussion is equally applicable to both a horizontal direction and a vertical direction, and indeed to any direction. For the sake of simplicity, the below example describes removal of parallax error along a horizontal row, but any directional line (scan line) or path (linear or curved) may be used so long as correspondence between depth data and texture data along the prominent path is maintained. That is, scan lines do not have to be entirely horizontal or vertical. For example, if one of the TOF camera 41" or RGB camera 33" is rotated relative to the other, then the scan line may be along a diagonal. Similarly, if lens distortion results in curvature of an image, then the lens distortion may be accounted for during texture mapping, which may result in the principle scan lines not being entirely straight but rather being (a little) curved. However, this type of curvature is often small and does not significantly affect the algorithm. Therefore, it may optionally be ignored.

In order to facilitate discussion, the illustration of FIG. 29 assumes no (LED) shadow is present. In the present case, a time-of-flight (TOF) camera 41" is shown next to an RGB camera 33". RGB rays 142 are shown extending from RGB camera 33" to a foreground object 141 and to a back wall 145, and TOF rays 143 likewise extend from TOF camera 41" to foreground object 141 and back wall 145. Most of the RGB rays 142 and TOF rays 143 extend to the same points on foreground object 141 and back wall 145, and thus correctly correlate texture information between depth data points (sometimes referred to as pixels) and corresponding RGB picture elements (or pixels). For example, RGB rays and TOF rays hit the same locations (surface points) on foreground object 141 at surface points Pt4 and P5, and hit the same location on back wall 145 at surface point Pt6.

Parallax error is introduced when pixels identified by RGB rays are mistakenly associated with non-corresponding depth points (depth data points) identified by TOF rays. For example, RGB rays from RGB camera 33" hit foreground object 141 at surface points Pt7 and Pt8. However, because TOF camera 41" is offset in a specific direction from RGB camera 33", TOF camera 41" can "see" points behind foreground object 141 that are obscured to RGB camera 33" (i.e. RGB camera 33" cannot "see" the obscured points). When correlating RGB pixels to depth points, the depth points that correspond to surface points that are hidden from (obscured to) RGB 33" may be correlated to incorrect RGB data since no proper RGB data exists for the obscured depth points. For example, TOF camera 41" sees surface points Pt9 and Pt10 on back wall 145, but these surface points are behind foreground object 145, as seen from the point of view of RGB camera 33". Extrapolating the RGB rays through foreground object 141 to back wall 145, as indicated by dotted lines, shows that surface points Pt7 and Pt8 on foreground object 141 would erroneously correspond to surface points Pt9 and Pt10. Thus, when assigning textures, a depth point corresponding to surface Pt9 on back wall 145 may erroneously be assigned (correlated to) a surface texture from surface point Pt7 on foreground object 141, as taken by RGB camera 33". Similarly, a depth point corresponding to surface Pt10 on back wall 145 may erroneously be assigned surface texture from surface point Pt8 on foreground object 141, as taken by RGB camera 33".

Figure 30:
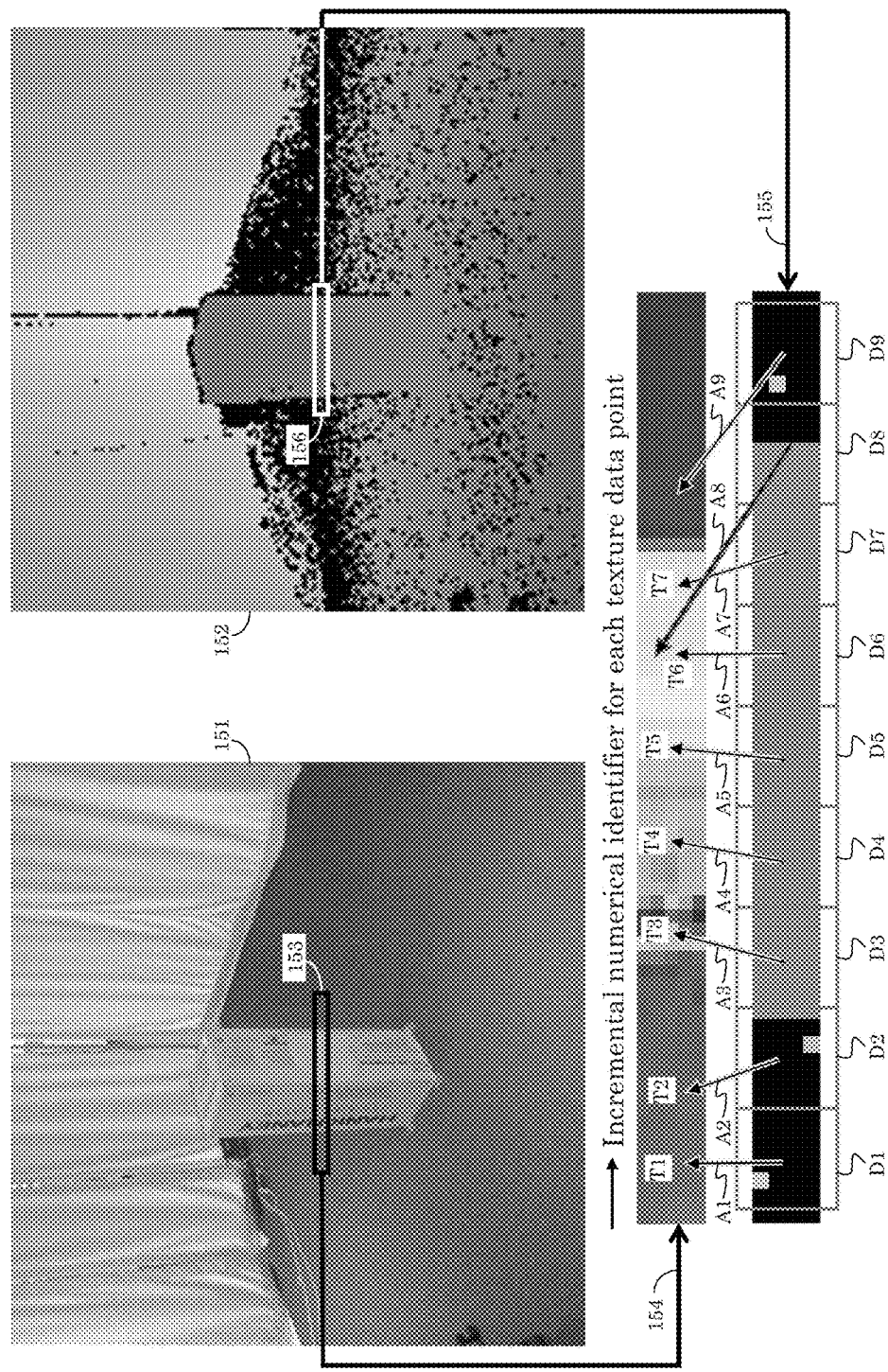
FIG. 30 illustrates a method of identifying depth error due to parallax.

A method for identifying error due to horizontal parallax is illustrated in FIG. 30. An RGB image 151 and corresponding depth map image 152 are shown side-by-side. An RGB row 153 (or part of a row, or swatch) of RGB data (i.e. an RGB image portion along a line) is shown as expanded RGB view 154. A corresponding expanding depth view 155 of a corresponding depth row swatch 156 (a depth image portion along a corresponding line) is also shown. It is to be understood that vertical parallax may be similarly addressed by comparing an RGB column swatch (i.e. column of intensity image data) with a corresponding column swatch of depth data. It is to be further understood that a depth image is typically of lower resolution than an RGB image. Nonetheless, corresponding RGB textures can still be assigned (mapped) to corresponding depth data points by use of corresponding image blocks, or any other technique known in the art. In the present example, depth swatch 155 is divided into nine depth blocks, D1 to D9. To assign RGB textures, one starts from one side of depth swatch 155 and traverses it along a (scan) line (e.g. along a row or column) in a first direction. For example, if one starts from depth block D1, then one traverses the depth blocks of depth swatch 155 horizontally in incrementing order sequence from D1 to D9. Similarly, if depth blocks D1 to D9 represented a column swatch rather than a row swatch, then one could start from depth block D1 and traverse the depth blocks vertically in incrementing order sequence from D1 to D9. Alternatively, one could sequentially traverse the depth blocks D9 to D1 in a second, reverse, direction opposite the first direction. That is, one starts from depth block D9, then one traverse the depth blocks in decrementing order sequence from D9 to D1. This may be desirable, for example, if the positions of the RGB camera and depth image capture device were reversed. Positions of texture data points are similarly assigned incremental numerical identifiers along a first direction. These numerical identifies would naturally be decrementing if one were to traverse a scan line of the texture image in a direction opposite the first direction. Irrespective of the traversing direction (i.e. from left-to-right or up-to-down (from D1 to D9) or from right-to-left or down-to-up (from D9 to D1)), corresponding RGB texture data points (or sections, texture blocks or pixels), such as T1 to T7, are identified and mapped (i.e. correlated, assigned) to corresponding depth data points (or depth blocks) such as D1 to D9, as illustrated by arrows A1 to A9 in FIG. 30. For example, an RGB texture element T1 corresponding to depth block D1 is identified by arrow A1. Similarly, an RGB texture element (or data point) T2 corresponding to depth block D2 is illustrated by arrow A2, and so on down the depth blocks in a first direction, as illustrated by arrows A3 to A9 extending from their respective, corresponding depth blocks D3 to D9 to a mapped texture element.

The preferred embodiment keeps track of identified RGB textures assigned to corresponding depth blocks. The identified RGB textures should follow the same general direction (e.g. a row path from left-to-right or from right-to-left or a column path from up-to-down or from down-to-up) traversed by the depth blocks D1 to D9. If a depth block is found to point to an RGB texture (i.e. pixel or pixel block or texture block) that precedes a previously assigned RGB texture along the same (a current) path direction, then the depth block is identified as erroneous and removed from consideration (removed, or masked, out from the depth map).

For example, if one proceeds along a left-to-right (or up-to-down) direction along a row (or column) of depth blocks, as illustrated by depth blocks D1 to D9 in FIG. 30, correspondence arrows A1 to A7 are shown to follow the same prominent position progression (direction in which a majority of texture data points and corresponding depth data points are mapped such that their mapping arrows A1 to A9 do not cross each other) of increasing along row (or column) line positions from left-to-right (or up-to-down). But arrow A8 of depth block D8 is shown to point to an RGB texture data point position that precedes the texture data point position T7 of (immediately) preceding arrow A7 (and depth block D7) as viewed along the prominent position progression direction of left-to-right (first direction). Depth block D8 is therefore identified as a parallax error and removed from texture mapping (and from the final 3D construct). In this manner, all depth data points identified as parallax error may be removed from the depth data map image 152.

Irrespective of the prominent directional path (left-to-right or right-to-left) one takes along a scan line, the error is always where background depth data is associated with foreground RGB texture data. Thus irrespective whether one would to traverse depth swatch 155 in incrementing order from D1 to D9 or in decrementing order from D9 to D1, in both cases depth data block D8 would be identified as an error. Preferably, parsing should be chosen based on the relative position of the depth image capture camera and RGB (intensity) image capture camera to make sure the correct pixels are removed (i.e. the portion of the RGB shadow that the depth image camera can see is preferably on the same side as the starting depth point, which depends on the relative positions of the RGB and depth cameras). Otherwise, the present algorithm should to be adapted to backtrack and remove the last several pixels which exceed a newly found minimum, as is explained below.

In an alternate embodiment, the depth blocks starting from the one immediately preceding the depth block that breaks the progression row (or column) position pattern along a row (or column), either from left-to-right or from right-to-left, (i.e. that is associated with (has an arrow that points to) a texture block (or pixel(s) that (optionally immediately) precedes a previously associated RGB texture block) up to the texture block that re-establishes original row (or column) position progression are identified as parallax errors.

One may choose to proceed along a path from a direction that follows the line of sight of the RGB camera and depth camera relative to the object being inspected. For example, if an object being inspected is positioned to the right of (or below) the RGB camera and depth camera, then one may sequentially traverse a row (or column) from left-to-right (or up-to-down). Similarly, if a scene is (RGB and depth) imaged from the right (or above), then one would sequentially traverse down a row (or column) from right-to-left (down-to-up).

In the above descriptions, irrespective of the alternate methods and the direction one chooses to sequentially progress along a row (or column), the RGB image and depth image are preferably inspected line-by-line (e.g. row-by-row and/or column-by-column). That is, the comparison of depth data blocks and their associated RGB textures along a row (or column) is repeated row-by-row (and/or column-by-column).

In summary, removal of the (LED) shadow error includes the following. 1) Detect an object edge (or boundary) noting that at the edge of an object, there will be a drop in intensity and change in depth. 2) Define the size of observed shadow region along each image row (or column) being substantially equal to the location of depth change (drop or increase) minus the location of intensity drop. 3) Compute a theoretical shadow size for the region using trigonometry. 4) Ignore the observed shadow region if (observed shadow size>theoretical shadow size), and invalidate all pixels in the observed shadow region otherwise. 5) Combine (for example, by masking) the observed shadow regions and invalidated corresponding regions from original XYZ (depth) image.

Also in summary, removal of parallax error includes the following. For each scan line, be it a row (row line or horizontal line) or column (vertical line or column line) of the depth map (depth image), the texture coordinates where no parallax occurs is monotonic (i.e. progresses along a constant direction, e.g. left-to-right or right-to-left or up-to-down or down-to-up). So areas in the row or column where texture coordinates are increasing, but then suddenly decrease (i.e. reverse direction in terms of position in a row or column) mark areas of parallax. 1) In a scenario where the texture coordinates are generally increasing on a row (or column) (i.e. the texture is not flipped, e.g. progressing in position along a row from left-to-right or along a column from up-to-down), discard all subsequent pixels that do not exceed a current maximum (along the same row or column progression). 2) In a scenario where the texture coordinates are generally decreasing on a row (or column) (i.e. the texture is horizontally flipped, e.g. progressing in the opposite direction along a row from right-to-left, or vertically flip, e.g. progressing in the opposite direction up a column from down-to-up), keep track of the minimum (position), and discard all subsequent pixels that do not fall below the current minimum (position).

The above invalid shadow removal and parallax error removal result in more reliable and accurate textured depth points. These points will, when rendered, have less visual artifacts on foreground objects. Also, when the depth points are used as data for other algorithms, they will have fewer (visual) artifacts, enabling more accurate scene registration, model creation, color correct, smoothing, and many other algorithms.

Encoding Free Viewpoint Data in Movie Data Container

As is explained above, information from multiple Holocam Orbs is combined to generate a single 3D immersive scene that adjusts itself to a users' position, orientation, posture, etc. To achieve this, it is beneficial to encode (e.g. compress) this information into known image/video encoding techniques/standards, but one confronts a problem that the present Holocam Orb system generates more types of information than may be supported by standard encoding/decoding imaging/streaming standards. Additionally, image compression of standards encoding/decoding techniques/algorithms may not be suitable, or optimal, for some types of information generated by the present Holocam Orb system. Thus, the present Holocam Orb system provides a method of augmenting an industry standard encoding/decoding system (i.e. codec), including a standard movie data container, to provide additional information while maintaining compatibility with the industry standard encoding/decoding system. The present technique is illustratively applied to a Moving Picture Experts Group (MPEG) multimedia encoding/decoding standard. The MPEG standard is defined and maintained by the Moving Pictures Experts Group, and can be found at website address mpeg.chiariglione.org.

The present invention generates free viewpoint data, which allows a user to interactively control a viewpoint and to generate new views of a dynamic scene from any 3D position, and provides a method for efficiently encoding this free viewpoint data into a standard movie data container, such an MPEG (video stream) container, so that it is compatible with existing codec software. A movie data container may be thought of as a wrapper, or index, listing the number and types of data streams within it.

Figure 31:
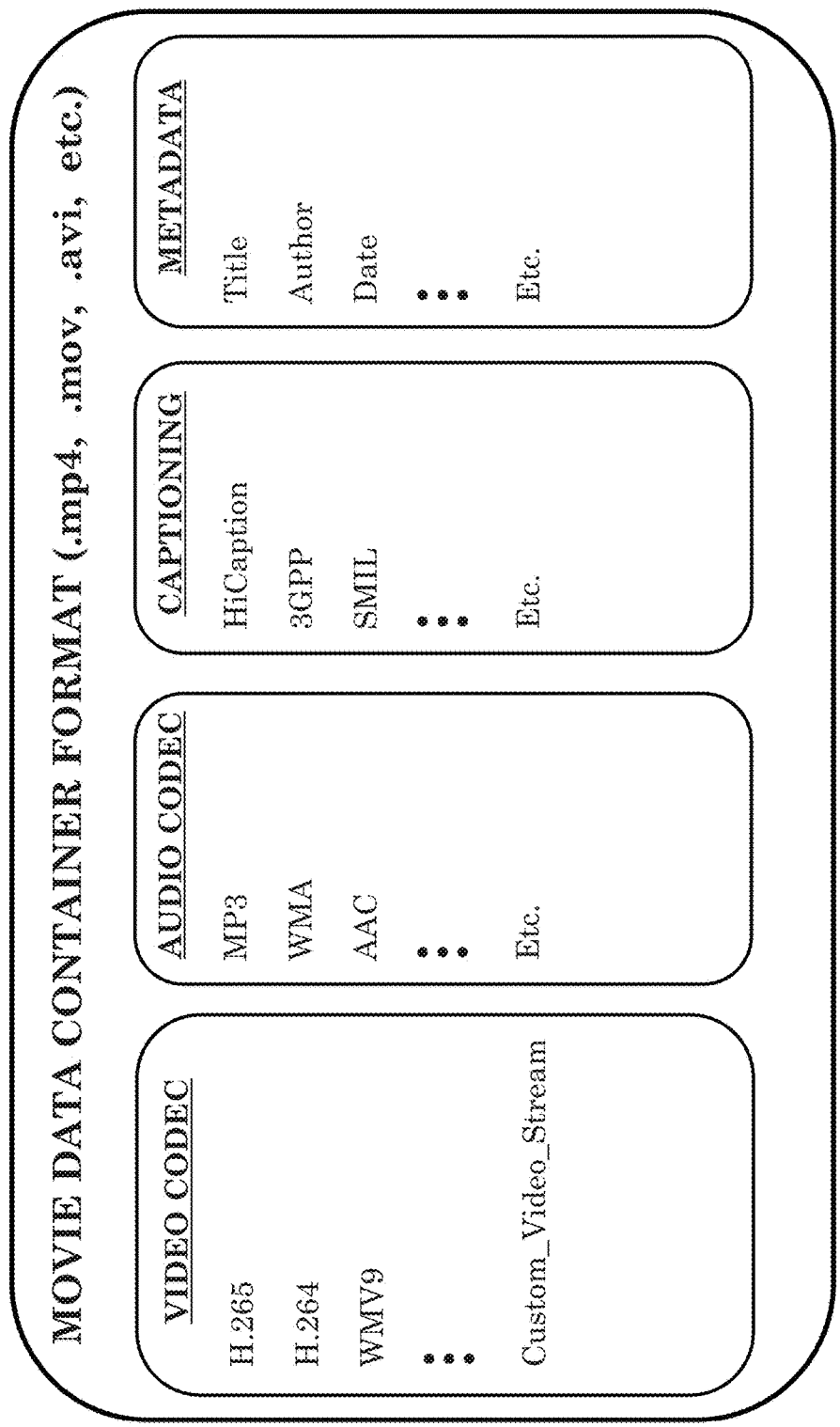
FIG. 31 provides a simplified example of a movie data container.

A simplified example of a movie data container, such as an MPEG container, is illustrated in FIG. 31. Generally, a container provides information about the types of data in a file. For example, a container may describe the types of media (such as video, audio, captions and/or metadata) contained within the file, and the particular codecs needed to access the different types of data. Different file types may use different containers, and the different file types may use different file extensions, such as .avi (Audio Video Interleave), .mp4 (MPEG-4 Part 14 or MPEG-4 AVC), .mkv (Matroska Video), etc. For example, an .mp4 file may use an MPEG-4 container. Different containers place different limits on the number of streams permissible, but typically permit at least one video stream and one audio stream, and list their associated codecs. Multiple codecs well-known in the art are listed in FIG. 31 for illustration purposes.

However, since a preferred embodiment of the present invention encodes (or adds) free viewpoint data into a video stream of an MPEG container, FIG. 31 lists a "Custom_Video_Stream" entry within the list of video streams to represent the addition of the present free viewpoint data, as is explained more fully below. That is, the present invention describes a way to encode free-viewpoint (FVP) video data efficiently into an MPEG compatible container, or more generally, a way to encode free-viewpoint (FVP) video data efficiently into any (industry) standard movie data container. FVP data consists of model data and multiple texture streams. Model data is preferably triangle mesh data, i.e. a collection of a list of triangles, consisting of three dimensional points and texture coordinate information (X,Y,Z,U,V), as is known in the art. MPEG already supports multiple video streams in the same container, and the present invention makes use of a video data stream to store the model data. Additionally, different mesh data for different objects may be encoded at different frames rates a single video data stream. To achieve this, data structures that allow for encoding different objects in a scene to be encoded at different frame rates are defined.

FVP model data in accord with the present invention is preceded by multiple headers which associate the FVP model data to various (corresponding) textures encoded in the standard MPEG video streams. The FVP model data stream itself is encoded (preferably into packets) and given a label identifying the type of encoding, such as AVMEDIA_TYPE_VIDEO. The encoded FVP model data is also assigned a custom identification (ID) of, for example, AV_CODEC_ID_HCDATA. The FVP model data in the packet consists of a main header that contains of version information, the header size, and the total size of the packet. The main header is followed by a subsequent versioned header that encodes the type of data, the compressed and decompressed sizes, the compression method, an arbitrary label (that may identify the present packet as containing encoded FVP model data), a checksum, and a list of associated video streams. An example of a main header and subsequent versioned header expressed in C code is illustrated in FIG. 32. The encoded FVP model data would then follow the headers.

Thus, the present method permits different types of encoded data to be inserted into a stream designated for a type of data different from the inserted data. For example, FVP model data (such as triangle mesh data) may be encoded/inserted in a stream (or track) designated as a video stream in the container. Furthermore, because the inserted data does not necessarily match the expected type of data (e.g. video data), it can be encoded in any desired (or proprietary) matter, since it is identified by its assigned custom identification (ID), e.g. identified as AV_CODEC_ID_HCDATA, and thereby identifies its corresponding decoder, if any.

For example, FIG. 33 illustrates an encoded (compressed) video stream identified as Video Stream 1, and illustrates a typical MPEG video encoding technique. Each video frame in the video stream is illustrated by a parallelogram, and designated a letter of I, B, or P indicating how each frame is encoded. For example, the first frame in a video stream is termed an I-frame (or an intra coded frame), and it contains all information needed to fully generate a complete frame without requiring information from any other frame. Therefore, an I-frame has less compression than other frames. Several frames ahead of an I-frame is a P-frame (or predicted frame) and they are forward predicted from their immediately preceding I-frame. A P-frame contains information indicating what has changed from its most recently preceding I-frame. For this reason, P-frames are sometime termed delta frames. However since only changes from a preceding I-frame needs to be encoded into a P-frame, they can be compressed far more than I-frames. In between I-frames and P-frames are B-frames, which are forward predicted from their immediately preceding I-frame and backward predicted from their immediately proceeding P-frame. That is, based on the full frame information of an I-frame, and the change information of a P-frame, B-frames fill in (or interpolate) intermediate changes to fill in frame information between an I-frame and a P-frame. Because B-frames used both backwards prediction and forward prediction, they support the most compression. Each frame is assigned a frame number so that a receiver can arrange frames of the video stream in a correct order for viewing.

FIG. 34 illustrates an example of the presently preferred embodiment of inserting free viewpoint data (FVD) model date into a video stream. More specifically, the preferred embodiment provides separate 3D model data of different objects into a single video stream. For example, 3D triangle mesh data of a first object (Obj1), which is illustratively shown as a recliner chair, is encoded at a first frame rate into Video Stream 2. Additionally, 3D triangle data for a different, second object (Obj2), which is illustratively shown as a rabbit, is inserted at a second frame rate into the same Video Stream 2. Preferably, the second frame rate is different (e.g. higher) than the first frame rate. The frame rate may be determined merely by how often 3D mesh data of a specific object is inserted into a frame of Video Stream 2. In the example of FIG. 34, six frame of Obj2 are inserted for each frame of Obj1, and thus Obj2 has a frame rate six times higher than that of Obj1. As stated above, skin information from other video streams can by associated with specific triangles of a 3D mesh, and this may be accomplish by identify video frames from another video stream that correspond to a specific 3D mesh frame in Video Stream 2. The individual FVD data may be encoded using any of multiple encoding schemes. For example, each 3D frame in Video Stream 2 may contain all information needed to generate its FVD frame content, or 3D frame data may be encoded using information from multiple frames to generate a complete FVD frame.

In summary, a second designated video stream (Video Stream 2) does not adhere to any expected video encoding scheme. Instead, two distinct FVD data models (e.g. two distinct triangle mesh models) of two different objects, Obj1 and Obj2, are housed within the same video stream. This permits each of the two objects Obj1 and Obj2 to be independently encoded with different encoding algorithms and/or at different (frame) rates and resolutions (polygon densities) within the same video stream. That is, multiple independent 3D models may be inserted into the same defined video stream, and each 3D models may be encoded at an independent image resolution. Therefore, the image resolutions may be different from each other since they are independent of each other. For example Obj1 may be encoded at one frame per second, fps, at a first resolution, while Obj2 is encoded at 15 frames per second at a second resolution different than the first resolution. Thus, the encoded rate and resolution for different objects requiring additional attention may be individually encoded at different rates and resolutions within the same video stream.

FIG. 35 illustrates an alternate embodiment wherein each 3D object is encoded (inserted) into a separate video stream. In this example, first object Obj1 is inserted into Video Stream 3 at the first frame rate, and second object Obj2 is inserted into a Video Stream 4 at the second frame rate. Each of Obj1 and Obj2 may be different types of data and/or use different encoding schemes/techniques.

Figure 36:
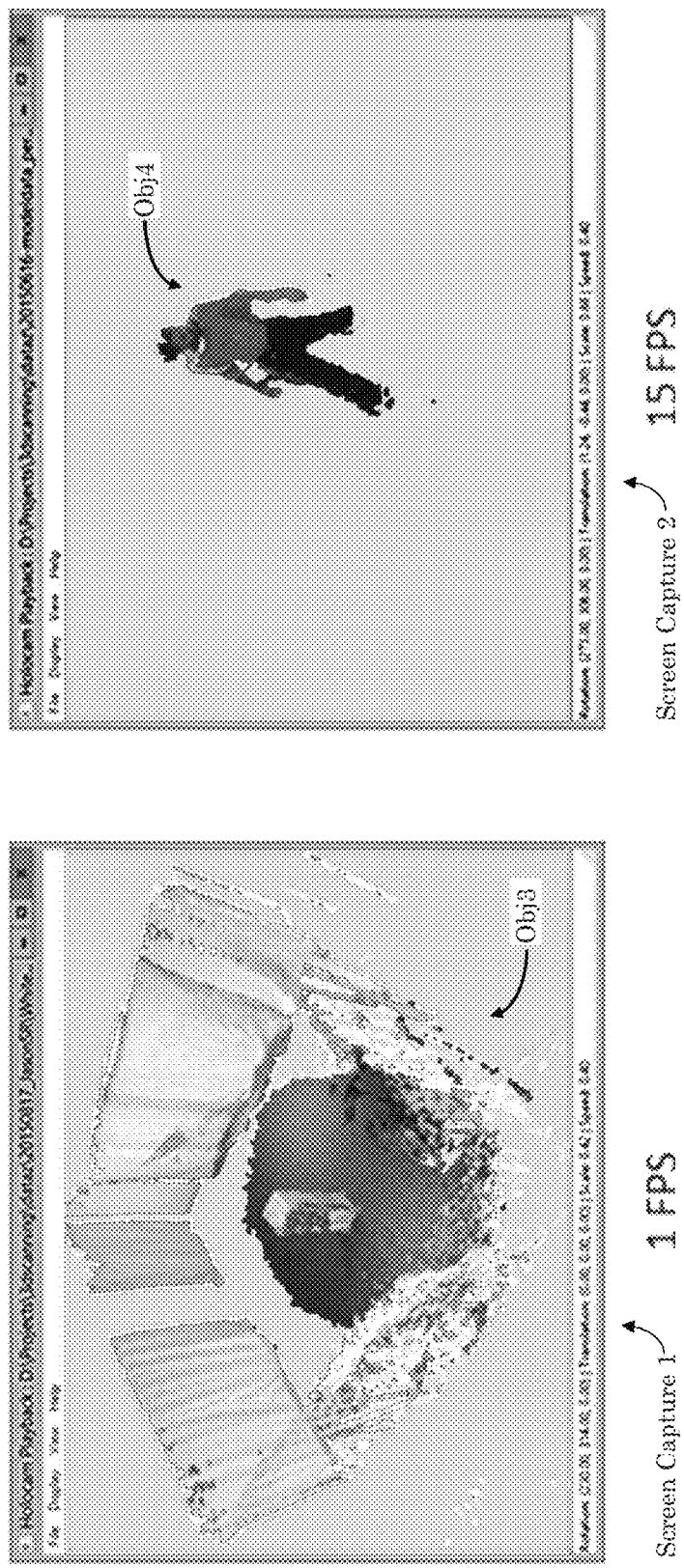
FIG. 36 illustrates background 3D model data and foreground 3D model data encoded separately within a single video stream.

Another example is provided in FIG. 36. Two additional examples of two objects, Obj3 and Obj4, are shown as reconstructed in separate screen capture images (Screen Capture 1 and Screen Capture 2). For illustration purposes, each of the reconstructed 3D triangle meshes of Obj1 and Obj2 is further shown with their respective, corresponding skin information on their triangle frame. In the present example, object Obj3 is encoded at 1 frame per second and object Obj4 is encoded at 15 frames per second. In this manner, objects that tend to not change much, such objects in the background (such as Obj3) may be encoded at a lower frame rate than objects that change more often (such as foreground object Obj4). As stated above, both obj3 and obj4 may be encoded in a single video stream, or in separate video streams. In the present case, a more complete scene may be constructed by superimposing Obj4 on Obj3.

The technical benefits of present techniques for encoding FVD data are being able to encode 3D objects in a compatible way inside an MPEG container, such that: data necessary for FVP rendering is successfully encoded/decoded; different types of data can be encoded/decoded (for example skeleton information) within an MPEG video stream; different framerates can be encoded for different objects in a scene by encoding video frames more or less frequently for the different objects. This leads to considerable space saving when encoding background information at a lower frame rate than foreground information. Another benefit is that the resulting video files/streams are compatible with unmodified existing software (like players, video editing tools, etc.).

That is, existing software will detect an unknown stream, but skip the unknown data. However, software that recognizes FVD data by their assigned identifiers will be able to recover/decode the FVD data and generate a correct FDV view. It is noted that benefit of this type of data encoding/decoding is not limited to FVP model data, and can be applied to other purposes. Some example could include encoding data for advanced rendering, video markups, arbitrary notes, or any other data for any other purpose.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. An environment sensing apparatus, comprising:
a depth image capture device including:
an illumination source, the depth image capture device using reflected illumination from the illumination source to determine a depth map of a scene, the depth map being comprised of lines of depth data points; and
an intensity image capture device that captures an intensity image of the scene, the intensity image being comprised of lines of intensity data points; and
a data processing unit implementing the following steps:
on a line-by-line basis, identifying a first edge of an object in a current line, of intensity data points, of the intensity image, and identifying a corresponding second edge of the same object in a corresponding current line, of depth data points, of the depth map;
defining as an observed shadow, depth data points in the current line of the depth map that lie between a first depth data point, whose line position corresponds to a position of the first edge in the corresponding current line of the intensity image, and a second depth data point that corresponds to a position of the second edge in the same current line of the depth map; and
selectively removing depth data points within the defined observed shadow from the depth map.

2. The environment sensing apparatus of claim 1, wherein:
the depth image capture device is part of a time-of-flight (TOF) system; and
the illumination source is a near infrared (NIR) light source, and the intensity data points are NIR light intensity data points.

3. The environment sensing apparatus of claim 1, wherein:
the depth image capture device is part of a structured light system; and
the illumination source projects a known pattern image.

4. The environment sensing apparatus of claim 1, wherein:
the lines of depth data points are one of rows or columns of depth data points within the depth map; and
the lines of intensity data points are one of rows or columns of intensity data points within the intensity image.

5. The environment sensing apparatus of claim 1, wherein the step of selectively removing depth data points within the defined observed shadow from the depth map, includes:

calculating a theoretical intensity shadow of the object along the current line of the depth map based on known relative positions of the illumination source and the intensity image capture device; and removing all depth data points that define the observed shadow in response to the observed shadow not being greater than the theoretical shadow.

6. The environment sensing apparatus of claim 5, wherein the step of selectively removing depth data points within the defined observed shadow from the depth map, further includes:

not removing any of the depth data points within the defined observed shadow in response to the observed shadow being greater than the theoretical shadow.

7. An environment sensing apparatus, comprising:

a depth image capture device, which captures a depth map of a scene, the depth map being comprised of lines of depth data points; and an intensity image capture device that captures an intensity image of the scene, the captured intensity image of the scene being a texture image including a plurality of lines of texture data points; and a data processing unit implementing the following steps:

mapping texture data points from a line of the texture image to corresponding depth data points in a corresponding line of the depth map;

identifying, as a procession direction, a prominent position progression of mapped depth data points to texture data points in succession along a first direction of the line of the texture image;

proceeding one depth data point at a time along the procession direction in the corresponding line of the depth map, in response to a current depth data point being mapped to a texture data point whose position does not follow the prominent position progression, identifying as parallax error depth data all depth data points in the corresponding line of the depth map spanning from the current depth data point to a first depth data point whose mapped texture data does follow the prominent position progression; and removing from the depth map all depth data points identified as parallax error depth data.

8. The environment sensing apparatus of claim 7, wherein:

positions of each texture data point along each line of texture data are assigned an incremental numerical identifier increasing along the first direction; and the first depth data point is the first encountered depth data point along the first direction whose mapped texture data point has a numerical identifier higher than the numerical identifier of the texture data point mapped to the current depth data point.

9. The environment sensing apparatus of claim 7, wherein:

positions of each texture data point along each line of texture data are assigned an incremental numerical identifier increasing along the first direction;

the prominent position progression is opposite to the first direction along the line of the texture image; and the first depth data point is the first encountered depth data point in the direction opposite the first direction whose mapped texture data point has a numerical identifier lower than the numerical identifier of the texture data point mapped to the current depth data point.

10. The environment sensing apparatus of claim 7, wherein:

the depth image capture device is part of a time-of-flight (TOF) system; and the intensity image capture device is a visual spectrum camera.

11. The environment sensing apparatus of claim 7, wherein:

the depth image capture device is part of a structured light system; and the intensity image capture device is a visual spectrum camera.

12. A method of removing erroneous depth data points from a depth map of a scene, comprising:

accessing the depth map of the scene, the depth map being generated by a depth image capture system including an intensity image capture device and using illumination from an illumination source to determine the depth map and an intensity image of the scene, the depth map being comprised of lines of depth data points, and the intensity image being comprised of lines of intensity data points;

on a line-by-line basis, identifying a first edge of an object in a current line, of intensity data points, of the intensity image, and identifying a corresponding second edge of the same object in a corresponding current line, of depth data points, of the depth map;

defining as an observed shadow, depth data points in the current line of the depth map that lie between a first depth data point, whose line position corresponds to a position of the first edge in the corresponding current line of the intensity image, and a second depth data point that corresponds to a position of the second edge in the same current line of the depth map; and selectively removing depth data points within the defined observed shadow from the depth map.

13. The method of claim 12, wherein:

the depth image capture system is a time-of-flight (TOF) system; and the illumination source is a near infrared (NIR) light source, and the intensity data points are NIR light intensity data points.

14. The method of claim 12, wherein:

the depth image capture system is a structured light system; and the illumination source projects a known pattern image.

15. The method of claim 12, wherein:

the lines of depth data points are one of rows or columns of depth data points within the depth map; and the lines of intensity data points are one of rows or columns of intensity data points within the intensity image.

16. The method of claim 12, wherein the step of selectively removing depth data points within the defined observed shadow from the depth map, includes:

calculating a theoretical intensity shadow of the object along the current line of the depth map based on known relative positions of the intensity image capture device and the illumination source; and removing all depth data points that define the observed shadow in response to the observed shadow not being greater than the theoretical shadow.

17. The method of claim 16, wherein the step of selectively removing depth data points within the defined observed shadow from the depth map, further includes:

not removing any of the depth data points within the defined the observed shadow in response to the observed shadow being greater than the theoretical shadow.

18. The method of claim 12, wherein the intensity image capture device is a visual spectrum camera and the captured intensity image of the scene is further a texture image including a plurality of lines of texture data points, the method further comprising:
- mapping texture data points from a line of the texture image to corresponding depth data points in a corresponding line of the depth map;
- identifying, as a procession direction, a prominent position progression of mapped depth data points to texture data points in succession along a first direction of the line of the texture image;
- proceeding one depth data point at a time along the procession direction in the corresponding line of the depth map, in response to a current depth data point being mapped to a texture data point whose position does not follow the prominent position progression, identifying as parallax error depth data all depth data points in the corresponding line of the depth map spanning from the current depth data point to a subsequent depth data point whose mapped texture data does follow the prominent position progression; and
- removing from the depth map all depth data points identified as parallax error depth data.

19. The method of claim 18, wherein:
positions of each texture data point along each line of texture data are assigned an incremental numerical identifier increasing along the first direction; and
the subsequent depth data point is the first encountered depth data point in the first direction whose mapped texture data point has a numerical identifier higher than the numerical identifier of the texture data point of the texture data point mapped to the current depth data point.

20. The method of claim 18, wherein:
positions of each texture data point along each line of texture data are assigned an incremental numerical identifier increasing along the first direction;
the prominent position progression is opposite to the first direction along the line of the texture image; and
the subsequent depth data point is the first encountered depth data point in the direction opposite the first direction whose mapped texture point has a numerical identifier lower than the numerical identifier of the texture data point mapped to the third depth data point.

* * * * *